(12) United States Patent
Wakai et al.

(10) Patent No.: US 7,523,031 B1
(45) Date of Patent: Apr. 21, 2009

(54) INFORMATION PROCESSING APPARATUS AND METHOD CAPABLE OF PROCESSING PLURALITY TYPE OF INPUT INFORMATION

(75) Inventors: Masanori Wakai, Tokyo (JP); Aruna Rohra Suda, Yokohama (JP); Suresh Jeyachandran, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,030

(22) Filed: Dec. 23, 1999

(30) Foreign Application Priority Data

Dec. 24, 1998 (JP) .................................. 10-366928

(51) Int. Cl.
*G06F 17/27* (2006.01)
*G06F 17/30* (2006.01)

(52) U.S. Cl. ................ 704/9; 707/2; 707/3; 707/4; 707/5; 707/6; 704/10

(58) Field of Classification Search ............ 704/1, 704/9, 10, 270, 277, 275; 707/100, 102, 707/2–6
See application file for complete search history.

(56) References Cited

U.S. PATENT DOCUMENTS

| | | | |
|---|---|---|---|
| 5,555,169 A | * | 9/1996 | Namba et al. .............. 704/9 |
| 5,600,765 A | * | 2/1997 | Ando et al. ............... 395/133 |
| 5,604,863 A | * | 2/1997 | Allen et al. ................ 714/11 |
| 5,677,993 A | | 10/1997 | Ohga et al. ............. 394/2.84 |
| 5,748,974 A | * | 5/1998 | Johnson ..................... 704/9 |
| 5,884,249 A | * | 3/1999 | Namba et al. .............. 704/9 |
| 6,012,030 A | * | 1/2000 | French-St. George et al. ..................... 704/275 |
| 6,118,888 A | * | 9/2000 | Chino et al. ............. 382/118 |
| 6,292,767 B1 | * | 9/2001 | Jackson et al. ............. 704/1 |

FOREIGN PATENT DOCUMENTS

| | | |
|---|---|---|
| EP | 0591044 A1 | 4/1994 |
| JP | 06131108 | 5/1994 |
| JP | 09091112 | 4/1997 |

* cited by examiner

*Primary Examiner*—Patrick N Edouard
*Assistant Examiner*—Lamont M Spooner
(74) *Attorney, Agent, or Firm*—Fitzpatrick, Cella, Harper & Scinto

(57) ABSTRACT

An information processing apparatus has: an input unit capable of inputting a plurality type of information such as hand-written information, key information and speech information; and a knowledge database storing input information and information necessary for generating a concept instance in one-to-one correspondence. A combination of at least two types of input information is analyzed by referring to the knowledge database to generate a concept instance from each piece of the input information. A plurality type of input information can therefore be understood collectively by correlating the input information each other and considering the input order of the input is information.

23 Claims, 61 Drawing Sheets

FIG. 8

CONCEPT "Action" DEFINITION

| SLOT TYPE | INSTANCE APPLICATION RULE | INSTANCE REQUEST RULE |
|---|---|---|
| ConceptType | Action | Action |
| Actor | List of \<Person\> | List of \<Person\> |
| Object | List of \<Object\> | List of \<Object\> |
| From | List of \<Person\> or \<Space\> | List of \<Person\> or \<Space\> |
| To | List of \<Person\> or \<Space\> | List of \<Person\> or \<Space\> |

FIG. 9

CONCEPT "Trans" DEFINITION

| SLOT TYPE | INSTANCE APPLICATION RULE | INSTANCE REQUEST RULE |
|---|---|---|
| ConceptType | Trans | Trans |
| Actor | List of \<Person\> | List of \<Person\> |
| Object | List of \<Object\> | List of \<Object\> |
| From | List of \<Person\> or \<Space\> | List of \<Person\> or \<Space\> |
| To | List of \<Person\> or \<Space\> | List of \<Person\> or \<Space\> |

FIG. 10

CONCEPT "Get" DEFINITION

| SLOT TYPE | INSTANCE APPLICATION RULE | INSTANCE REQUEST RULE |
|---|---|---|
| ConceptType | Get | Get |
| Actor | List of <Person> | List of <Person> |
| Object | List of <Object> | List of <Object> |
| From | List of <Person> or <Space> | List of <Person> or <Space> |
| To | =Actor | =Actor |

FIG. 11

CONCEPT "Send" DEFINITION

| SLOT TYPE | INSTANCE APPLICATION RULE | INSTANCE REQUEST RULE |
|---|---|---|
| ConceptType | Send | Send |
| Actor | List of <Person> | List of <Person> |
| Object | List of <Object> | List of <Object> |
| From | =Actor | =Actor |
| To | List of <Person> or <Space> | List of <Person> or <Space> |

FIG. 16

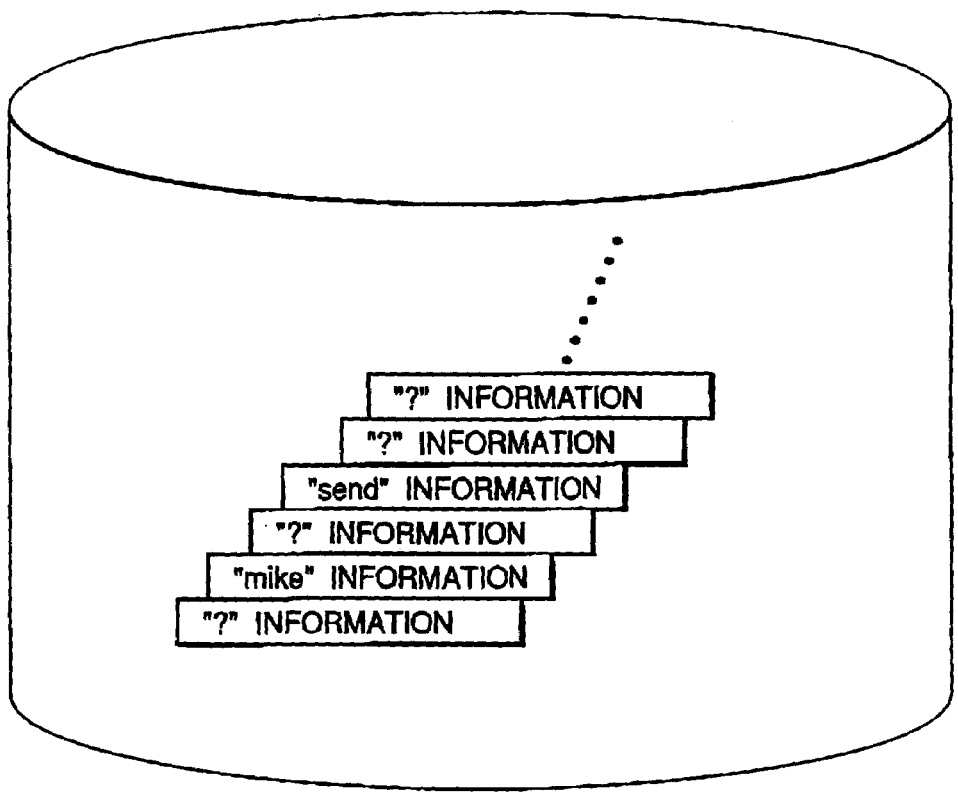

FIG. 18

CONCEPT "Person" DEFINITION

| SLOT TYPE | INSTANCE APPLICATION RULE | INSTANCE REQUEST RULE |
|---|---|---|
| ConceptType | Person | Person |
| FirstName | CHARACTER STRING | CHARACTER STRING |
| MiddleName | CHARACTER STRING | CHARACTER STRING |
| LastName | CHARACTER STRING | CHARACTER STRING |
| Sex | male or female | male or female |
| Age | NUMERICAL VALUE | NUMERICAL VALUE |
| BelongsTo | List of <Organization> | List of <Organization> |

FIG. 17

"send" INFORMATION

| ITEM | CONTENTS |
|---|---|
| SURFACE LAYER CHARACTER STRING | "send" |
| ConceptType | Send |
| CONCEPT INSTANCE REQUEST RULE | STORE CONCEPT INSTANCE OF List of <Person> IN Actor |
| | STORE CONCEPT INSTANCE OF List of <Object> IN Object |
| | STORE CONCEPT INSTANCE STORED IN Actor IN From |
| | STORE CONCEPT INSTANCE OF List of <Person> or <Space> IN To |
| SURFACE LAYER REQUEST RULE | ARRANGE IN WORD ORDER OF "send" [Object] "to" [To] |
| | ARRANGE IN WORD ORDER OF "send" [To] [Object] |
| | ARRANGE IN WORD ORDER OF "send" "to" [To] |
| | ABIDE BY RULE OF "VERB" OF ENGLISH GRAMMAR |
| | ABIDE BY RULE OF PRESENT TENSE OF ENGLISH GRAMMAR |

FIG. 19

"mike" INFORMATION

| ITEM | CONTENTS |
|---|---|
| SURFACE LAYER CHARACTER STRING | "mike" |
| ConceptType | Person |
| CONCEPT INSTANCE REQUEST RULE | STORE "mike" IN FirstName |
| | STORE CHARACTER STRING IN MiddleName |
| | STORE CHARACTER STRING IN LastName |
| | STORE male IN Sex |
| | STORE NUMERICAL VALUE IN Age |
| | STORE CONCEPT INSTANCE OF List of <Organization> IN BelongsTo |
| SURFACE LAYER REQUEST RULE | ABIDE BY WORD ORDER OF "mike" [MiddleName] [LastName] |
| | ABIDE BY WORD ORDER OF "mike" [Sex] or [Age] or [BelongsTo] |
| | ABIDE BY RULE OF "NOUN" OF ENGLISH GRAMMAR |

FIG. 21
"Send to Mike"
FIG. 22
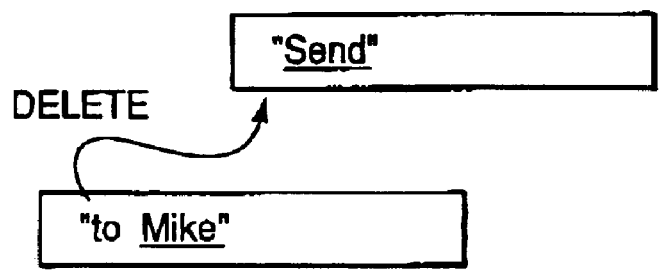
FIG. 23
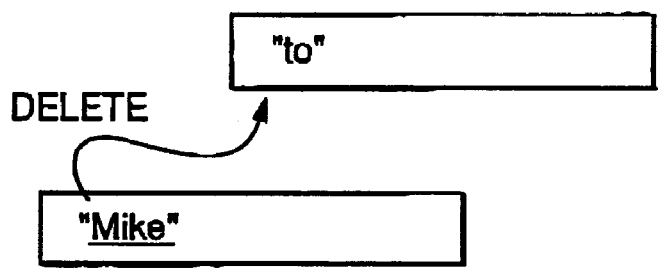
FIG. 24
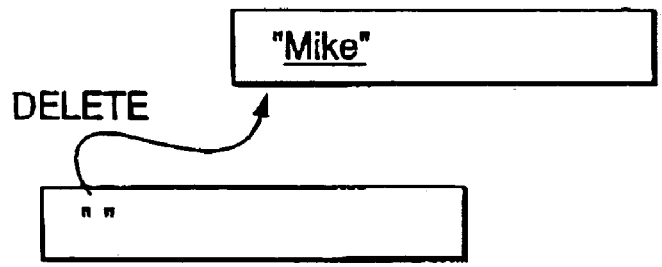

FIG. 25

INPUT INFORMATION CONCEPT
INSTANCE LIST

| ID | PROCESS OBJECT INFORMATION | CONCEPT INSTANCE |
|---|---|---|
| 1 | "Send" | CONCEPT 1 |
|   |   |   |
|   |   |   |
|   |   |   |
|   |   |   |

CONCEPT INSTANCE 1

| SLOT TYPE | INSTANCE |
|---|---|
| ConceptType | Send |
|   |   |
|   |   |

FIG. 26

INPUT INFORMATION CONCEPT INSTANCE LIST

| ID | PROCESS OBJECT INFORMATION | CONCEPT INSTANCE |
|---|---|---|
| 1 | "Send" | CONCEPT 1 |
| 2 | "to" | CONCEPT 2 |
| | | |
| | | |
| | | |

CONCEPT INSTANCE 1

| SLOT TYPE | INSTANCE |
|---|---|
| ConceptType | Send |
| | |
| | |

CONCEPT INSTANCE 2

| SLOT TYPE | INSTANCE |
|---|---|
| ConceptType | Concept |
| | |
| | |

FIG. 27

INPUT INFORMATION CONCEPT INSTANCE LIST

| ID | PROCESS OBJECT INFORMATION | CONCEPT INSTANCE |
|---|---|---|
| 1 | "Send" | CONCEPT 1 |
| 2 | "to" | CONCEPT 2 |
| 3 | "Mike" | CONCEPT 3 |
| | | |
| | | |

CONCEPT INSTANCE 1

| SLOT TYPE | INSTANCE |
|---|---|
| ConceptType | Send |
| | |
| | |

CONCEPT INSTANCE 2

| SLOT TYPE | INSTANCE |
|---|---|
| ConceptType | Concept |
| | |
| | |

CONCEPT INSTANCE 3

| SLOT TYPE | INSTANCE |
|---|---|
| ConceptType | Person |
| | |

FIG. 28

INPUT INFORMATION CONCEPT INSTANCE LIST

| ID | PROCESS OBJECT INFORMATION | CONCEPT INSTANCE |
|---|---|---|
| 1 | "Send" | CONCEPT 1 |
| 2 | "to" | CONCEPT 2 |
| 3 | "Mike" | CONCEPT 3 |
|  |  |  |
|  |  |  |

CONCEPT INSTANCE 1

| SLOT TYPE | INSTANCE |
|---|---|
| ConceptType | Send |
|  |  |
|  |  |

CONCEPT INSTANCE 2

| SLOT TYPE | INSTANCE |
|---|---|
| ConceptType | Concept |
|  |  |
|  |  |

CONCEPT INSTANCE 3

| SLOT TYPE | INSTANCE |
|---|---|
| ConceptType | Person |
| FirstName | "mike" |
| Sex | male |

FIG. 29

INPUT INFORMATION CONCEPT INSTANCE LIST

| ID | PROCESS OBJECT INFORMATION | CONCEPT INSTANCE |
|---|---|---|
| 1 | "Send" | CONCEPT 1 |
|  |  |  |
|  |  |  |
|  |  |  |
|  |  |  |

CONCEPT INSTANCE 1

| SLOT TYPE | INSTANCE |
|---|---|
| ConceptType | Send |
| To | CONCEPT 3 |
|  |  |

CONCEPT INSTANCE 3

| SLOT TYPE | INSTANCE |
|---|---|
| ConceptType | Person |
| FirstName | "mike" |
| Sex | male |

FIG. 37

APPLICABLE REQUEST LIST

| ID | APPLICABLE REQUEST INFORMATION | INSTANCE | ORIGINAL REQUEST INFORMATION | ORIGINAL REQUEST ID |
|---|---|---|---|---|
| 1 | STORE CONCEPT INSTANCE OF List of <Person> IN Actor | CONCEPT 3 | 1 | 1 |
| 2 | STORE CONCEPT INSTANCE OF List of <Object> IN Object | CONCEPT 3 | 1 | 2 |
| 3 | STORE CONCEPT INSTANCE OF List of <Person> or <Space> IN To | CONCEPT 3 | 1 | 4 |
| 4 | STORE "Mike" IN FirstName | NONE | 3 | 1 |
| 5 | STORE CHARACTER STRING IN MiddleName | CONCEPT 1 | 3 | 2 |
| 6 | STORE CHARACTER STRING IN MiddleName | CONCEPT 2 | 3 | 2 |
| 7 | STORE CHARACTER STRING IN LastName | CONCEPT 1 | _3_ | 3 |
| 8 | STORE CHARACTER STRING IN LastName | CONCEPT 2 | _3_ | 3 |
| 9 | STORE Male IN Sex | NONE | 3 | 4 |
|  |  |  |  |  |

FIG. 38

APPLICABLE REQUEST LIST

| ID | APPLICABLE REQUEST INFORMATION | INSTANCE | ORIGINAL REQUEST INFORMATION | ORIGINAL REQUEST ID |
|---|---|---|---|---|
| 1 | STORE CONCEPT INSTANCE OF List of <Person> IN Actor | CONCEPT 3 | 1 | 1 |
| 2 | STORE CONCEPT INSTANCE OF List of <Object> IN Object | CONCEPT 3 | 1 | 2 |
| 3 | STORE CONCEPT INSTANCE OF List of <Person> or <Space> IN To | CONCEPT 3 | 1 | 4 |
| 4 | STORE CHARACTER STRING IN MiddleName | CONCEPT 1 | 3 | 2 |
| 5 | STORE CHARACTER STRING IN MiddleName | CONCEPT 2 | 3 | 2 |
| 6 | STORE CHARACTER STRING IN LastName | CONCEPT 1 | <u>3</u> | 3 |
| 7 | STORE CHARACTER STRING IN LastName | CONCEPT 2 | <u>3</u> | 3 |
|  |  |  |  |  |

FIG. 39

APPLICABLE REQUEST LIST

| ID | APPLICABLE REQUEST INFORMATION | INSTANCE | ORIGINAL REQUEST INFORMATION | ORIGINAL REQUEST ID |
|---|---|---|---|---|
| 1 | STORE "Mike" IN FirstName | NONE | 3 | 1 |
| 2 | STORE Male IN Sex | NONE | 3 | 4 |
| | | | | |

FIG. 40

APPLICABLE REQUEST LIST

| ID | APPLICABLE REQUEST INFORMATION | INSTANCE | ORIGINAL REQUEST INFORMATION | ORIGINAL REQUEST ID |
|---|---|---|---|---|
| 1 | STORE CONCEPT INSTANCE OF List of <Person> or <Space> IN To | CONCEPT 3 | 1 | 4 |
| | | | | |

CONCEPT INSTANCE 1

| SLOT TYPE | INSTANCE |
|---|---|
| ConceptType | File |
| Name | "c: MyDoc\Report\June1998.doc" |
|  |  |

CONCEPT INSTANCE LIST

| ID | PROCESS OBJECT INFORMATION | CONCEPT INSTANCE |
|---|---|---|
| 1 | IMAGE SCREEN OPERATION | CONCEPT 1 |
|  |  |  |
|  |  |  |
|  |  |  |
|  |  |  |

FIG. 54

CONCEPT INSTANCE 1

| SLOT TYPE | INSTANCE |
|---|---|
| ConceptType | File |
| Name | "c: MyDoc\Report\June1998.doc" |
| | |

CONCEPT INSTANCE LIST

| ID | PROCESS OBJECT INFORMATION | CONCEPT INSTANCE |
|---|---|---|
| 1 | SPEECH INPUT | CONCEPT 2 |
| | | |
| | | |
| | | |
| | | |

CONCEPT INSTANCE 2

| SLOT TYPE | INSTANCE |
|---|---|
| ConceptType | Send |
| Object | CONCEPT 1 |
| To | CONCEPT 4 |
| | |

CONCEPT INSTANCE 4

| SLOT TYPE | INSTANCE |
|---|---|
| ConceptType | Person |
| FirstName | "mike" |
| Sex | male |

FIG. 55

CONCEPT File DEFINITION

| SLOT TYPE | INSTANCE APPLICATION RULE | INSTANCE REQUEST RULE |
|---|---|---|
| Concept Type | File | File |
| Name | CHARACTER STRING | CHARACTER STRING |

FIG. 56

REQUEST LIST

| ID | INPUT ID | CONCEPT REQUEST |
|---|---|---|
| 1 | 1 | REQUEST 1 |
| | | |
| | | |
| | | |
| | | |

INPUT INFORMATION CONCEPT INSTANCE LIST

| ID | PROCESS OBJECT INFORMATION | CONCEPT INSTANCE |
|---|---|---|
| 1 | "Send" | CONCEPT 2 |
| | | |
| | | |
| | | |
| | | |

REQUEST 1

| ID | REQUEST |
|---|---|
| 1 | STORE CONCEPT INSTANCE OF List of <Person> IN Actor |
| 2 | STORE CONCEPT INSTANCE OF List of <Object> IN Object |
| 3 | STORE CONCEPT INSTANCE STORED IN Actor IN From |
| | |

INPUT INFORMATION STORAGE TABLE

| INPUT ID | KIND | CONTENTS |
|---|---|---|
| 1 | HAND-WRITTEN INFORMATION | "c: \MyDoc\Report\June1998.Doc" |
| 2 | KEY INFORMATION | " " |
| 3 | SPEECH INFORMATION | "Send to Mike" |

CONCEPT INSTANCE 1

| SLOT TYPE | INSTANCE |
|---|---|
| ConceptType | File |
| Name | "c: MyDoc\Report\June1998.doc" |
|  |  |

CONCEPT INSTANCE LIST

| ID | PROCESS OBJECT INFORMATION | CONCEPT INSTANCE |
|---|---|---|
| 1 | HAND-WRITTEN INPUT | CONCEPT 1 |
|  |  |  |
|  |  |  |
|  |  |  |

FIG. 66

CONCEPT INSTANCE 1

| SLOT TYPE | INSTANCE |
|---|---|
| ConceptType | File |
| Name | "c: MyDoc\Report\June1998.doc" |
| | |

CONCEPT INSTANCE LIST

| ID | PROCESS OBJECT INFORMATION | CONCEPT INSTANCE |
|---|---|---|
| 1 | SPEECH INPUT | CONCEPT 2 |
| | | |
| | | |
| | | |
| | | |

CONCEPT INSTANCE 2

| SLOT TYPE | INSTANCE |
|---|---|
| ConceptType | Send |
| Object | CONCEPT 1 |
| To | CONCEPT 4 |
| | |

CONCEPT INSTANCE 4

| SLOT TYPE | INSTANCE |
|---|---|
| ConceptType | Person |
| FirstName | "mike" |
| Sex | male |

FIG. 72

INPUT INFORMATION STORAGE TABLE

| INPUT ID | INPUT TIME | KIND | CONTENTS |
|---|---|---|---|
| 1 | 13:45:11 | SPEECH INFORMATION | "Send" |
| 2 | 13:45:12 | KEY INFORMATION | "c : \MyDoc\Report\June1998.Doc" |
| 3 | 13:45:13 | SPEECH INFORMATION | "to" |
| 4 | 13:45:14 | HAND-WRITTEN INFORMATION | "John" |
| 5 | 13:45:15 | SPEECH INFORMATION | "at" |
| 6 | 13:45:16 | IMAGE INFORMATION | "53, Nakahara-ku Kawasaki-shi" |

FIG. 73

INPUT INFORMATION CONCEPT INSTANCE GENERATION PROCESS INFORMATION

"Send c: \MyDoc\Report\June1998.Doc to John at 53, Nakahara-ku Kawasaki-shi"

INFORMATION PROCESSING APPARATUS AND METHOD CAPABLE OF PROCESSING PLURALITY TYPE OF INPUT INFORMATION

BACKGROUND OF THE INVENTION

1. Field of the Invention

The present invention relates to an information processing apparatus and method for processing a plurality type of input information.

2. Related Background Art

A conventional information processing apparatus having a keyboard, an OCR, an on-line hand-written character recognition unit and a speech recognition unit can generate character information by recognizing key input information, character images on a paper sheet, input hand-written character information, and input speech information. However, such an apparatus defines in advance character information to be generated for each piece of input information, and generates the character information by referring to such definitions. Therefore, it cannot deal with combined inputs from a plurality of input units described above.

Furthermore, the conventional apparatus aims at only acquiring character information of input information. It is therefore impossible to realize natural interaction using natural languages in a manner like peoples can do. An operator is therefore required to always consider the function of each application and the operation method suitable for the function. It is impossible to consider only the contents which result from using each application.

SUMMARY OF THE INVENTION

It is an object of the invention to provide an information processing apparatus and method capable of processing a combination of information supplied from a plurality type of input units.

It is another object of the invention to provide an information processing apparatus and method capable of realizing natural interaction using natural languages without considering the function of each application and the operation method suitable for the function.

According to one aspect, the present invention which achieves these objectives relates to an information processing apparatus comprising: input means for inputting a plurality type of information; and input analyzing means for analyzing a combination of at least two types of information input from the input means.

According to another aspect, the present invention which achieves these objects relates to an information processing method comprising an input step of inputting a plurality type of information; and an input analyzing step of analyzing a combination of at least two types of information input by the input step.

According to still another aspect, the present invention which achieves these objectives relates to a computer-readable storage medium storing an information processing program for controlling a computer to perform information processing, the program comprising codes for causing the computer to perform an input step of inputting a plurality type of information; and an input analyzing step of analyzing a combination of at least two types of information input by the input step.

Other objectives and advantages besides those discussed above shall be apparent to those skilled in the art from the description of preferred embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 shows examples of concept instances to be generated and referred to.

FIG. 7 is a diagram illustrating the definition of a concept Concept.

FIG. 8 is a diagram illustrating the definition of a concept Action.

FIG. 9 is a diagram illustrating the definition of a concept Trans.

FIG. 10 is a diagram illustrating the definition of a concept Get.

FIG. 11 is a diagram illustrating the definition of a concept Send.

FIG. 16 is a diagram showing a knowledge database.

FIG. 17 is a diagram showing information of a combination of an input character string "send" and information necessary for generating the concept instance.

FIG. 18 is a diagram illustrating the definition of a concept Person.

FIG. 19 is a diagram showing information of a combination of an input character string "mike" and information necessary for generating the concept instance.

FIGS. 21, 22, 23 and 24 are diagrams showing examples of process object information.

FIGS. 25, 26, 27, 28 and 29 are diagrams showing examples of an input information concept instance list.

FIGS. 37, 38, 39 and 40 are diagrams showing examples of an applicable request list.

FIG. 54 is a diagram illustrating the definition of a concept File.

FIG. 55 is a diagram showing a request list.

FIG. 56 is a diagram showing a concept instance list unified by the concept instance unification process.

FIG. 66 is a diagram showing a concept instance list unified by the concept instance list unification process.

FIG. 72 is a diagram showing an example of the input information storage table.

FIG. 73 is a diagram showing an example of generation object information.

DETAILED DESCRIPTION OF THE PREFERRED EMBODIMENTS

First Embodiment

A first preferred embodiment of the invention will be described in detail with reference to the accompanying drawings.

Figure 1:
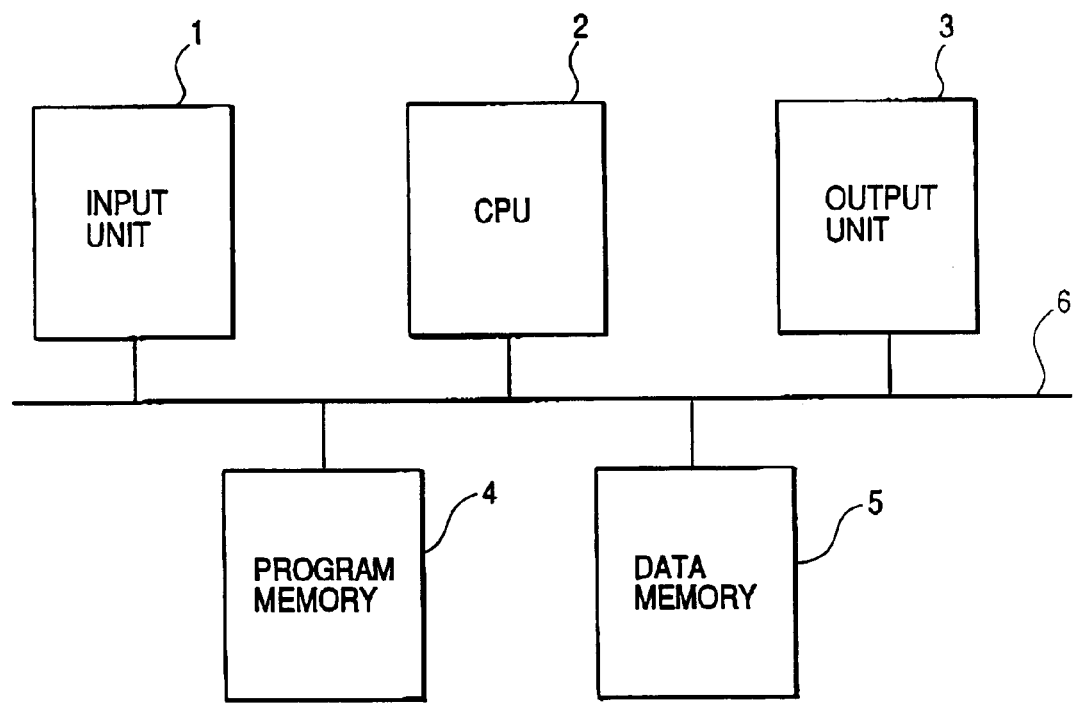
FIG. 1 is a block diagram showing the hardware structure of an information processing apparatus according to an embodiment of the invention.

FIG. 1 is a block diagram showing the hardware structure of an information processing apparatus according to an embodiment of the invention.

In FIG. 1, reference numeral 1 represents an input unit for inputting information. Reference numeral 2 represents a CPU which executes arithmetic and logical calculations and the like for various processes and controls each component connected to a bus 6. Reference numeral 3 represents an output unit for outputting information.

Reference numeral 4 represents a program memory for storing programs including process sequences to be later described with reference to flow charts, the programs being used for the control by CPU 2. The program memory 4 may be a ROM or a RAM into which programs are loaded from an external storage unit.

Reference numeral 5 represents a data memory for storing data generated during various processes and storing knowledge of a knowledge database to be described later. The data memory 5 may be a RAM. Knowledge may be loaded in the knowledge database from an non-volatile external storage unit before the process is executed, or may be referred to when necessary.

The bus 6 is used for transferring an address signal, a control signal, and data to be exchanged between components. The address signal designates each component to be controlled by CPU 2, and the control signal controls each component.

Figure 2:
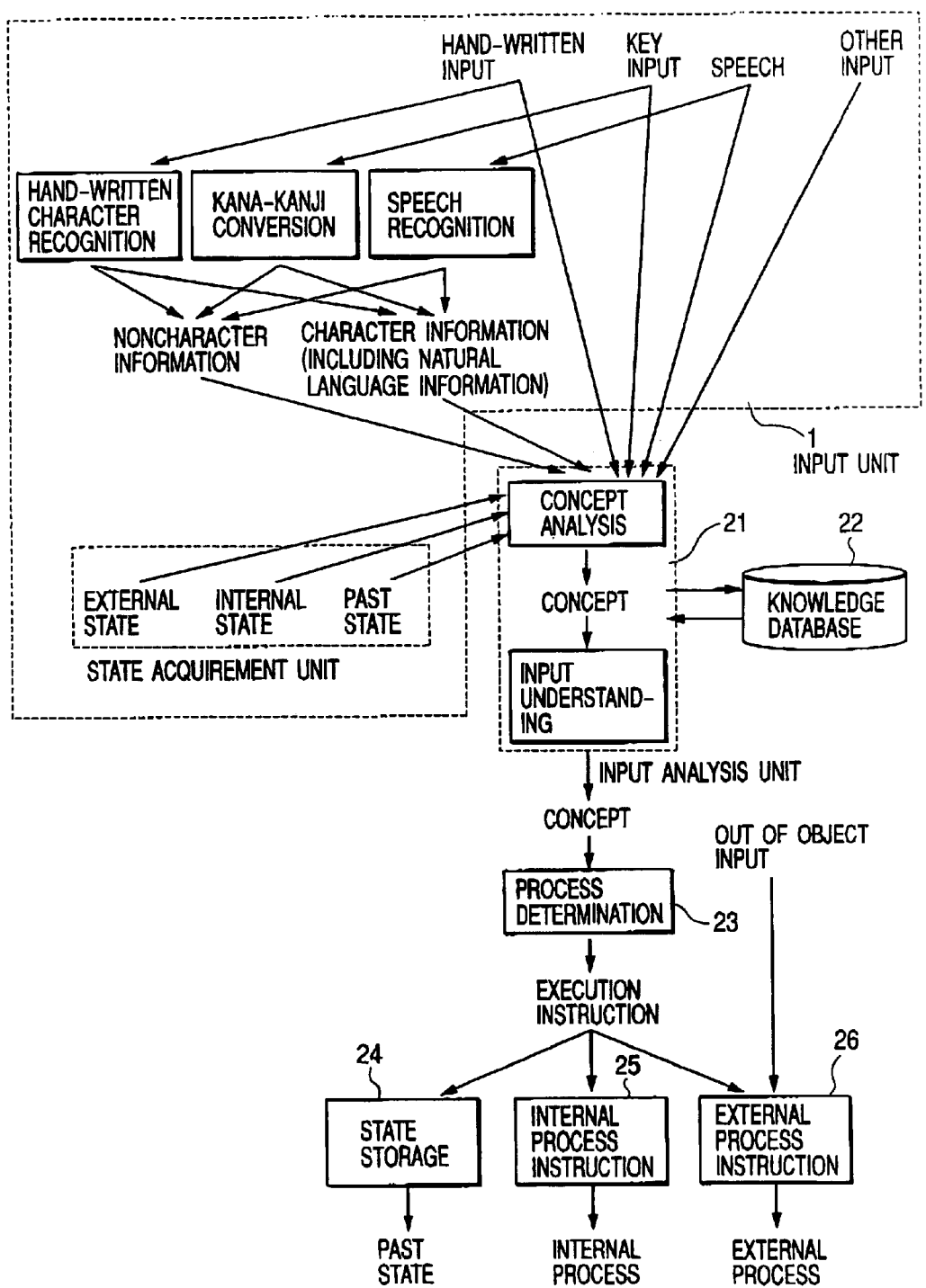
FIG. 2 is a functional block diagram showing the fundamental structure of the information processing apparatus of the embodiment.

FIG. 2 is a functional block diagram showing the fundamental structure of the information processing apparatus of the embodiment.

Referring to FIG. 2, the input unit 1 has two or more input mechanisms of different types for inputting information. These input mechanisms may be a hand-written information input board for inputting hand-written information, a keyboard for inputting key information, a microphone for inputting sound information such as speech information, a character recognition unit for optically reading characters of a document and recognizing them, or a receiver unit for receiving information from another system.

Information generated by other processes in the same apparatus may be used as input information. For example, such input information may be character information and non-character information generated from hand-written information recognized by the hand-written recognition unit, character information and non-character information generated by converting key input information by a kana-kanji conversion unit, or character information and non-character information generated from speech information recognized by the speech recognition unit.

Information generated by other processes in the same apparatus may be used as input information. For example, such input information may be an external state acquired by other processes or other apparatus, an internal state acquired by internal processes, or past state information already stored.

An input analysis unit 21 refers to knowledge in a knowledge database 22 to form a concept instance corresponding to information input from the input unit 1. A plurality of concept instances generated from input information are collectively analyzed to form a unified concept instance. The details thereof will be later described.

In accordance with the concept instance analyzed by the input analysis unit 21, a process determination unit 23 plans a method for achieving the object, determines a process, and executes it.

A state storage unit 24 stores current state information as the past state in response to an instruction from the process determination unit 23. In response to an instruction from the process determination unit 23, an internal process instruction unit 25 and an external process instruction unit 26 instruct an execution of an internal process and an external process, respectively.

The output unit 3 outputs data in accordance with a series of processes described above. For example, the output unit 3 may be a speech synthesizing unit for changing character information into speech and outputting it, a display unit such as a CRT and a liquid crystal display unit, a printer for printing characters on a paper sheet, or a transmitter unit such as a database for transmitting information to another apparatus. An output of the output unit 3 may be used as an input for another process of the same apparatus. Two or more of these units may be selectively used.

Figure 3:
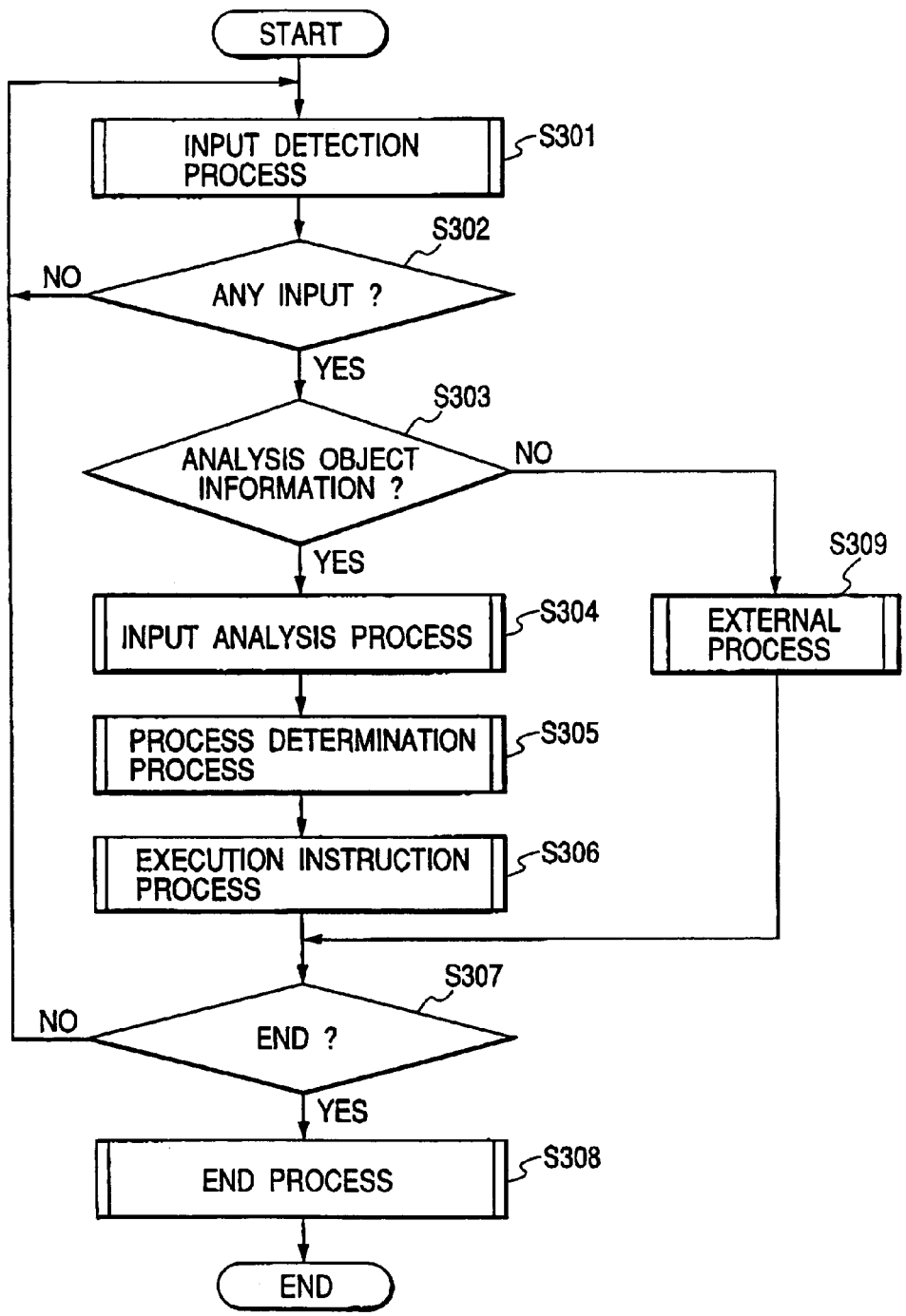
FIG. 3 is a flow chart illustrating the whole process of the information processing apparatus of the embodiment.

FIG. 3 is a flow chart illustrating the whole process of the information processing apparatus of the embodiment.

As the information processing apparatus of the embodiment is activated, an input is detected in an input detection process at Step S301. At next Step S302 it is checked whether there is an input to be processed. If not, the flow returns to Step S301 to repeat the process.

If it is judged at Step S302 that there is an input, the flow advances to Step S303 whereat it is judged whether the detected input information is to be subjected to an input analysis process.

If it is judged at Step S303 that the input information is to be subjected to the input analysis process, the flow advances to Step S304 whereat the input analysis process is executed to form concept instances from various input information. The concept instance will be later described.

In the next process determination process at Step S305, the concept instance is referred to determine a process to be executed.

In the next execution instruction process at Step S306, in order to execute the determined process, proper instructions are supplied to various process units.

If it is judged at Step S303 that the input is not to be analyzed, the flow advances to Step S309 whereat a corresponding external process is executed.

If it is judged at Step S307 after the execution instruction or the external process that the process should not be terminated, the flow returns to Step S301 to repeat the above processes.

If it is judged at Step S307 that the process should be terminated, the flow advances to Step S308 whereat an end process is executed to terminate the process of the information processing apparatus of the embodiment.

Figure 4:
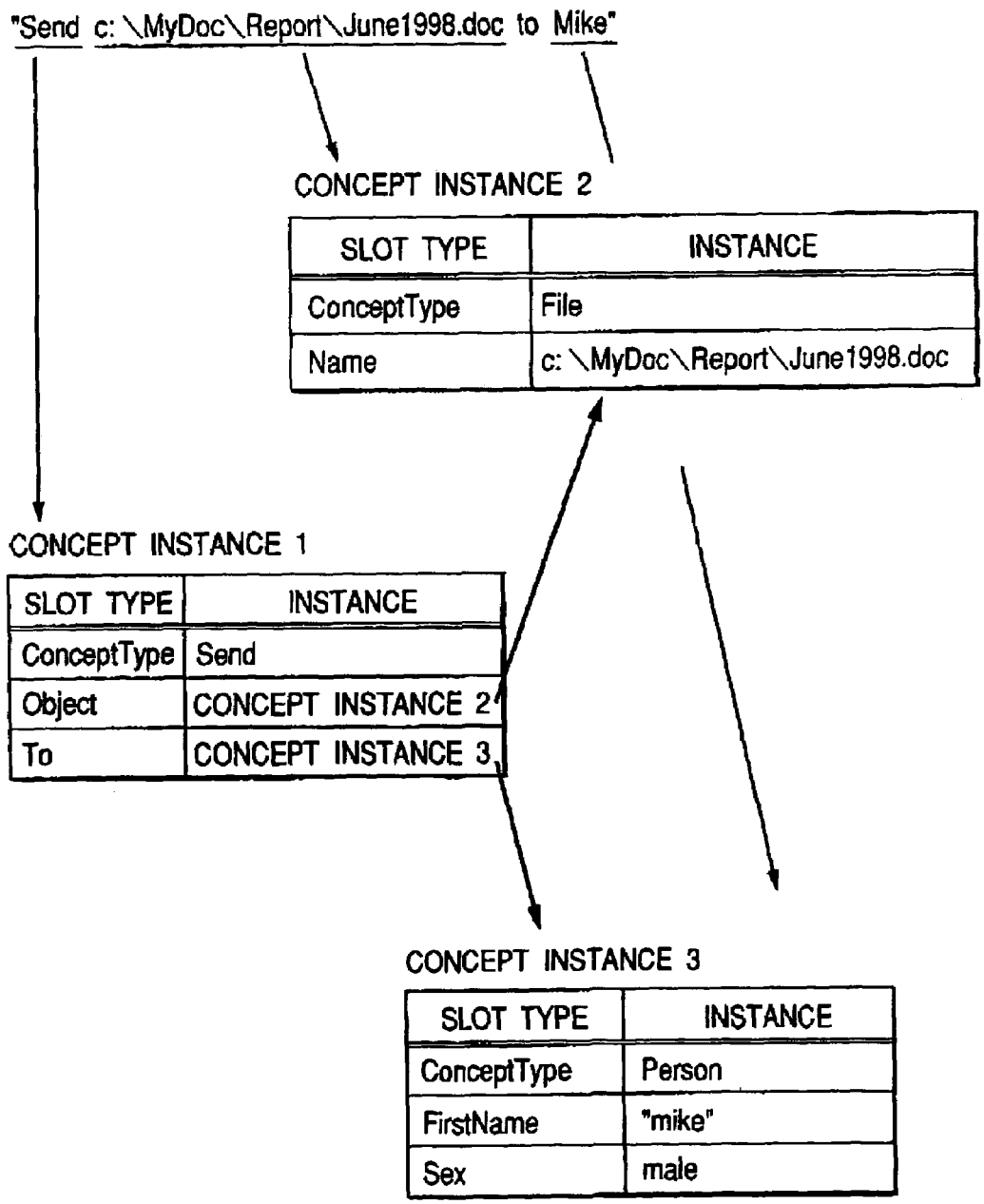

FIG. 4 shows examples of concept instances to be generated and referred to.

In the examples shown in FIG. 4, the concept instances are shown which are generated when a natural language sentence "Send c:\MyDoc\Report\June1998.doc to Mike" is input from the input unit 1.

As shown in FIG. 4, the concept instance is a collection of a slot type and a corresponding instance. In this embodiment, the concept instance always contains ConceptType as the slot type. An instance corresponding to ConceptType stores a value conforming to the definition of ConceptType to be later described.

More specifically, the first constituent "Send" of the input natural language sentence is formed as a concept instance 1 represented by ConceptType=Send, the second constituent "c:\MyDoc\Report\June1998.doc" is formed as a concept instance 2 represented by ConceptType=File, and the third constituent "Mike" is formed as a concept instance 3 represented by ConceptType=Person.

The concept instances 2 and 3 are related to the instances of "Object" and "To" of the concept instance 1.

The process of forming a concept instance will be later described.

Figure 5:
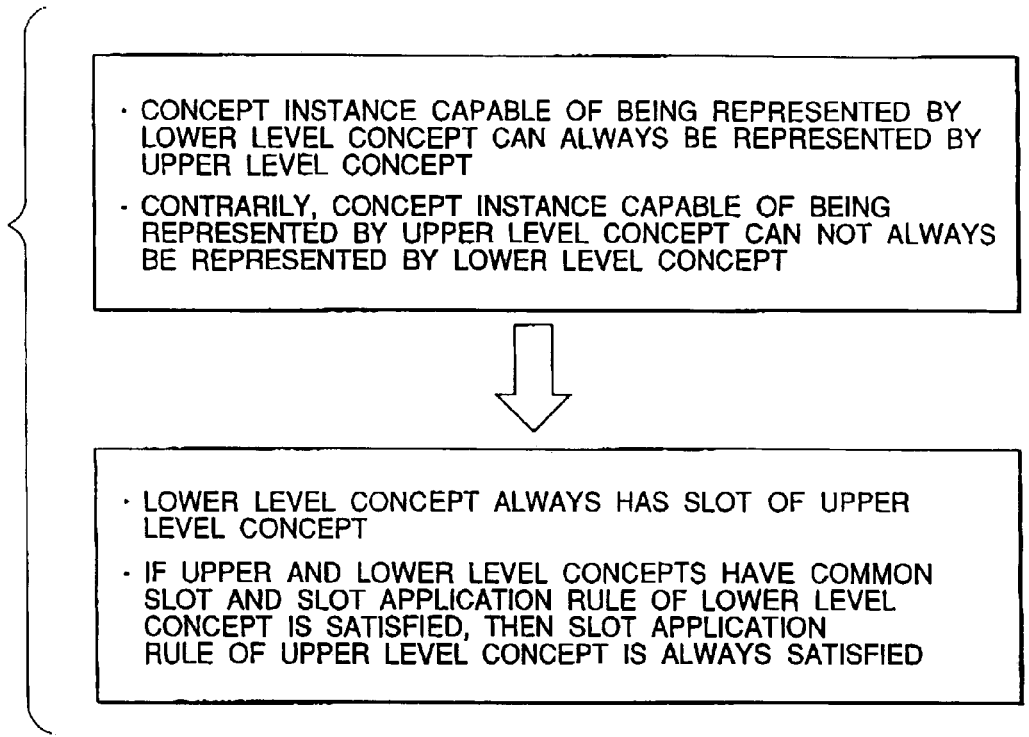
FIG. 5 is a diagram illustrating the definition of a relation between concepts, this definition being used as a standard for the concept instance.

FIG. 5 is a diagram illustrating the definition of a relation between concepts, this definition being used as a standard for the concept instance.

As shown in FIG. 5, a lower level concept instance is formed by detailing and fracturing the upper level concept instance.

The hierarchical relation of concept instances will be described. In order to make it easy to understand, an example easy to understand will be used although this example is not directly related to the description given later.

For example, a concept instance representing "bird" is the lower level concept of "animal" and the upper level concept of "sea-gull". Namely, although it can be said that "bird" is "animal", it cannot always be said that "bird" is "sea-gull".

The definition shown FIG. 5 clearly defines the above relation as data. The definition includes "lower level concept always has slot of upper level concept" and "if upper and lower level concepts have common slot and slot application rule of lower level concept is satisfied, then slot application rule of upper level concept is always satisfied".

Figure 6:
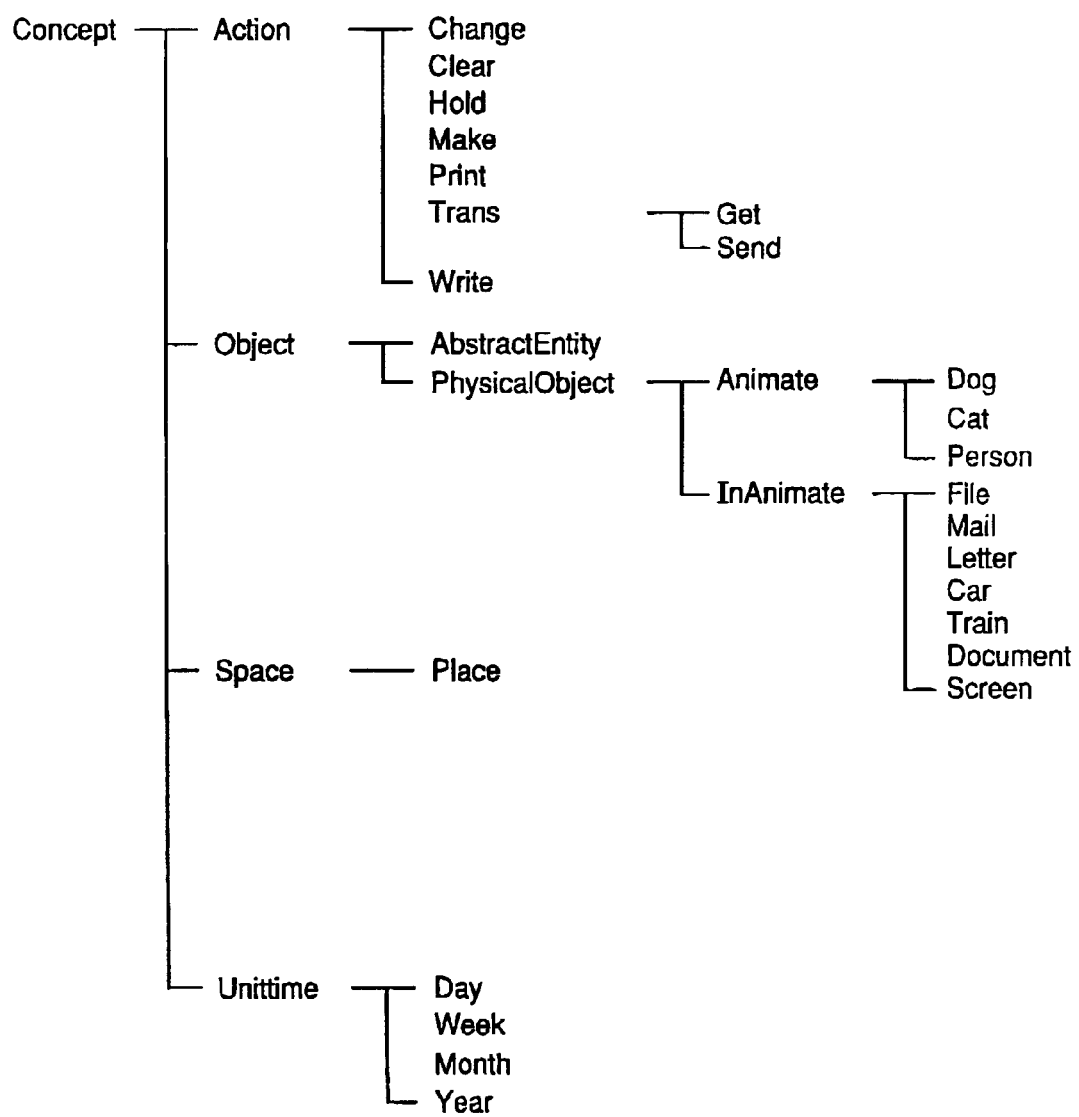
FIG. 6 is a diagram illustrating the definition of instances of concept instances corresponding to a slot ConceptType.

FIG. 6 is a diagram illustrating the definition of concept instances corresponding to a slot ConceptType.

Concept is defined at the root of the concept tree shown in FIG. 6. As shown, all concepts include Concept and lower level concepts than Concept. Therefore, all concepts can be represented by Concept.

The lower level concepts just under Concept define Action, Object, Space, Unittime and the like. Other lower level concepts also define various concepts.

For example, the concepts Get and Send are defined as the lower level concepts of upper level concepts of Trans, Action and Concept in this order.

FIGS. 7 to 11 are diagrams illustrating the definitions of concepts, the definitions being used as a standard for the concept instances. The definitions of these concepts are stored as knowledge in the knowledge database.

Each concept defines: a slot type of a slot which the concept can have; an application rule for checking whether the instance can be applied to the slot; and a request rule for requesting a corresponding instance. A difference between the application rule and request rule resides in that although the application rule is used for checking whether the instance can be applied to the slot, the request rule is used for positively searching the instance. Namely, it can be said that the slot with the defined request rule requests an instance more than other slots.

The concept Concept shown in FIG. 7 has only the ConceptType slot, the instance application rule is defined as a fixed value Concept, and the instance request rule is also defined as a fixed value Concept.

The concept Action shown in FIG. 8 inherits the slot ConceptType of the upper level concept Concept. However, the instance application rule and instance request rule are replaced by a fixed value Action. As described with respect to the definition of ConceptType, Action is a lower level concept of Concept so that the definition of the relation between concepts can be satisfied.

The concept Action also has slots of the slot types Actor, Object, From and To which the instance application rule and instance request rule are defined. For example, the Actor slot stores only the instance of the concept Person.

The concept Trans shown in FIG. 9 inherits the slots ConceptType, Actor, Object, From and To of the upper level concept Action. In this case, only the ConceptType is replaced by a fixed value Trans, and the other instance application and request rules are inherited.

The concept Get shown in FIG. 10 inherits all the slots of the upper level concept Trans. However, ConceptType is replaced by Get and the instance of To is the same as that of the Actor slot to thus replace the instance application and request rules.

The concept Send shown in FIG. 11 inherits all the slots of the upper level concept Trans. However, ConceptType is replaced by Send and the instance of From is the same as that of the Actor slot to thus replace the instance application and request rules.

Figure 12:
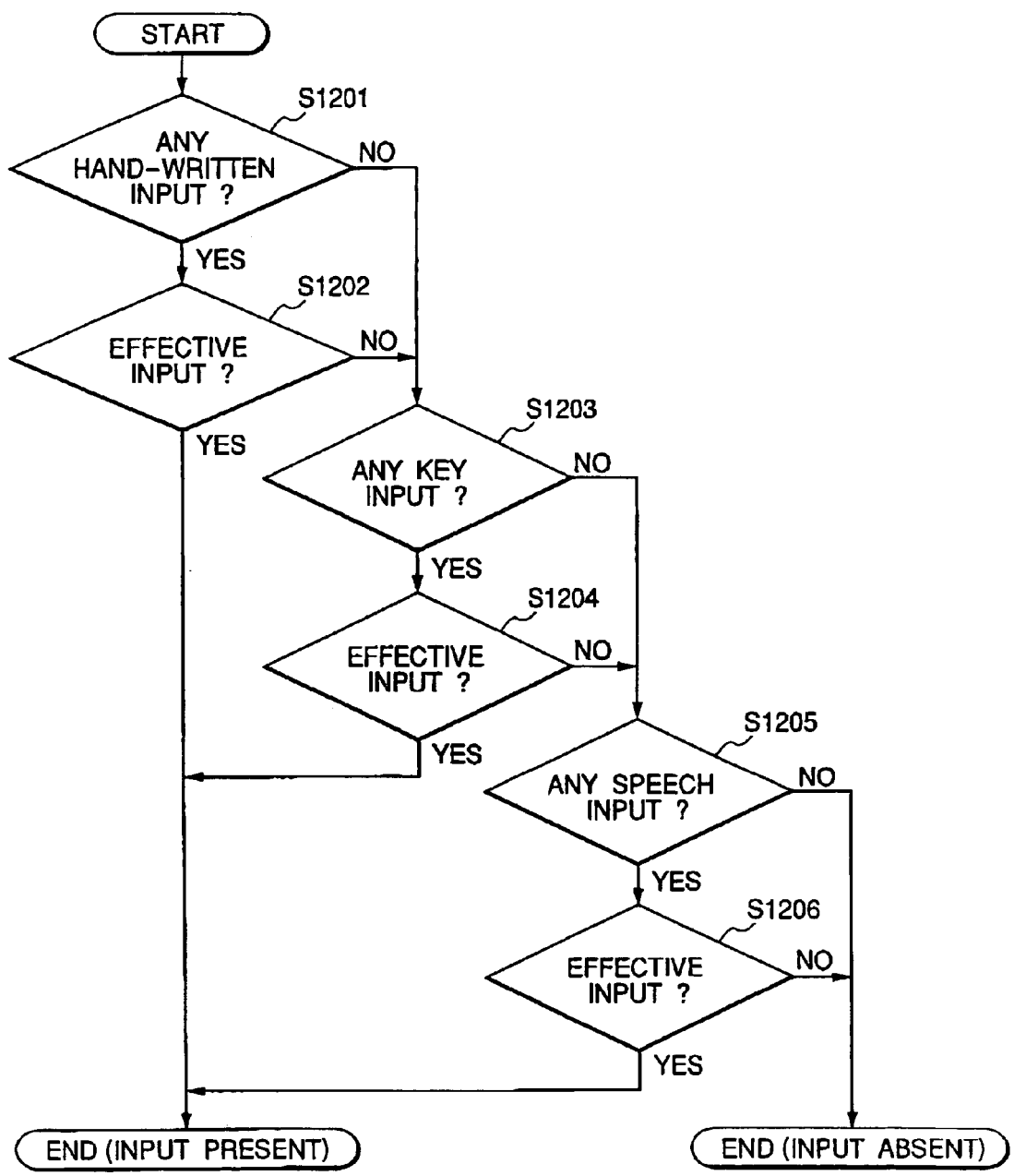
FIG. 12 is a flow chart illustrating an input detection process.

FIG. 12 is a flow chart illustrating the input detection process at Step S301.

In the input detection process of the embodiment, it is checked whether there is any effective input information to be processed by the information processing apparatus.

More specifically, as the input detection process is activated, it is checked at Step S1201 whether there is a handwritten input. If there is a hand-written input, it is checked at next Step S1202 whether the input information IS effective. If it is judged that the input information is effective, it is judged as "input present" to thereafter terminate the process.

If it is judged that there is no effective input, it is judged at Step S1203 whether there is a key input, and it is judged at next Step S1204 whether the input information is effective. If it is judged that the input information is effective, it is judged as "input present" to thereafter terminate the process.

If it is judged that there is no effective input, it is judged at Step S1205 whether there is a speech input, and it is judged at next Step S1206 whether the input information is effective. If it is judged that the input information is effective, it is judged as "input present" to thereafter terminate the process.

If it is judged at all judgement Steps that there is no effective input, it is judged as "input absent" to thereafter terminate the process.

Figure 13:
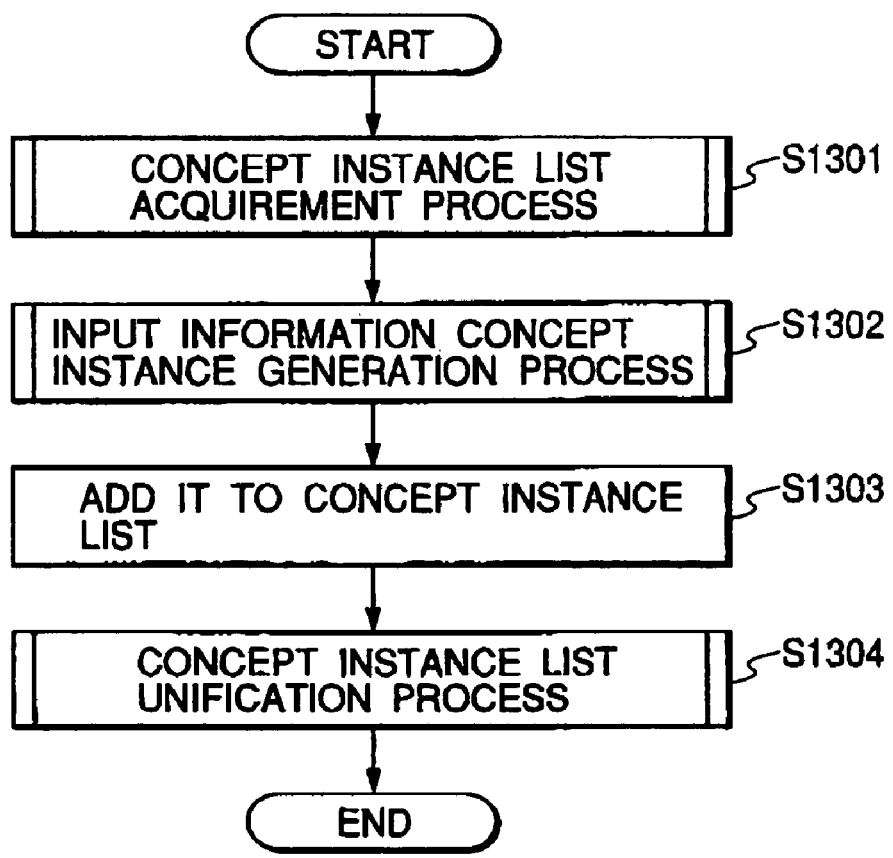
FIG. 13 is a flow chart illustrating an input analysis process.

FIG. 13 is a flow chart illustrating the input analysis process at Step S304.

In the input analysis process, a concept instance list is generated, the concept instance list storing concept instances generated in accordance with the state at the time when the information is input, the past state, and the input information to be analyzed.

More specifically, as the input analysis process is activated, a concept instance list is generated by a concept instance acquirement process at Step S1301, which list stores concept instances generated in accordance with the state at the time when the information is input and the past state.

In an input information concept instance generation process at next Step S1302, an input information concept instance list is generated which stores concept instances generated from the input information to be analyzed. At next Step S1303 the input information concept instance list is added to the concept instance list.

In a concept instance list unification process at next Step S1304, by referring to the concept instances stored in the generated concept instance list, associated concept instances are unified to some concept to thereafter terminate the process.

Figure 14:
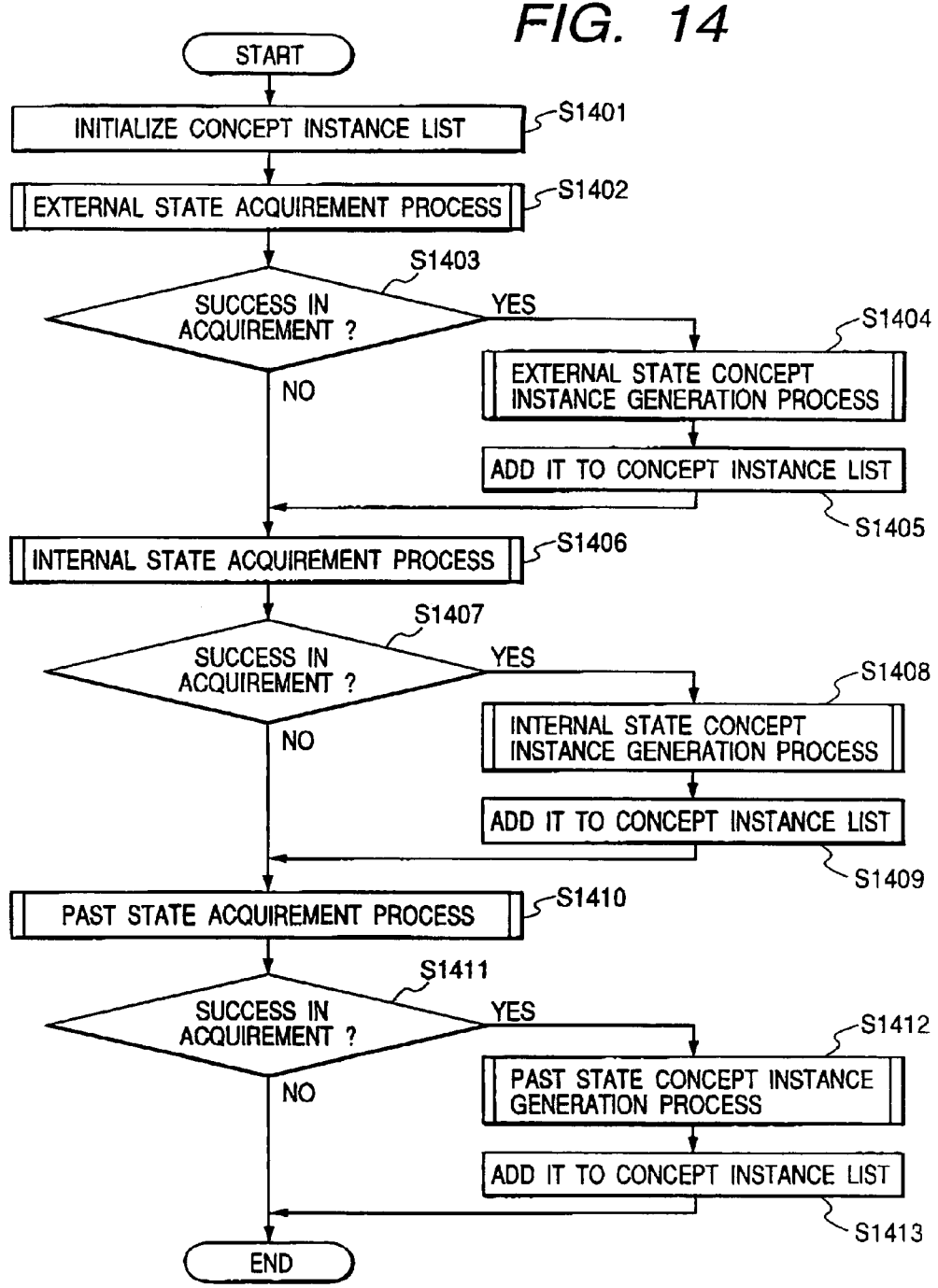
FIG. 14 is a flow chart illustrating a concept instance list acquirement process.

FIG. 14 is a flow chart illustrating the concept instance list acquirement process at Step S1301.

In the concept instance list acquirement process of this embodiment, the concept instance list is generated which stores concept instances generated in accordance with the state at the time when the information is input and the past state.

Specifically, as the concept instance list acquirement process is activated, at Step S1401 the concept instance list is initialized to make it empty.

In an external state acquirement process at next Step S1402, an external application and an external apparatus state are acquired. The external application can execute a process independently from another application although they run on the same information processing apparatus, and can perform a limited communication by utilizing services of OS or the like. For example, word processor software of A company and spreadsheet software of B company cannot be said as the same application although they run on the same PC. Although a function such as cut-and-paste can be realized by utilizing services of OS, a communication is limited.

If it is judged at next Step S1403 that acquirement succeeds, a concept instance corresponding to the acquired external state is generated by an external state concept instance generation process at Step S1404. At next Step S1405 the concept instance is added to the concept instance list. For example, if the external application displays a list of files, a concept instance Screen having a concept instance File indicating a selected file is generated. If an external application displays a screen indicating a print option, a concept instance Screen having a concept instance Print is generated. If a document is set to a scanner which is an example of the external apparatus, a concept instance Document is generated.

In an internal state acquirement process at next Step S1406, an internal state is acquired. The internal state is a state while an application function described above is realized in the information processing apparatus. Obviously, it is expected that detailed information may be acquired from an external.

If it is judged at next Step S1407 that acquirement succeeded, a concept instance corresponding to the acquired internal state is generated by an internal state concept instance generation process at Step S1408. At next Step S1409 the concept instance is added to the concept instance list.

In a past state acquirement process at next Step S1410, a past state is acquired. The past state is a state previously stored in the state storage unit 24 shown in FIG. 2 and acquired therefrom. For example, if a speech input "Send to Mike" is input after the file name is designated by a key input, the file name previously input is acquired as the past state.

If it is judged at next Step S1411 that acquirement succeeded, a concept instance corresponding to the acquired past state is generated by a past state concept instance generation process at Step S1412. At next Step S1413 the concept instance is added to the concept instance list.

Figure 15:
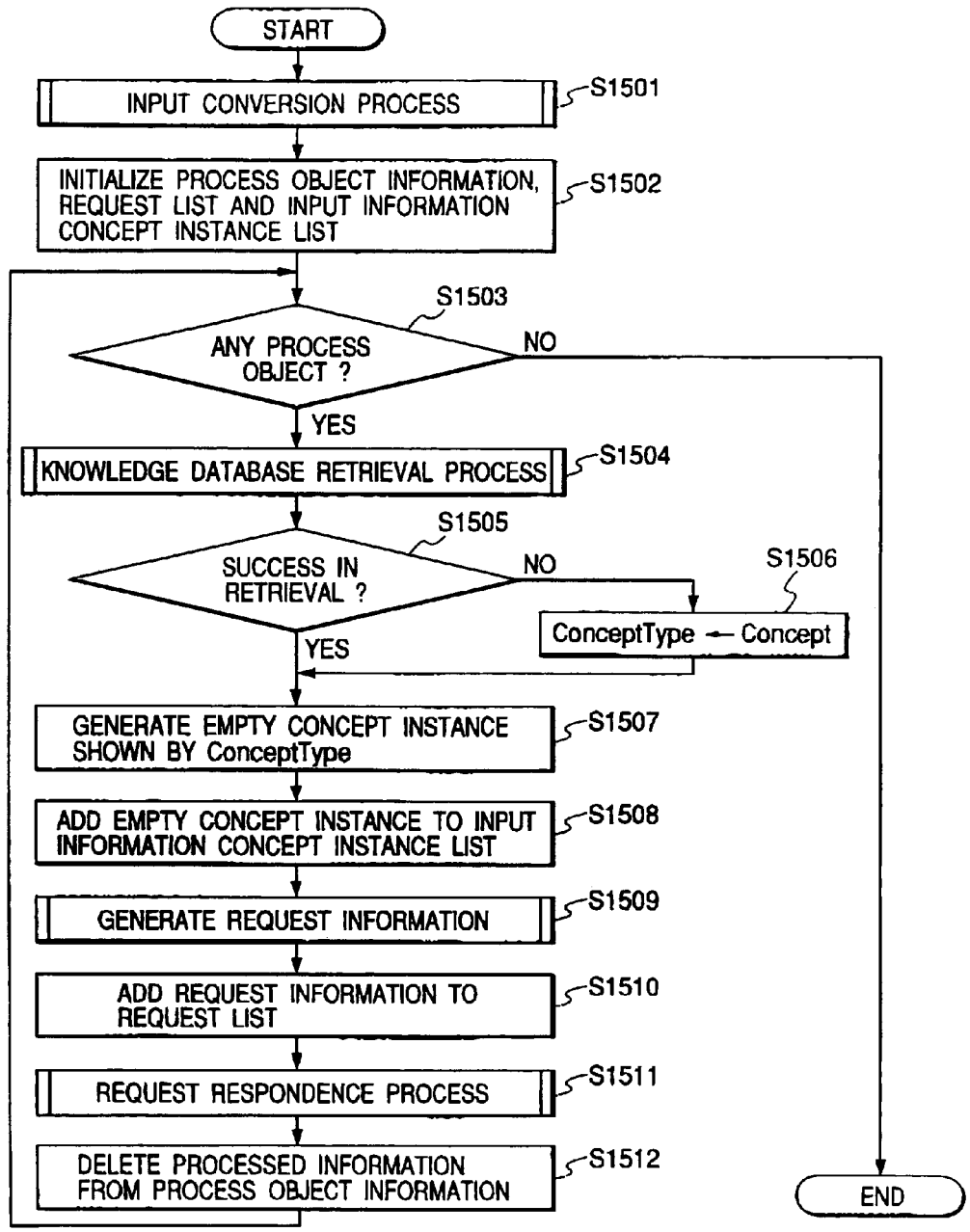
FIG. 15 is a flow chart illustrating an input information concept instance generation process.

FIG. 15 is a flow chart illustrating the input information concept instance generation process at Step S1302.

In the input information concept instance generation process, the input information concept instance list is generated which stores concept instances generated from input information to be analyzed.

Specifically, as the input information concept instance generation process is activated, in an input conversion process at Step S1501 the analysis object input information is converted into process object information which can be processed. For example, if the information stored in the knowledge database which is referred to by a knowledge database retrieval process to be described later, is constituted of an input character string and information necessary for generating a concept instance, the information input in the format different from a character string is converted into a character string capable of being retrieved. Namely, as shown in FIG. 2, if hand-written information is input, this information is converted into a character string by the hand-written character recognition process, if key information is input, this information is converted into a character string by a kana-kanji conversion process, and if speech information is input, this information is converted into a character string by the speech recognition process.

At next Step S1502 a request list to be referred to by a process to be described later and the input concept instance list are initialized to make them empty.

At next Step S1503 it is checked whether there is process object information. If not, the process is terminated. For example, if the process object information is not present at first, if processed process object information is deleted in the process to be later described, or if the process object information disappears, then the process is terminated.

If it is judged at Step S1503 that the process object information is present, then in a knowledge database retrieval process at next Step S1504, the knowledge database is searched by using the process object information to thereby acquire information necessary for generating the concept instance.

If it is judged at next Step S1505 that the retrieval failed, at Step S1506 ConceptType is changed to a definition value Concept. This is because in the information processing apparatus of the embodiment, it is assumed that all events in the world can be represented by the concept Concept and its lower level concepts. Namely, it means that even if the concept corresponding to the input information is not present in the knowledge database, it can be represented by the concept Concept.

At next Step S1507, of the information necessary for generating the concept instance acquired by the knowledge database retrieval process, ConceptType is referred to and an empty concept instance is generated by using the concept designated by ConceptType. For example, if the concept Send is retrieved by the knowledge database retrieval process, an empty concept instance of the concept Send is generated. If no concept is retrieved, an empty concept instance of the concept Concept is generated.

At next Step S1508, the generated empty concept instance is added to the input concept instance list.

In a request information generation process at next Step S1509, request information is generated by using a concept instance request rule contained in the information necessary for generating the concept instance acquired by the knowledge database retrieval process and by using an instance request rule defined by the concept designated by ConceptType. This request information is referred to by a request respondence process to be described later to store an initial value in the generated empty concept instance, to unify it with another concept instance stored in the input information concept instance list, and to execute other processes.

At next Step S1510 the generated request information is added to a request information list.

In a request respondence process at next Step S1511, the request information stored in the request information list is referred to, to store an initial value in the generated empty concept instance, to unify it with another concept instance stored in the input information concept instance list, and to execute other processes.

At next Step S1512, the processed information is deleted from the process object information to thereafter return to Step S1503 whereat it is checked whether process object information is still present. If present, the above processes are repeated.

FIG. 16 shows the knowledge database to be retrieved in the knowledge database retrieval process at Step S1504 in the input information concept instance generation process shown in FIG. 15.

As will be later described with reference to FIGS. 17 and 19, the knowledge database 22 stores information of a combination of an input character string and information necessary for generating the concept instance.

FIG. 17 is a diagram showing information of a combination of an input character string "send" and information necessary for generating the concept instance, both being stored in the knowledge database shown in FIG. 16.

The information of a combination of an input character string and information necessary for generating the concept instance, both being stored in the knowledge database 22, includes: a surface layer character string corresponding to the input character string; ConceptType; and a concept instance request rule and a surface layer request rule to be used for generating the concept instance.

ConceptType contained in the information stored in the knowledge database is the same as ConceptType designated by the definition of the concept already described with reference to FIGS. 4 to 11, and is determined by the result of the knowledge database retrieval process.

The concept instance request rule contained in the information stored in the knowledge database corresponds to the concept instance request rule generated from the instance request rule designated by the definition of the concept already described with reference to FIGS. 7 to 11. In the request information generation process to be later described, the request information is generated by using the instance request rule designated by the definition of the concept and the concept instance request rule contained in the information retrieved from the knowledge database.

The surface layer request rule contained in the information stored in the knowledge database is information basing upon a surface layer rule such as grammar and being independent from the meaning of each instance. In order to analyze input information not only from the concept corresponding to the meaning of an instance but also from the behavior of the input information on the surface layer, the surface layer request rule is referred to, to generate the request information by the request information generation process to be described later.

The example of "send" shown in FIG. 17 has a surface layer character string "send" and ConceptType=Send. Although the concept instance request rule has by chance quite the same value as the concept instance request rule generated from the definition of the concept Send shown in FIG. 11, a concept instance request rule which further limits the definition of the concept may be used depending upon each instance. Also in this case, it is necessary to always satisfy the instance application rule in the definition of the concept. If not satisfied, the input information is analyzed as having a different concept.

The surface layer request rule has also a request for stipulating the word order and a request for a grammar rule which indicates the behavior on the surface layer. Specifically, it is requested that the concept instance stored in a slot Object is positioned next to "send", then "to" is positioned, and then the concept instance stored in a slot To is positioned. It is also requested that the concept instance stored in the slot T is positioned next to "send", and then the concept instance stored in the slot Object. It is also requested that "to" is positioned next to "send", and then the concept instance stored in the slot To is positioned. It is also requested to abide by the "verb" rule of the English grammar and by the "present tense" rule of the English grammar.

FIG. 18 is a diagram illustrating the definition of the concept Person, the definition being used as the standard of the concept instance. Similar to each concept shown in FIGS. 7 to 11, the concept Person defines a slot type of a slot the concept can have, an application rule used for checking whether an instance can be applied to the slot, and a request rule used for requesting a corresponding instance.

The concept Person inherits the slot of ConceptType of the upper level concept. The instance application rule and instance request rule are replaced by a fixed value Person. The concept Person also has slots of slot types FirstName, MiddleName, LastName, Sex, Age, and BelongsTo to which the instance application and request rules are defined. For example, it means that only the instance of a character is string is stored in the slot FirstName.

FIG. 19 is a diagram showing information of a combination of an input character string "mike" and information necessary for generating the concept instance, both being stored in the knowledge database shown in FIG. 16. Similar to the information stored in the knowledge database shown in FIG. 17, the information of "mike" includes a surface layer character string, ConceptType, a concept instance request rule, and a surface layer request rule.

The example of "mike" shown in FIG. 19 has a surface layer character string "mike" and ConceptType Person. The concept instance request rule has a value different from the concept instance request rule generated from the definition of the concept Person shown in FIG. 18. Specifically, the definition of the concept Person shown in FIG. 18 stipulates only that FirstName is a character string, and the concept instance request rule of "mike" requests to store "mike". Further, although the definition of the concept Person stipulates only that Sex is either "male" or "female", the concept instance request rule of "mike" requests to store "male". Obviously, each satisfies the instance application rule in the definition of the concept Person. Namely, "mike" satisfies the instance application rule of the character string, and "male" satisfies the instance application rule of either "male" or "female".

The surface layer request rule has also a request for stipulating the word order and a request for a grammar rule which indicates the behavior on the surface layer. Specifically, it is requested that the concept instance stored in a slot MiddleName is positioned next to "mike", and then the concept instance stored in a slot LastName is positioned. It is also requested that the concept instance stored in a slot Sex or Age or BelongsTo is positioned next to "mike". It is also requested to abide by the "noun" rule of the English grammar.

Figure 20:
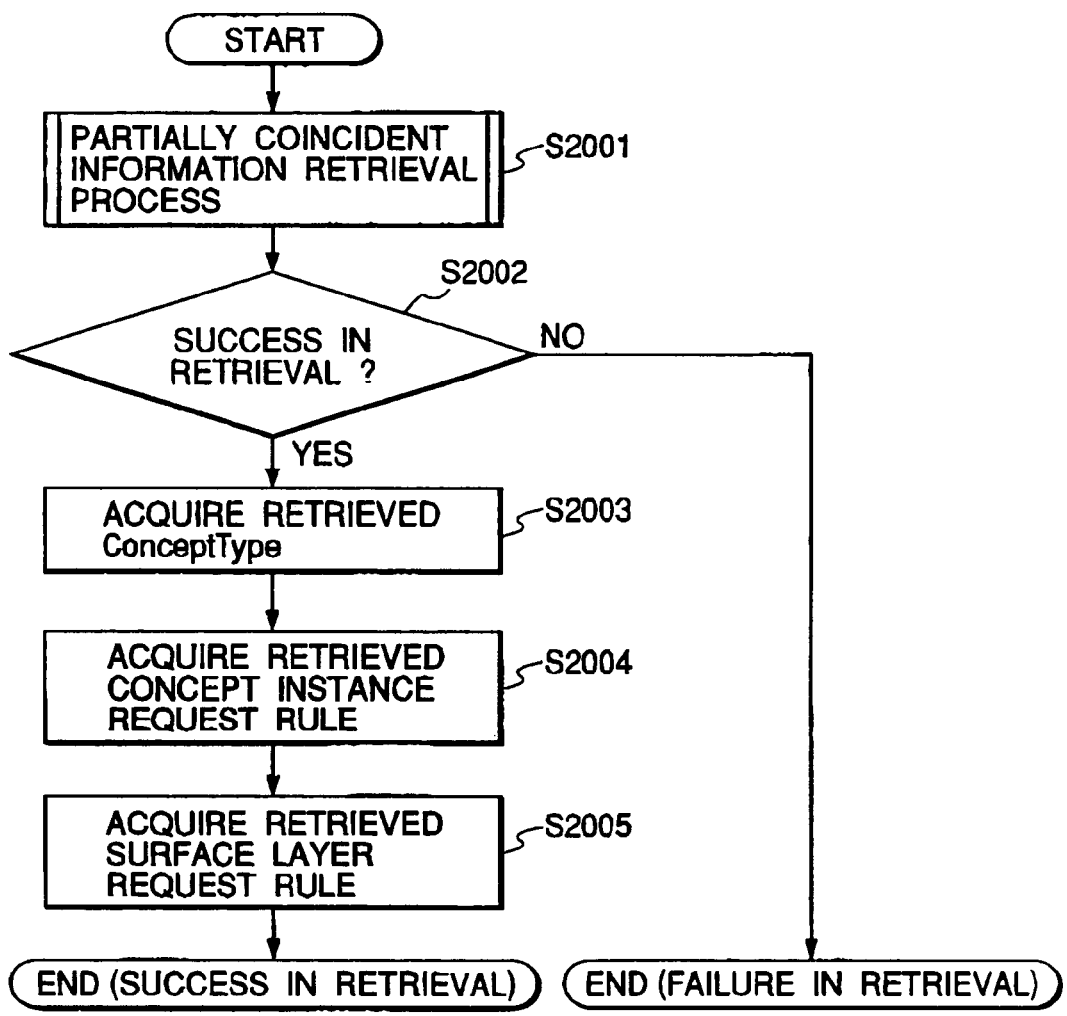
FIG. 20 is a flow chart illustrating a knowledge database retrieval process.

FIG. 20 is a flow chart illustrating the knowledge database retrieval process at Step S1504. In the knowledge database retrieval process, information having the surface layer character string coincident with a head portion of the process object information is retrieved from the knowledge database to thereby acquire information necessary for generating a concept instance.

Specifically, as the knowledge database retrieval process is activated, in a partially coincident information retrieval process at Step S2001, information having the surface layer character string coincident with a head portion of the process object information is retrieved from the knowledge database. For example, if the process object character string is "Send c:\MyDoc\Report\June1998.doc to Mike", this string is compared with the surface layer character string of the information stored in the knowledge database so that "send" shown in FIG. 17 can be retrieved. If it is judged at next Step S2002 that the retrieval failed, it is judged as a failure in retrieval to thereafter terminate the process.

If it is judged at Step S2002 that the retrieval succeeded, at next Step S2003 ConceptType is acquired, at next Step S2004 a concept instance request is acquired, and then at next Step S2005 a surface layer request rule is acquired. It is judged as a success in retrieval to thereafter terminate the process.

FIGS. 21 to 24 are diagrams showing examples of process object information to be initialized and updated by the input information concept instance generation process shown in FIG. 15. The process object information is information to be processed by the concept instance generation process. The input information concept instance generation process generates an input information concept instance by referring to the process object concept instance. This process is repeated until the process object information becomes absent, while a portion of the process object information is deleted for which the input information concept instance was generated.

In the example shown in FIG. 21, in accordance with the input information entered by an operator, the process object information is initialized to "Send to Mile". In the example shown in FIG. 22, processed "Send" is deleted from the process object information to update it to "to Mike". In the example shown in FIG. 23, processed "to" is deleted from the process object information to update it to "Mike". In the example shown in FIG. 24, processed "Mike" is deleted from the process object information to update it to " ". There is therefore no process object information to thereby terminate the input information concept instance generation process.

FIGS. 25 to 29 are diagrams showing examples of the input information concept instance list to be initialized and updated by the input information concept instance generation process shown in FIG. 15. The input information concept instance list is a list of concept instances generated in correspondence with the process object information. The input information concept instance generation process generates an input information concept instance by referring to the process object concept instance, and adds the generated input information concept instance to the input information concept instance list.

FIG. 25 is a diagram showing a concept instance 1 of ConceptType=Send generated by referring to the information necessary for generating a concept instance is corresponding to the process object information "Send" searched and acquired by the knowledge database retrieval process, and an input information concept instance list related to the concept instance 1.

FIG. 26 is a diagram showing, in addition to the information shown in FIG. 25, a concept instance 2 of ConceptType=Concept generated by referring to the information necessary for generating a concept instance corresponding to the process object information "to" searched and acquired by the knowledge database retrieval process, and an input information concept instance list related to the concept instance 2.

FIG. 27 is a diagram showing, in addition to the information shown in FIG. 26, a concept instance 3 of ConceptType=Person generated by referring to the information necessary for generating a concept instance corresponding to the process object information "Mike" searched and acquired by the knowledge database retrieval process, and an input information concept instance list related to the concept instance 3.

FIG. 28 shows the result that the generated request information is applied to the information shown in FIG. 27, wherein an instance "mike" is stored in the slot type First-Name of the concept instance 3, and an instance "male" is stored in the slot type Sex.

FIG. 29 shows the result that the generated request information is applied to the information shown in FIG. 28, wherein the concept instance 3 is stored in the slot type To of the concept instance 1, and the unified concept instances 2 and 3 are deleted from the input information concept instance list.

FIGS. 30 to 33 are diagrams showing examples of a request list initialized and updated by the input information concept instance generation process shown in FIG. 15. The request list is a list which stores request information representative of the process contents and is generated in correspondence with the process object information. The input information concept instance generation process generates and applies the request information corresponding to the generated input information concept instance to thereby unify and develop the input information concept instances in the input information concept instance list.

Figure 30:
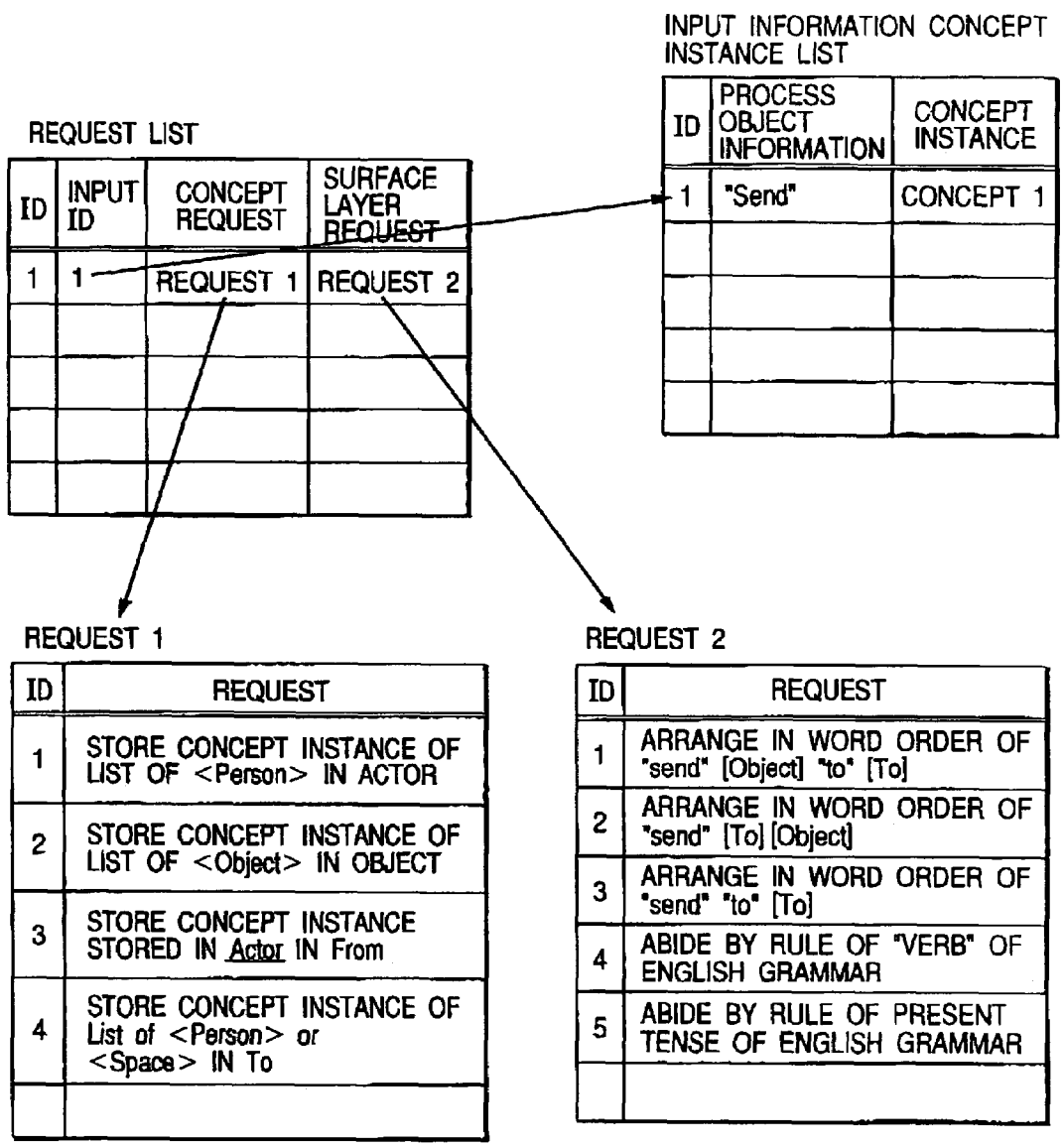
FIGS. 30, 31, 32 and 33 are diagrams showing examples of a request list.

FIG. 30 shows: request information 1 generated by referring to the request rule defined at the concept level; request information 2 generated by referring to the request rule defined at the surface layer level, respectively of the information necessary for generating the concept instance corresponding to the process object information "Send" acquired by the knowledge database retrieval process; and a request list associated with IDs in the input information concept instance list.

Figure 31:
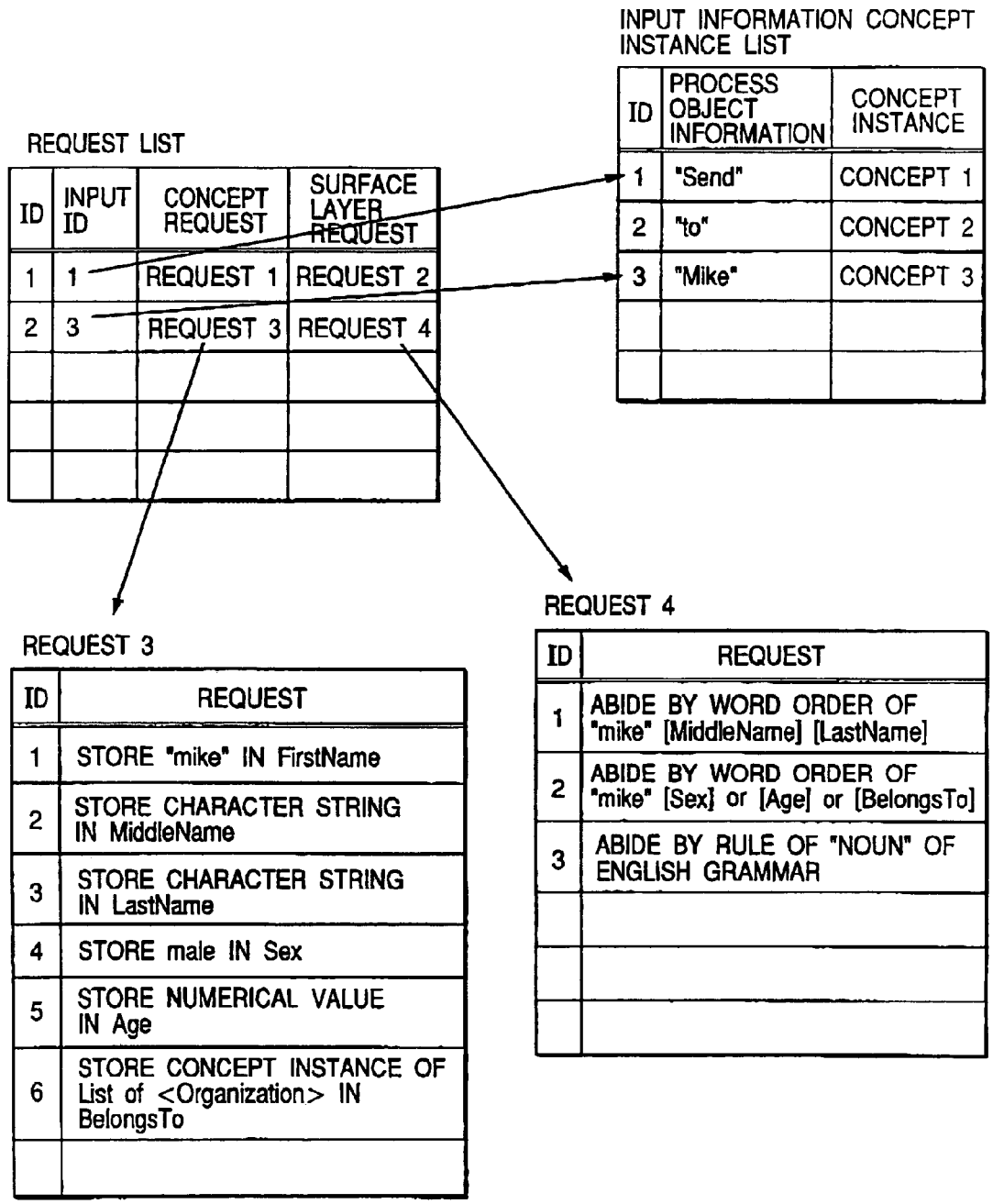

FIG. 31 shows: request information 3 generated by referring to the request rule defined at the concept level; request information 4 generated by referring to the request rule defined at the surface layer level, respectively of the information necessary for generating the concept instance corresponding to the process object information "Mike" acquired by the knowledge database retrieval process; and a request list associated with IDs in the input information concept instance list.

Figure 32:
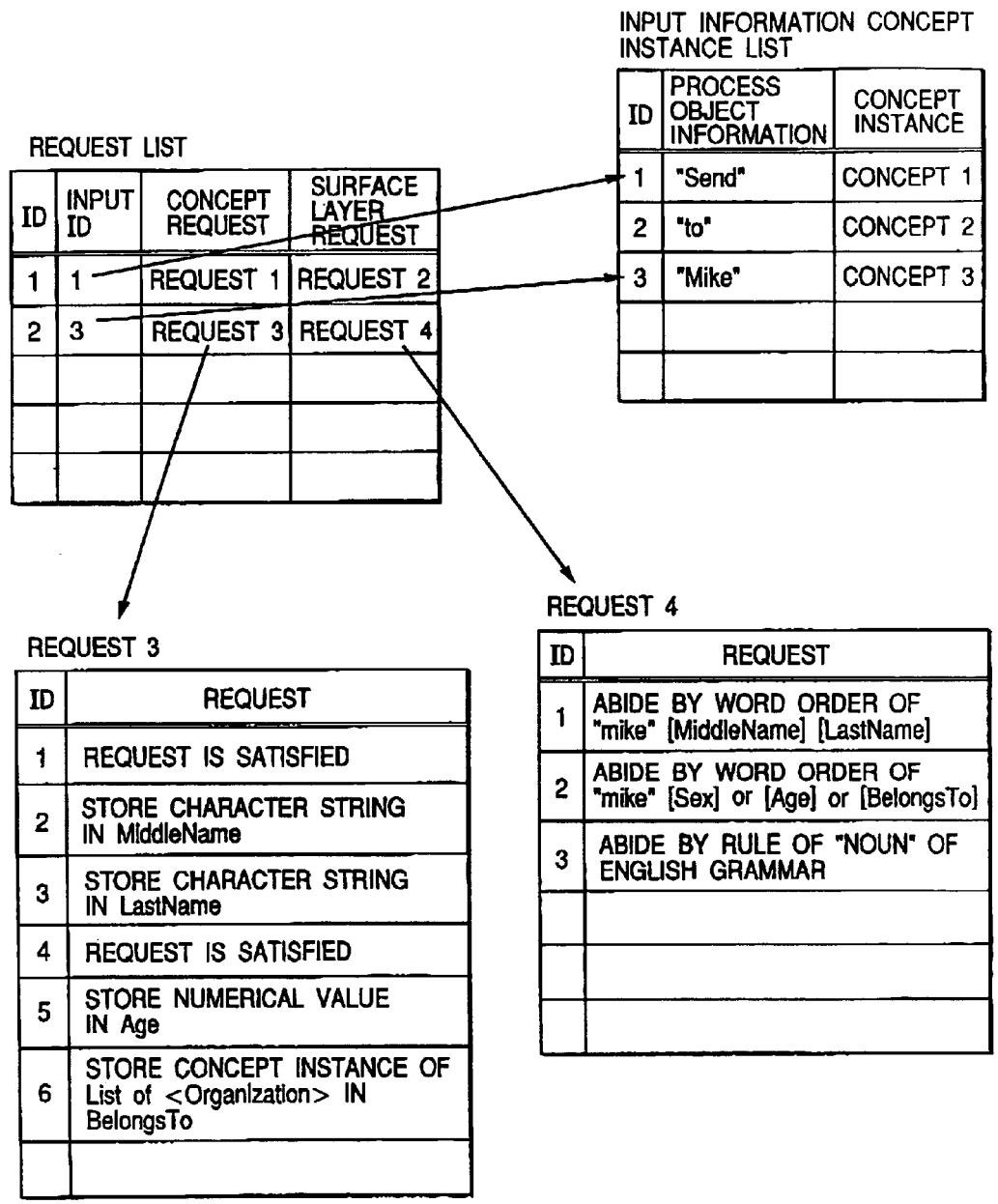

FIG. 32 shows the state that of the request information 3 shown in FIG. 31, the applied ID=1 request [store "mike" in FirstName] and the applied ID=4 request [store "male" in Sex] are updated to [requests satisfied].

Figure 33:
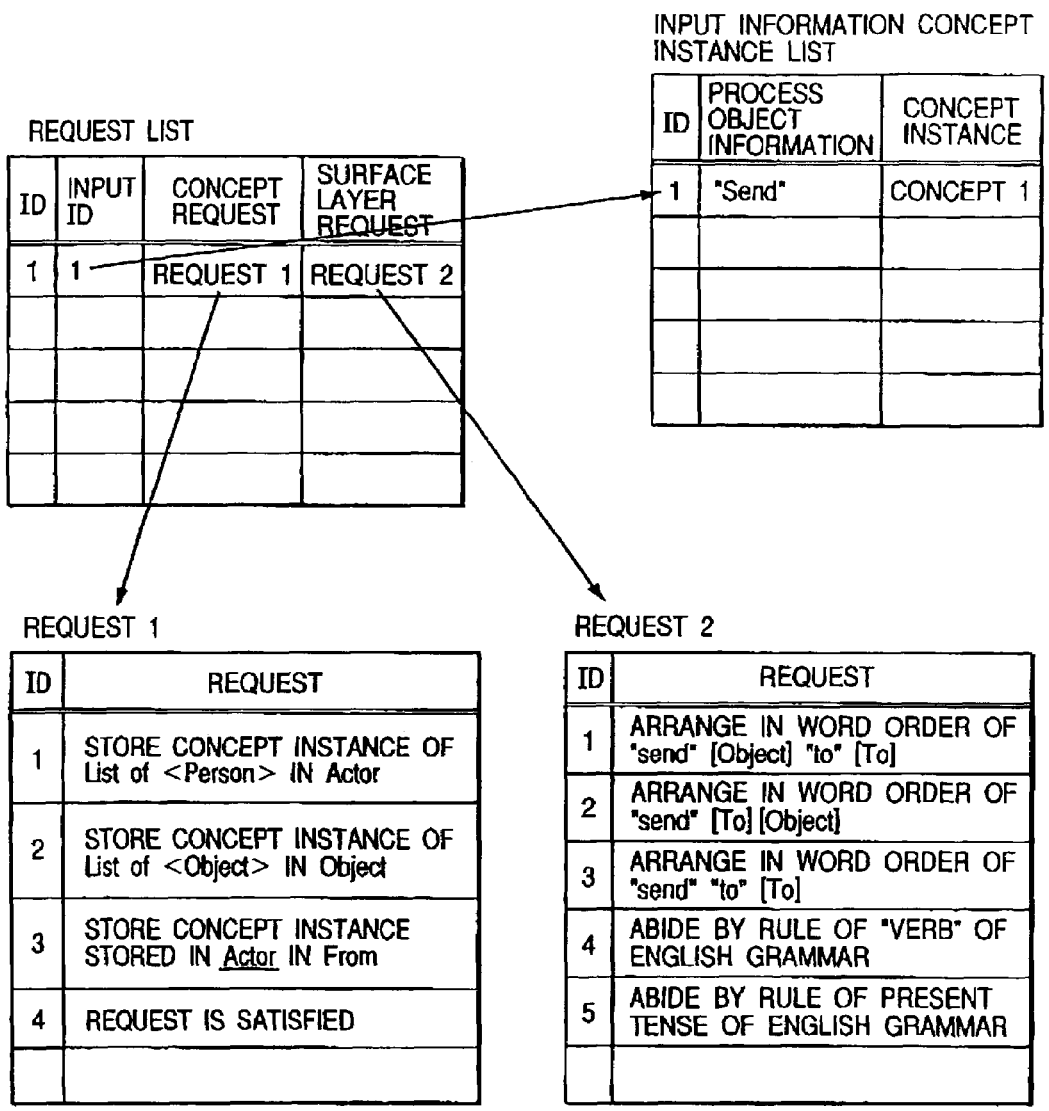

FIG. 33 shows the state that of the request information 1 shown in FIG. 30, the applied ID=4 request [store concept instance of List of <Person> or <Space>] is updated to [request satisfied].

Figure 34:
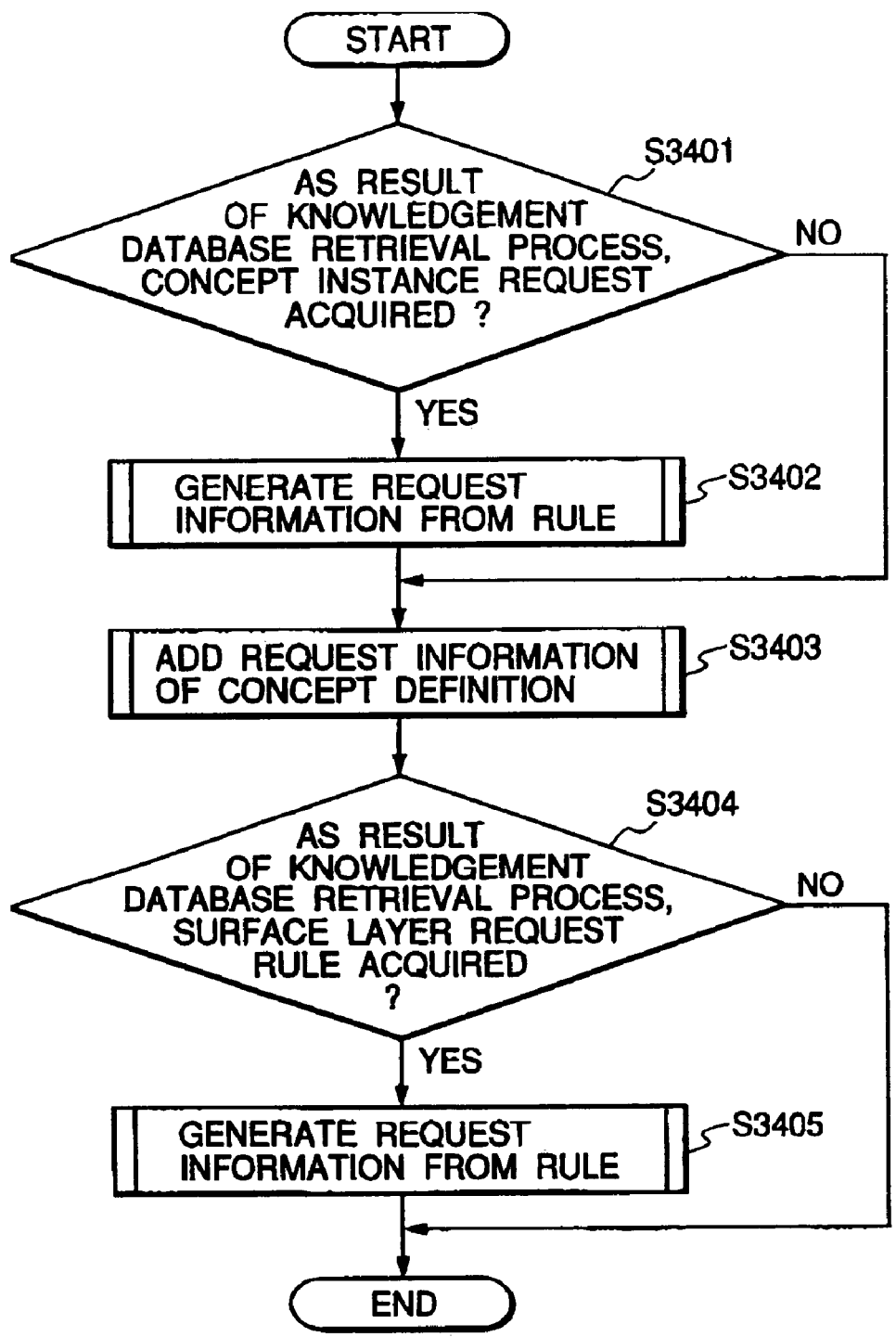
FIG. 34 is a flow chart illustrating a request information generation process.

FIG. 34 is a flow chart illustrating the request information generation process at Step S1509. The request information generation process generates request information from the retrieval result by the knowledge database retrieval process, by referring to the acquired concept instance request rule and surface layer request rule and the concept instance request rule represented by ConceptType of the generated concept instance.

Specifically, as the request information generation process is activated, it is checked at Step S3401 whether the knowledge database retrieval process acquired the concept instance request rule. If not, the flow advances to Step S3403.

If it is judged that the concept instance request rule was acquired, in a process of generating request information from the concept instance request rule at Step S3402, request information is generated from the concept instance request rule.

For example, if the knowledge database retrieval process acquires the information "send" shown in FIG. 17 corresponding to the process object information "Send", four concept instance rules are acquired. In accordance with the acquired concept instance rules, four pieces of request information such as the request 1 shown in FIG. 30 are generated. In this example, the concept instance request rules themselves correspond to the request information.

In a process of adding request information in the concept definition at next Step S3403, in accordance with the concept instance request rule in the concept definition designated by ConceptType of the generated concept instance, only the request information not duplicate with already existing request information is added. The reason why only the request information not duplicate with already existing request information is added, is as follows. If all of the concept instance application rules defined by the concept definition and the request information generated from the concept instance request rule are added, there is a risk that the restricted conditions of the information stored in the knowledge database may become invalid.

For example, if the knowledge database stores information of "adult" and "child", although both conform with the concept Person, they have different age conditions. If the age conditions of "adult" and "child" restricted by the knowledge database are replaced by more generous conditions or new age conditions are added, the conditions initially restricted by the definition of the information in the knowledge database may become invalid.

It is checked at next Step S3404 whether the knowledge database retrieval result acquired the surface layer request rule. It not, the request information generation process is terminated.

If the surface layer request rule is acquired, in a process of generating a request rule from a surface layer request rule at Step S3405, the request rule is generated in accordance with the surface layer request rule to thereafter terminate the request information generation process. For example, if the knowledge database retrieval process acquires the information "send" shown in FIG. 17 corresponding to the process object information "Send", five surface layer request rules are acquired. In accordance with the acquired surface layer request rules, five pieces of request information such as the request 2 shown in FIG. 30 are generated. In this example, the surface layer request rules themselves correspond to the request information.

Figure 35:
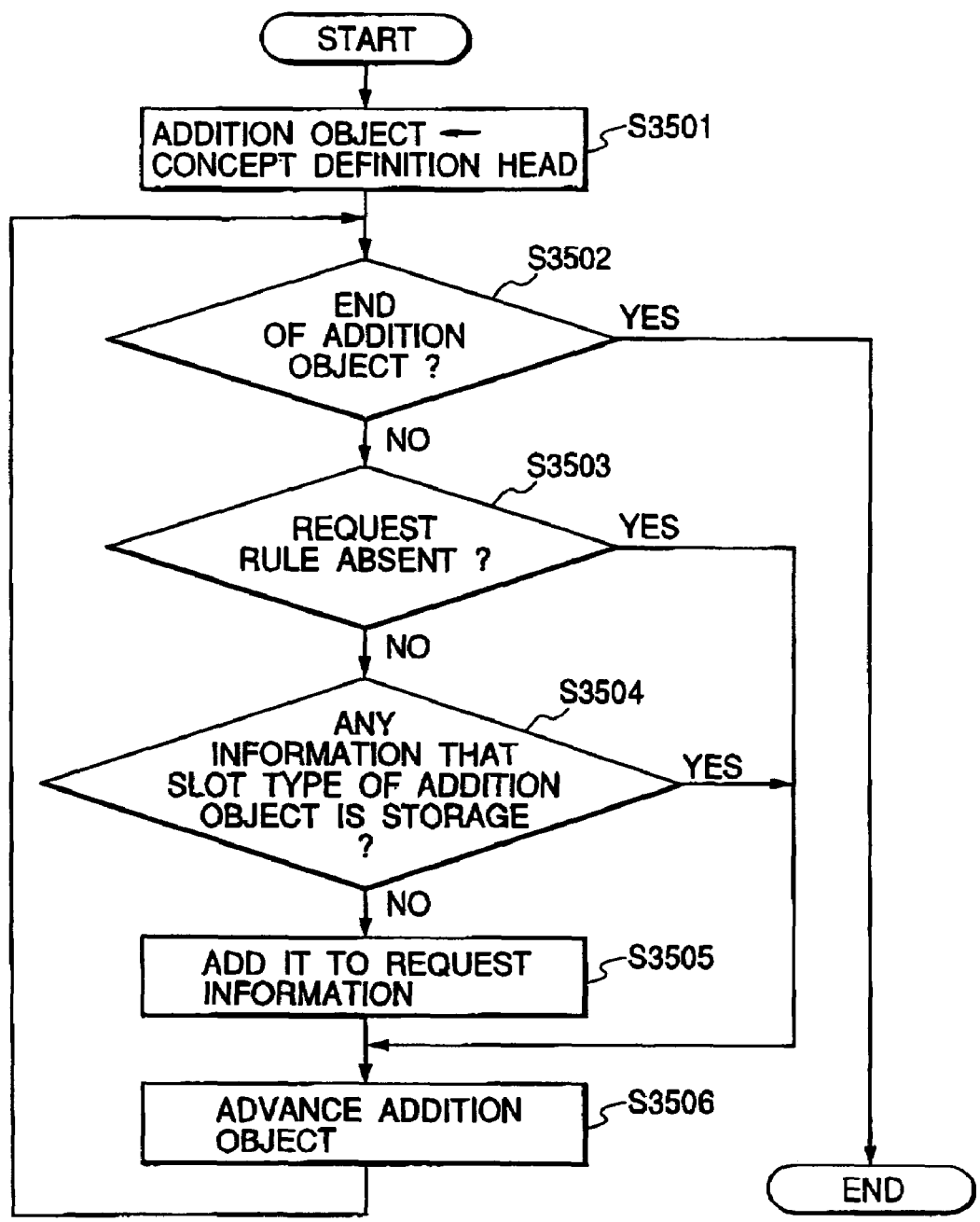
FIG. 35 is a flow chart illustrating a process of adding request information in a concept definition.

FIG. 35 is a flow chart illustrating the process of adding request information in the concept definition at Step S3403. In the process of adding request information in the concept definition, request information whose slot type is not duplicate with the input request information, is added to the input request information in accordance with the concept instance request rule in the concept definition designated by ConceptType of the input concept instance. In this manner, request information in the concept definition can be added without making invalid the conditions already restricted by the input request information.

Specifically, as the process of adding request information in the concept definition is activated at step S3501, the addition object is initialized to the head portion of the concept instance request rule in the concept definition. For example, if ConceptType of the concept instance is Send, the definition shown in FIG. 11 is referred to initialize the addition object to the slot type Actor. All addition objects correspond to all concept instance request rules other than the slot type ConceptType, and the order thereof has no significant meaning. Therefore, the term head portion has no meaning, and the addition object is initialized merely by the head portion Actor other than the slot type ConceptType shown in FIG. 11.

At next Step S3502 it is checked whether all addition objects were processed. If processed, the process of adding request information in the concept definition is terminated.

If it is judged that all addition objects are not processed, it is checked at next Step S3503 whether there is a concept instance request rule of the addition object. If not, the flow advances to Step S3506.

If there is a concept instance request rule of the addition object, at next Step S3504 the slot type of the addition object is compared with the storage destinations of all request information. If there is any coincidence, the request information is not added and the flow advances to Step S3506. In this manner, it is possible not to make invalid the conditions of the slot type already restricted by the input request information.

If there is no storage destination of the request information which is coincident with the slot type of the addition object, the request information is added at Step S3505 in accordance with the concept instance request rule of the addition object. At next Step S3506, in order to use the next addition object, the flow returns to Step S3502 whereat it is checked whether the process of adding request information in the concept definition is to be continued or not.

Figure 36:
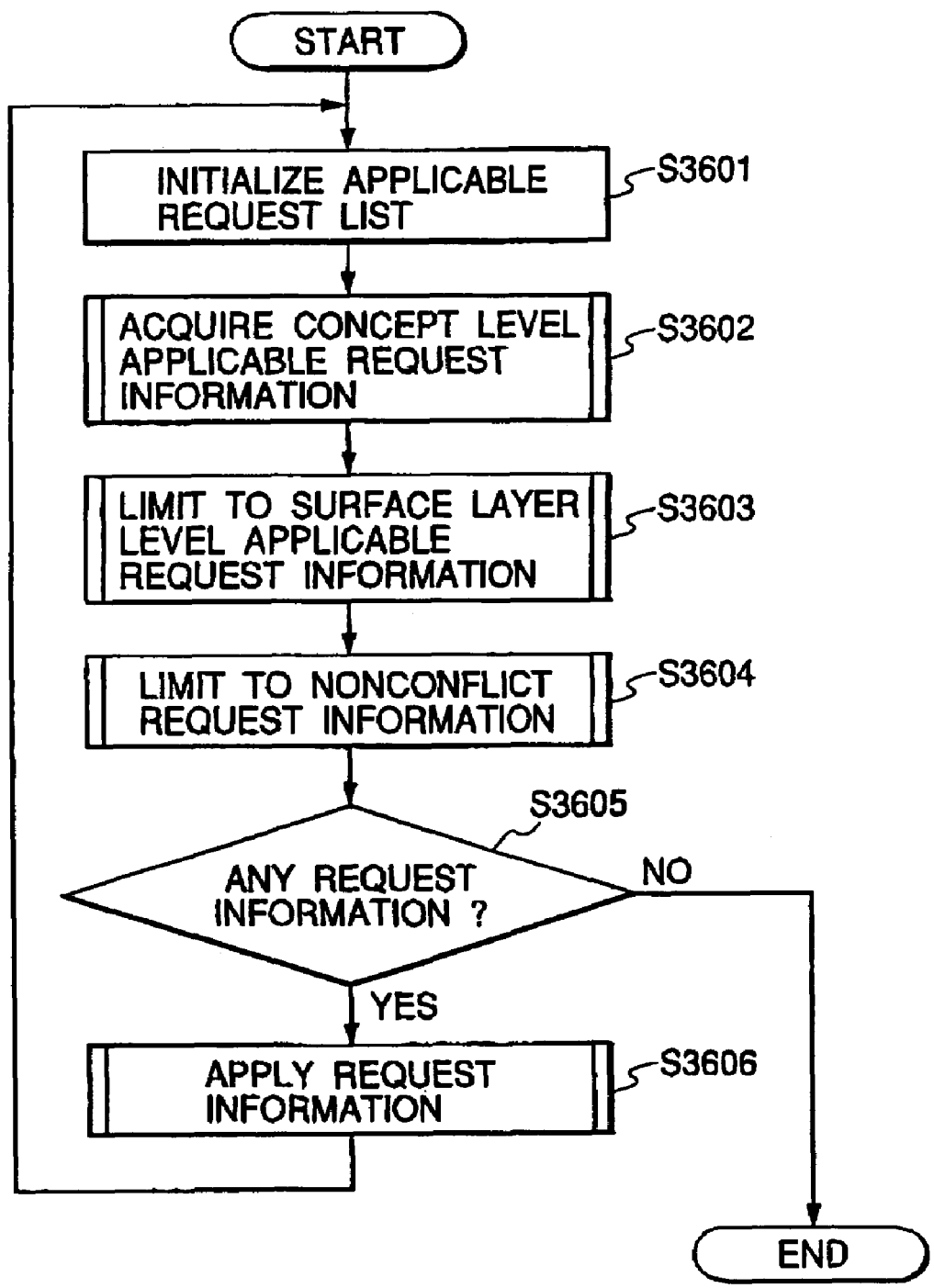
FIG. 36 is a flow chart illustrating a request respondence process.

FIG. 36 is a flow chart illustrating the request respondence process at Step S1511. The request respondence process stores an initial value in the input empty concept instance by referring to the request information in the request information list generated and stored by the request information generation process shown in FIG. 34, unifies other concept instances stored in the input information concept instance list already input, and executes other operations.

Specifically, as the request respondence process is activated at Step S3601, the applicable request list is initialized to the empty list. The applicable request list is referred to and updated by the request respondence process, and is a list which stores applicable request information in the input request information list.

In order to judge whether each piece of the request information is applicable or not, it is necessary not only to check whether the application conditions of the request information at the most fundamental concept level are satisfied but also to check whether the application conditions of the request information at the surface layer level such as grammar rules and other states are satisfied and to consider the interaction between request information judged as applicable. In this manner, it is essential to select only the correctly applicable request information.

In a concept level applicable request information acquirement process at next Step S3602, combinations of applicable concept request information and a corresponding concept instance are acquired and added to the applicable request list, by referring to the given concept request information in the request list such as shown in FIGS. 30 to 33 and to the given input information concept instance list such as shown in FIGS. 25 to 29.

In a surface layer level applicable request information limitation process at Step S3603, request information is limited only to combinations of applicable request information and a corresponding concept instance, which satisfy the application conditions of the surface layer request information, by referring to the applicable request list acquired by the concept level applicable request information acquirement process, to the given concept request information in the request list such as shown in FIGS. 30 to 33 and to the given input information concept instance list such as shown in FIGS. 25 to 29.

In a non-conflict request information limitation process at next Step S3604, request information is limited only to applicable request information without conflict, by referring to the applicable request list and considering the interaction between applied request information.

If it is judged at next Step S3605 that there is no request information in the applicable request list, the request respondence process is terminated. Namely, if there is no applicable request information, the request respondence process is terminated.

If it is judged that there is request information in the applicable request list, in a request information application process at next Step S3606 the request information in the applicable request list is applied and the flow returns to Step S3601 to repeat the above processes. For example, an initial value is stored in an input empty concept instance, other concept instances stored in the given input information concept instance list are unified, unnecessary concept instances are deleted from the input information concept instance list, the applicable request information is applied, the request list is updated, and other operations are performed.

FIGS. 37 and 38 are diagrams showing examples of the applicable request list acquired by the concept level applicable request information acquirement process at Step S3602. The applicable request list is a list which stores combinations of applicable concept request information and a corresponding concept instance, among the request information stored in the request list such as shown in FIGS. 30 to 33. Specifically, the applicable request list has information of each combination of applicable request information, original request information in the request list, its ID, and an applicable object instance.

With this information, contradiction of the interaction between request information described in the request respondence process shown in FIG. 36 can be avoided. For example, by paying attention to the object instance judged as applicable, it is possible to judge that the request information having the same instance is not established at the same time because of contradiction. This is not applied if the application conditions of the request information allow the same instance.

Stored in the example shown in FIG. 37 is a combination of the request ID=1[store concept instance of List of <Person> in Actor] of the request information 1 shown in FIG. 30 and stored as the applicable request information ID=1, and the concept instance 3 shown in FIG. 27 as the object instance judged as applicable to the application conditions [concept instance of List of <Person>].

The applicable request information ID=2 and applicable request information ID=3 are similar to the applicable request information ID=1. In the case of the applicable request information ID=4, the request ID=1 [store "mike" FirstName] of the request information 3 shown in FIG. 31 has no application conditions. Therefore, the request information can be unconditionally applied so that the object instance is indicated by "none". Other applicable request information can be acquired in a similar manner.

An example shown in FIG. 38 is an applicable request list acquired by referring to the request information already applied and updated by the request information application process at Step S3606. Accordingly, the request information corresponding to the requests ID=1 and ID=4 of the request information 3 is not stored in the applicable request list.

FIGS. 39 and 40 are diagrams showing examples of the applicable request list limited by the surface layer level applicable information limitation process at Step S3603 in the request respondence process shown in FIG. 36. The limited applicable request list is a list which stored request information satisfying the surface layer request information stored in the request list shown in FIGS. 30 to 33 among the applicable request list acquired and shown in FIGS. 37 and 38.

Specifically, by paying attention to the concept instance corresponding to the applicable request information stored in the applicable request list, the request information is limited to only the request information which can satisfy the information such as grammar conditions and word order stipulated by the application conditions of the surface layer request information.

An example shown in FIG. 39 will be described specifically. The applicable request list shown in FIG. 38 is limited to only one combination of two pieces of applicable request information ID=4 and ID=9, as the search result of a combination of request information having no concept instance corresponding to the applicable request information, from the applicable request list shown in FIG. 37.

An example shown in FIG. 40 will be described specifically. Similar to the example shown in FIG. 39, a combination of request information having no concept instance corresponding to the applicable request information is searched from the applicable request list shown in FIG. 38. In this case, it is judged that there is no request information. Then, a combination satisfying the word order in the surface layer request information stored in the request list shown in FIGS. 30 to 33 is searched. As a result, as a combination satisfying the request information ID=3 [arrange in word order of "send", "to" and [To]] of the surface layer request information 2 shown in FIG. 30, a combination of the concept instance 3 corresponding to the storage request to To and the applicable request information ID=3 can be searched.

Combinations other than the above-described combination do not satisfy the requirements of the word order in the surface layer request information stored in the request list shown in FIGS. 30 to 33. Therefore, as shown in FIG. 40, only one combination is stored.

Figure 41:
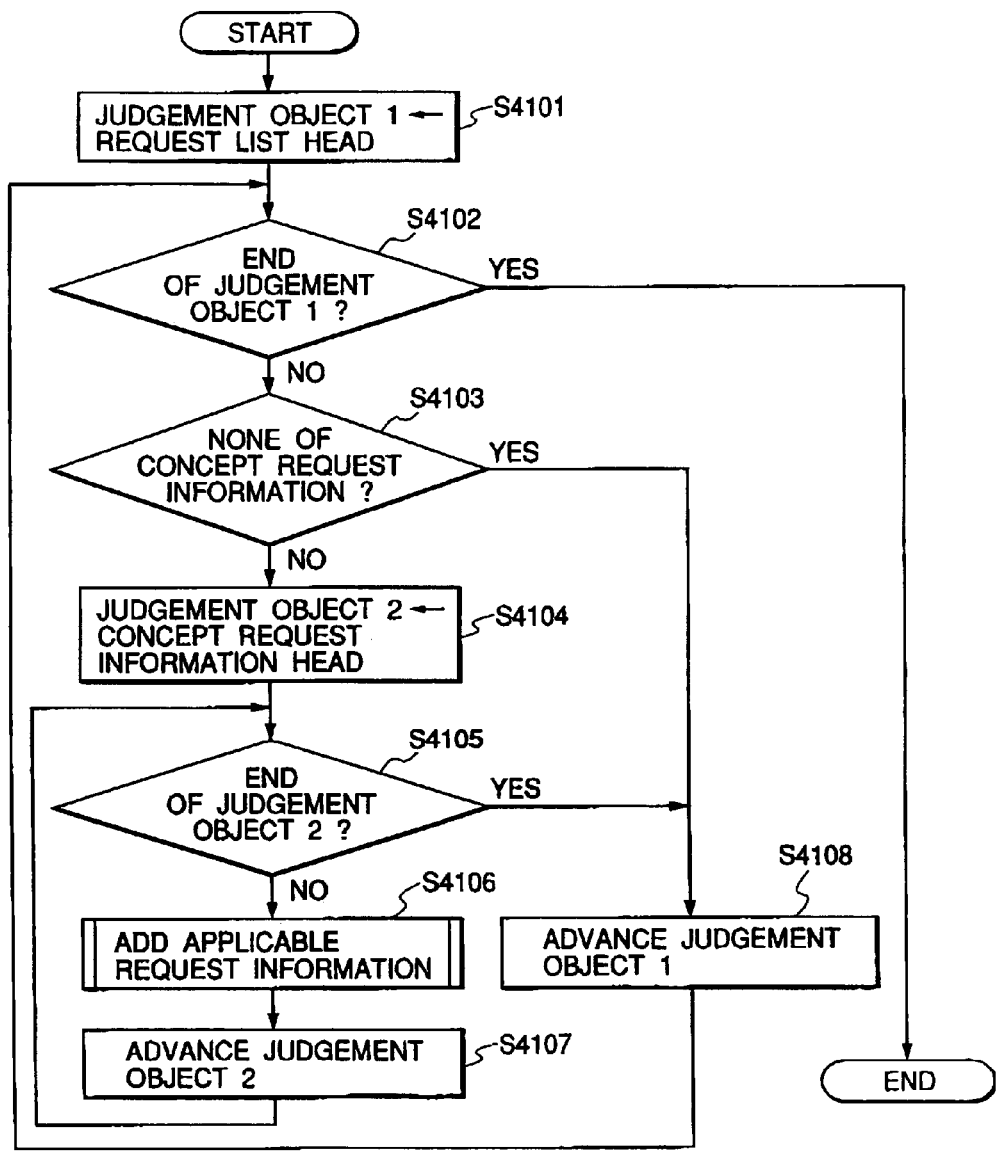
FIG. 41 is a flow chart illustrating a concept level applicable request information acquirement process.

FIG. 41 is a flow chart illustrating the concept level applicable request information acquirement process at Step S3602. The concept level applicable request information acquirement process acquires the request information corresponding to the applicable concept instance, by referring to the input request list such as shown in FIGS. 30 to 33 and to the given input information concept instance list such as shown in FIGS. 25 to 29. The applicable request information is the request information whose application conditions are unconditional or the request information in which the concept instance satisfying the application conditions stipulated by the request information corresponding to the concept instance stored in the request list to present in the input information concept instance list.

Specifically, as the concept level applicable request information acquirement process is activated at Step S4101, the judgement object 1 is initialized to the head portion of the request list. For example, in the request list shown in FIG. 31, the judgement object is initialized to the request list ID=1.

At next Step S4102, it is checked whether all judgement objects 1 were processed. If processed, the concept level applicable request information acquirement process is terminated.

If it is judged that all judgement objects 1 are not processed, then it is checked at next Step S4103 whether there is concept request information. If not, the flow advances to Step S4108, and in order to use the next judgement object 1, the flow returns to Step S4102 whereat it is checked whether the concept level applicable request information acquirement process is to be continued.

If there is concept request information of the judgement object 1, then at next Step S4104 the judgement object 2 is initialized to the head portion of corresponding concept request information. For example, in the case of the request list ID=2 in the request list shown in FIG. 31, the corresponding concept request information is the request information 3 so that the judgement object 2 is initialized to the request information ID=1.

It is checked at next Step S4105 whether all judgement objects 2 were processed. If processed, the flow advances to Step S4108, and in order to use the next judgement object 1, the flow returns to Steps S4102 whereat it is judged whether the concept level applicable request information acquirement process is to be continued.

If it is judged that all judgement objects 2 are not processed, in a process of adding applicable request information at next Step S4106, the applicable request information is added to the applicable request list.

At next Step S4107, in order to use the next judgement object 2, the flow returns to Steps S4105 whereat it is judged whether all judgement objects 2 were processed to judge whether the process is to be continued.

Figure 42:
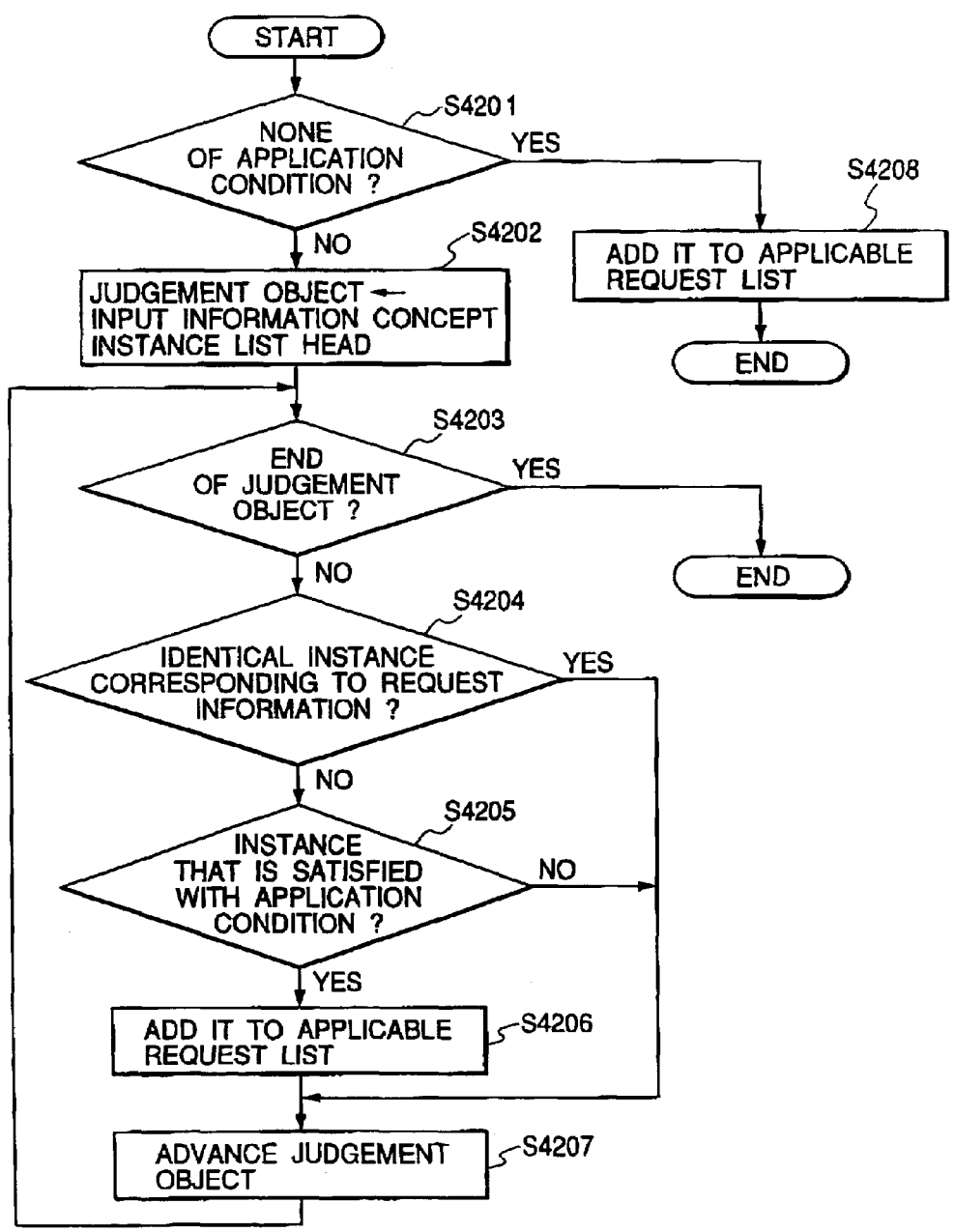
FIG. 42 is a flow chart illustrating an applicable request information addition process.

FIG. 42 is a flow chart illustrating the applicable request information addition process at Step S4106. The applicable request information addition process adds a combination of applicable request information and a corresponding instance to the applicable request list, by referring to the given input information concept instance list such as shown in FIGS. 25 to 29 and judging the application conditions of the given request information. For example, if the application conditions of request information are unconditional or if the concept instance satisfying the application conditions is present in the input information concept instance list, then it is judged as applicable and the combination is added to the applicable request list.

Specifically, as the applicable request information addition process is activated at Step S4201, it is judged whether the input request information has the application conditions. If not, the flow advances to Step s4208 whereat the input request information is added to the applicable request list as applicable request information, to thereafter terminate the applicable request information addition process.

If the request information has the application conditions, the flow advances to next Step S4202 whereat the judgement object is initialized to the head portion of the given input information concept instance list.

At next Step S4203 it is judged whether all judgement objects were processed. If processed, the applicable request information addition process is terminated.

If it is judged that all judgement objects are not processed, it is judged at next Step S4204 whether the concept instance corresponding to the input request information is the same as the concept instance of the judgement object. If it is judged as the same, the flow advances to Step S4207.

If it is judged as not the same, it is judged at next Step S4205 whether the concept instance of the judgement object satisfies the application conditions of the input request information. If it is judged that the application conditions are not satisfied, the flow advances to Step S4207.

If it is judged that the application conditions are satisfied, a combination of the request information and the concept instance judged as satisfying the application conditions is added to the applicable request list.

At next Step S4207 in order to use the next judgement object, the flow returns to Step S4203 whereat it is checked whether all judgement objects were processed. If processed, the applicable request information addition process is terminated.

Figure 43:
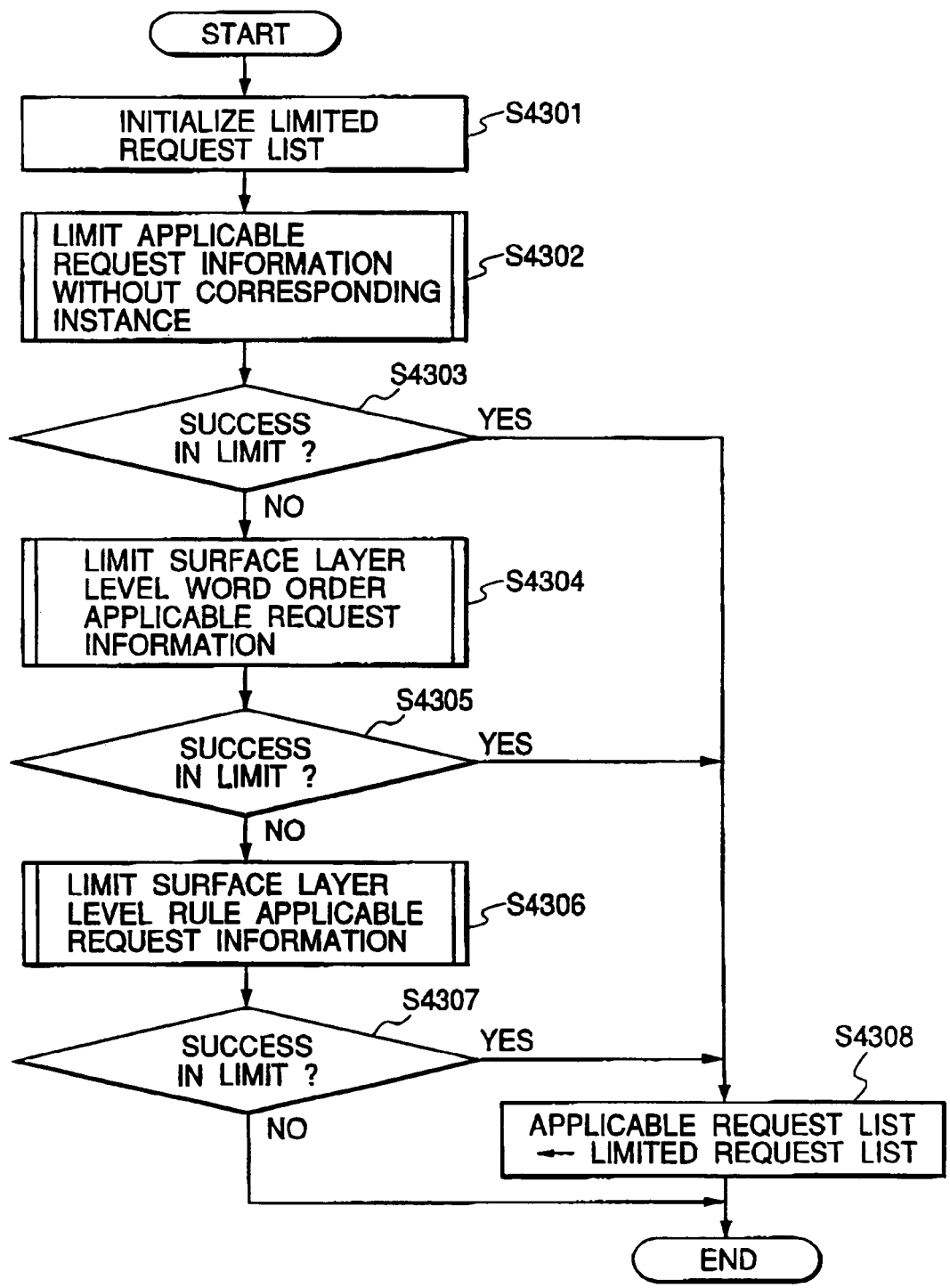
FIG. 43 is a flow chart illustrating a surface layer level applicable request information limitation process.

FIG. 43 is a flow chart illustrating the surface layer level applicable request information limitation process at Step S3603. The surface layer level applicable request information limitation process limits only to a combination of the applicable request information and a corresponding concept instance which satisfies the application conditions of the surface layer request information, by referring to the applicable request list such as shown in FIGS. 37 and 38 and acquired by the concept level applicable request information acquirement process, to the given surface layer request information such as shown in FIGS. 30 to 33, and to the given input information concept instance list such as shown in FIGS. 25 to 29.

Namely, the objective of this process of limiting to the surface layer level applicable request information is to limit to the request information which does not contradict from as judged totally, among a plurality piece of applicable request information at the concept level. Therefore, first, the request information is limited to only a combination which has no corresponding and contradicting concept instance.

If there is no limited request information because of this limitation, second, the request information is limited to only a combination which satisfies the requirements of the designated word order. If there is no limited request information because of this limitation, third, the request information is limited to only a combination which satisfies the requirements of grammar rules. The order of the second and third limitations in this embodiment is not limited, but other limitation methods and orders may also be used.

If limitation is not possible by any limitation method, the limitation is not entered. However, since the request information is applicable at least at the concept level, there is a possibility that the meaning of the request information can be understood. This can be reasoned from that if the request information can be understood by the concept, the total meaning thereof can be estimated even if unknown language is used and its word order rules and grammar rules are not known.

Specifically, as the surface layer level applicable request information limitation process is activated at Step S4301, the limited request list is initialized to an empty list.

In an applicable request information without a corresponding instance limitation process at next Step S4302, a combination without a corresponding concept instance is searched from the applicable request list and added to the limited request list.

It is checked at next Step S4303 whether limitation of the request information succeeded. If succeeded, the flow advances to Step S4308 whereat the limited request list is copied to the applicable request list to thereafter terminate the surface layer level applicable request information limitation process. For example, in the case of the applicable request list shown in FIG. 37, a combination of the request information ID=4 and ID=9 having no corresponding concept instance is searched and limitation is performed as shown in FIG. 38.

If the limitation fails, in a surface layer word order applicable request information limitation process Step S4304, a combination of a concept instance satisfying the word order requirements and a storage destination is searched from the applicable request list and added to the limited request list.

It is checked at next Step S4305 whether the request information limitation succeeded. If succeeded, the flow advances to Step S4308 whereat the limited request list is copied to the applicable request list to thereafter terminate the surface layer level applicable request information limitation process. For example, in the case of the applicable request list shown in FIG. 39, as a combination satisfying the request information ID=3 [arrange in word order of "send", "to" and [To]] of the surface layer request information 2 shown in FIG. 30, a combination of the concept instance 3 corresponding to the storage request to To and the applicable request information ID=3 can be searched. Combinations other than the above-described combination do not satisfy the requirements of the word order in the surface layer request information stored in the request list shown in FIGS. 30 to 33. Therefore, as shown in FIG. 40, only one combination is stored.

If the limitation fails, in a surface layer level rule applicable request information limitation process at Step S4306, a combination of a concept instance satisfying the grammar rules and a storage destination is searched from the applicable request list and added to the limited request list.

It is checked at next Step S4307 whether the request information limitation succeeded. If succeeded, the flow advances to Step S4308 whereat the limited request list is copied to the applicable request list to thereafter terminate the surface layer level applicable request information limitation process.

If the limitation fails, the applicable request list is not changed to thereafter terminate the surface layer level applicable request information limitation process. In this case, the input applicable request list itself is returned.

Figure 44:
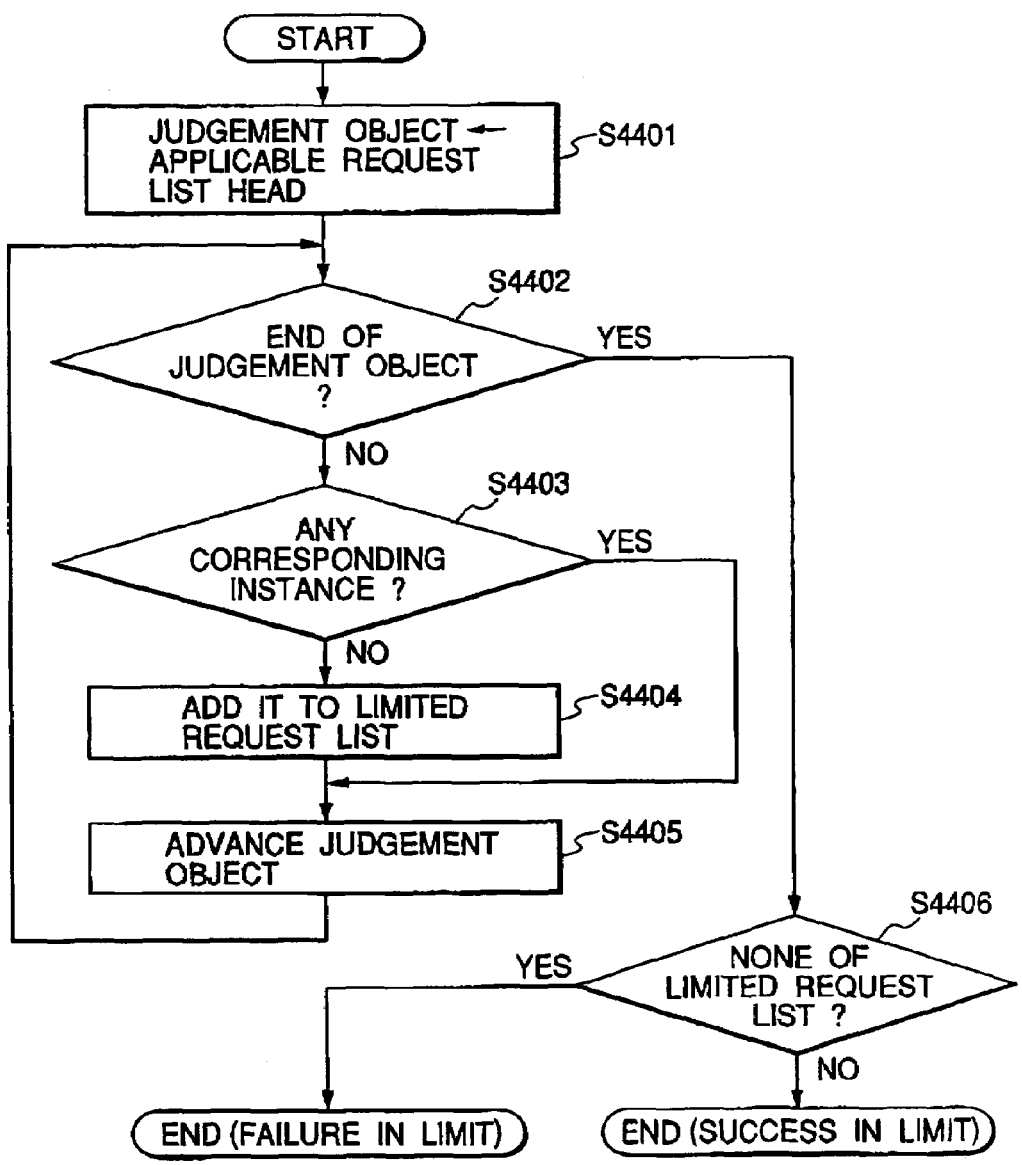
FIG. 44 is a flow chart illustrating an applicable request information without a corresponding instance limitation process.

FIG. 44 is a flow chart illustrating the applicable request information without a corresponding instance limitation process at Step 4302. The applicable request information without a corresponding instance limitation process searches a combination having no corresponding concept instance from the input applicable request list and adds it to the limited request list.

Specifically, as the applicable request information without a corresponding instance limitation process is activated at Step. S4401, the judgement object is initialized to the head portion of the input applicable request list. It is checked at next Step S4402 whether all judgement objects were processed. If processed, the flow advances to Step S4406, whereas if not processed, it is judged at next Step S4403 whether there is an instance corresponding to the judgement object. If present, the flow advances to Step S4405, whereas if not present, at next Step S4404 the request information of the judgement object is added to the limited request list.

At next Step S4405, in order to use the next judgement object, the flow returns to Step S4402 to continue the process. If it is judged at Step S4402 that all judgement objects were processed, then it is judged at Step S4406 whether the request information is stored in the limited request list. If the request information is stored, it is judged as a limitation success, whereas if no request information is stored, it is judged as a limitation failure to thereafter terminate the process.

Figure 45:
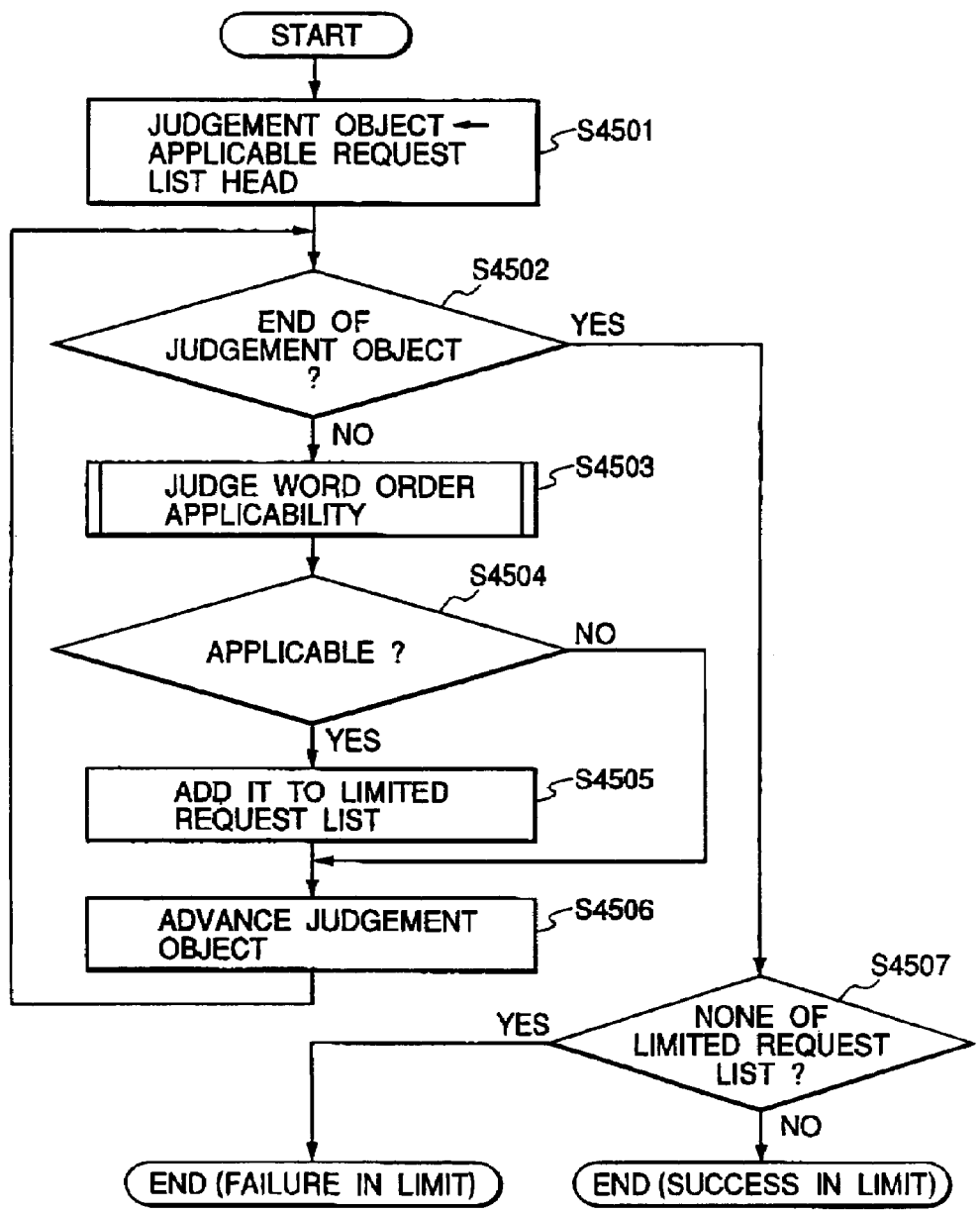
FIG. 45 is a flow chart illustrating a surface layer level word order applicable request information limitation process.

FIG. 45 is a flow chart illustrating the surface layer level word order applicable request information limitation process at Step S4304. The surface layer level word order applicable request information limitation process searches from the input applicable request list a combination of a corresponding concept instance satisfying the word order requirements in the surface layer request information in the input request list such as shown in FIGS. 30 to 33 and a storage destination, by referring to the input information concept instance list such as shown in FIGS. 25 to 29, and adds the combination to the limited request list.

Specifically, as the surface layer level word order applicable request information limitation process is activated at Step S4501, the judgement object is initialized to the head portion of the input applicable request list. It is checked at next Step S4502 whether all judgement objects were processed. If processed, the flow advances to Step S4507, whereas if not processed, in a word order applicability judgement process at next Step S4503 it is judged whether the word order requirements which are satisfied by the combination as the judgement object of the corresponding concept instance and storage destination is present in the surface layer request information in the input request list such as shown in FIGS. 30 to 33, by referring to the input information concept instance list such as shown in FIGS. 25 to 29.

If it is judged at next Step S4504 that no word order requirement is satisfied, the flow advances to Step S4506. If it is judged that any one of the word order requirements is satisfied, the request information as the judgement object is added to the limited request list at next Step S4505. At next Step S4506, in order to use the next judgement object, the flow returns to Step S4502 to repeat the above processes. If it is judged at Step S4502 that all judgement objects were processed, it is judged at Step S4507 whether request information is stored in the limited request list. If stored, it is judged as a limitation success to thereafter terminate the process, whereas if no request information is stored, it is judged as a limitation failure to thereafter terminate the process.

Figure 46:
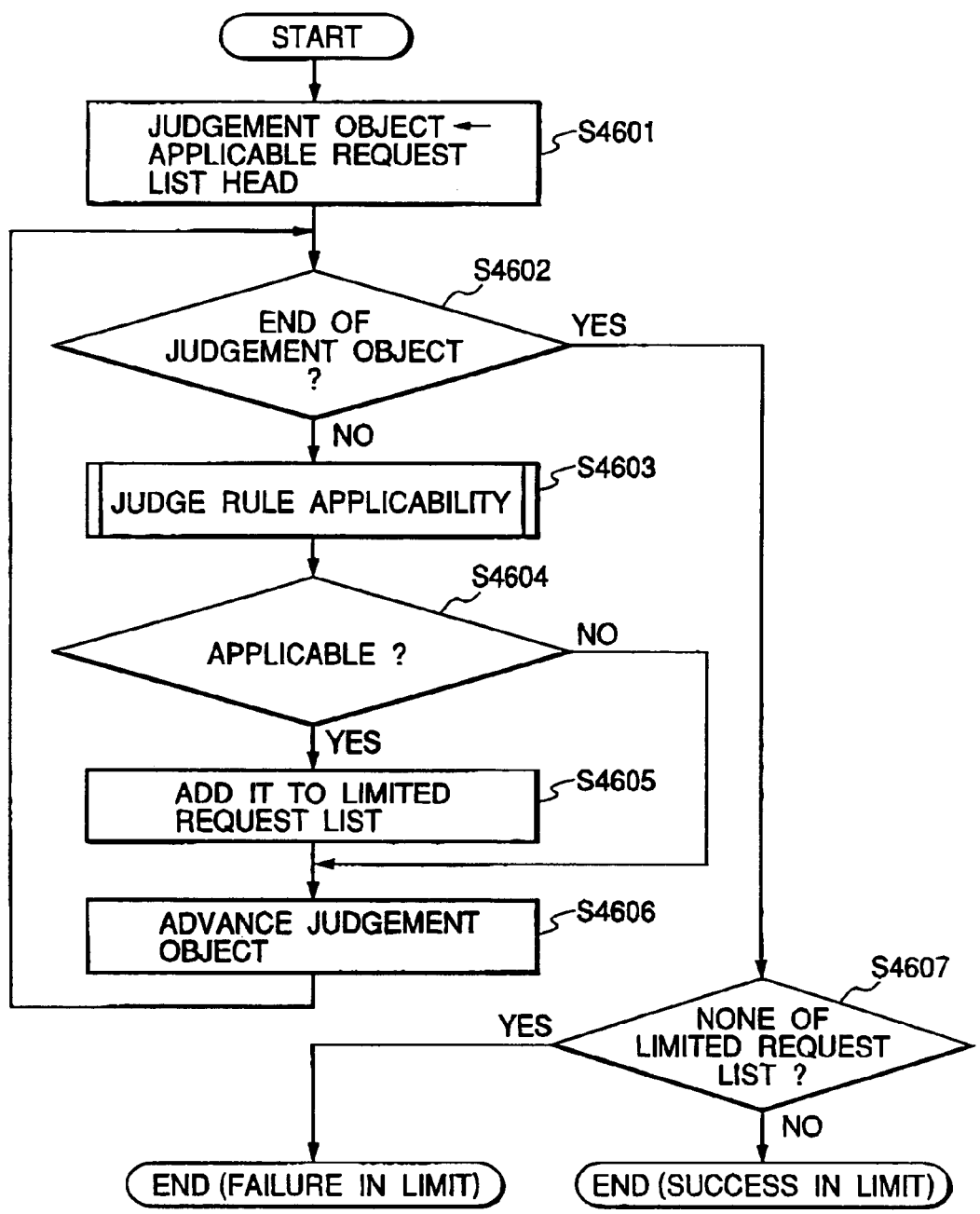
FIG. 46 is a flow chart illustrating a surface layer level rule applicable request information limitation process.

FIG. 46 is a flow chart illustrating the surface layer level rule applicable request information limitation process at Step S4306. The surface layer level rule applicable request information limitation process searches from the input applicable request list a combination of a corresponding concept instance satisfying the rule requirements in the surface layer request information in the input request list such as shown in FIGS. 30 to 33 and a storage destination, by referring to the input information concept instance list such as shown in FIGS. 25 to 29, and adds the combination to the limited request list.

Specifically, as the surface layer level rule applicable request information limitation process is activated at Step S4601, the judgement object is initialized to the head portion of the input applicable request list. It is checked at next Step S4602 whether all judgement objects were processed. If processed, the flow advances to Step S4607, whereas if not processed, in a rule applicability judgement process at next Step S4603 it is judged whether the rule requirements which are satisfied by the combination as the judgement object of the corresponding concept instance and storage destination is present in the surface layer request information in the input request list such as shown in FIGS. 30 to 33, by referring to the input information concept instance list such as shown in FIGS. 25 to 29.

If it is judged at next Step S4604 that no rule requirement is satisfied, the flow advances to Step S4606. If it is judged that any one of the rule requirements is satisfied, the request information as the judgement object is added to the limited request list at next Step S4605. At next Step S4606, in order to use the next judgement object, the flow returns to Step S4602 to repeat the above processes. If it is judged at Step S4602 that all judgement objects were processed, it is judged at Step S4607 whether request information is stored in the limited request list. If stored, it is judged as a limitation success to thereafter terminate the process, whereas if no request information is stored, it is judged as a limitation failure to thereafter terminate the process.

Figure 47:
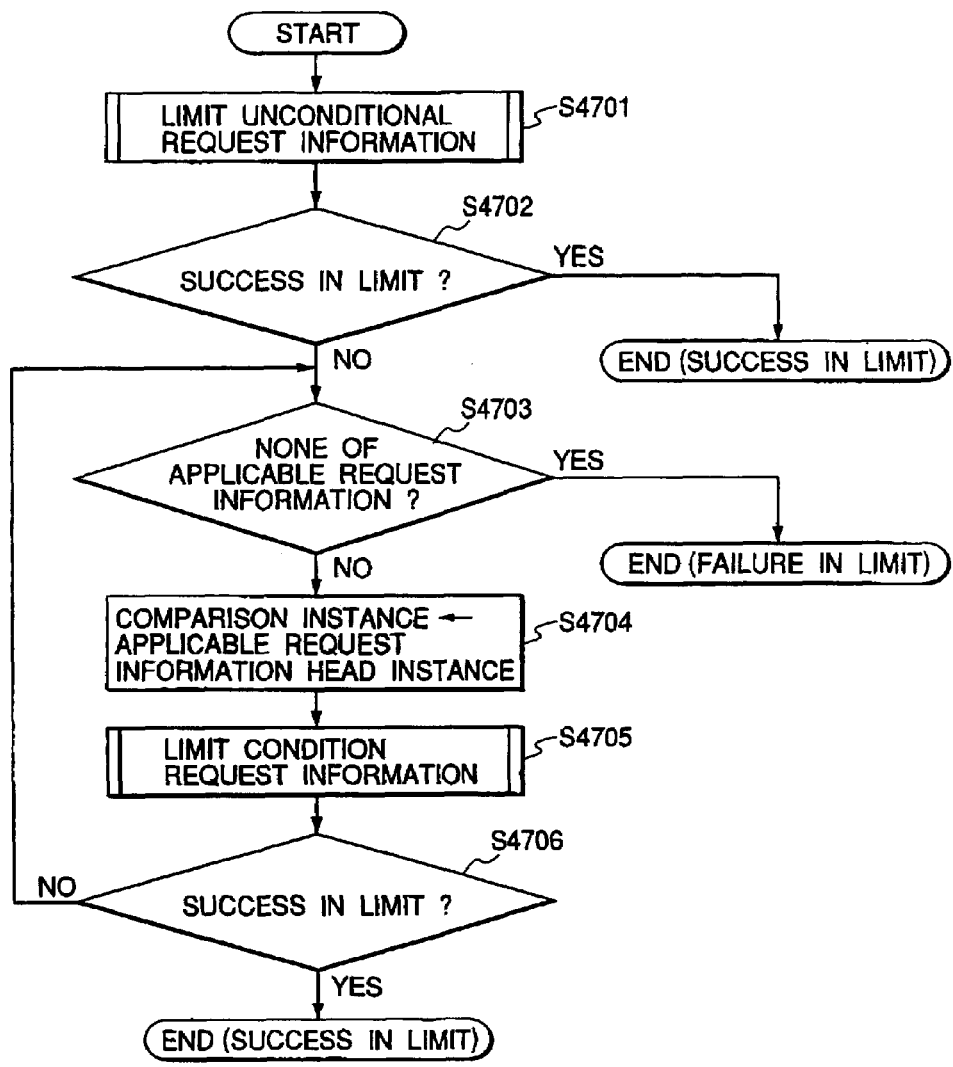
FIG. 47 is a flow chart illustrating a non-conflict request information limitation process.

FIG. 47 is a flow chart illustrating the non-conflict request information limitation process at Step S3604. The non-conflict request information limitation process limits to only applicable request information without conflict, by referring to the applicable request list limited at the concept level and surface layer level by the concept level applicable request information acquirement process and surface layer level applicable request information limitation process and by considering the interaction between applied request information.

Therefore, first, the request information is limited to only a combination which has no corresponding concept instance and no contradiction. If there is no limited request information because of this limitation, second, the request information is limited to only a combination of the corresponding concept instance having only one piece of the request information. It is therefore possible to avoid contradiction to be caused if the same concept instance satisfies at the same time a plurality piece of request information.

Specifically, as the non-conflict request information limitation process is activated, in an unconditional request information limitation process at Step S4701, the request information is limited only to a combination which has no corresponding concept instance and no contradiction. Because of this limitation, if it is judged at next Step S4702 that the limitation succeeded, the process is terminated.

If it is judged that the limitation failed, it is judged at next Step S4703 whether request information is present in the applicable request list. If not present, it is judged as the limitation failure to thereafter terminate the process, whereas if present, the flow advances to next Step S4704 whereat the concept instance in the head portion of the applicable request list is stored in a comparison instance.

In a conditional request information limitation process at next Step S4705, it is checked whether only one piece of the request information combined with the comparison instance as the corresponding concept instance is present in the applicable request list, to thereby limit the request information. In this case, if there is only one piece of the request information corresponding to the comparison instance, the applicable request list is updated by using the request information, whereas if there are a plurality piece of request information, the request information is deleted from the applicable request list.

Because of this limitation, if it is judged at next Step S4706 that the limitation succeeded, the process is terminated. If it is judged that the limitation failed, the flow returns to Step S4703 to repeat the process by using the applicable request list from which the request information, with the comparison instance by which the limitation failed, is deleted.

Figure 48:
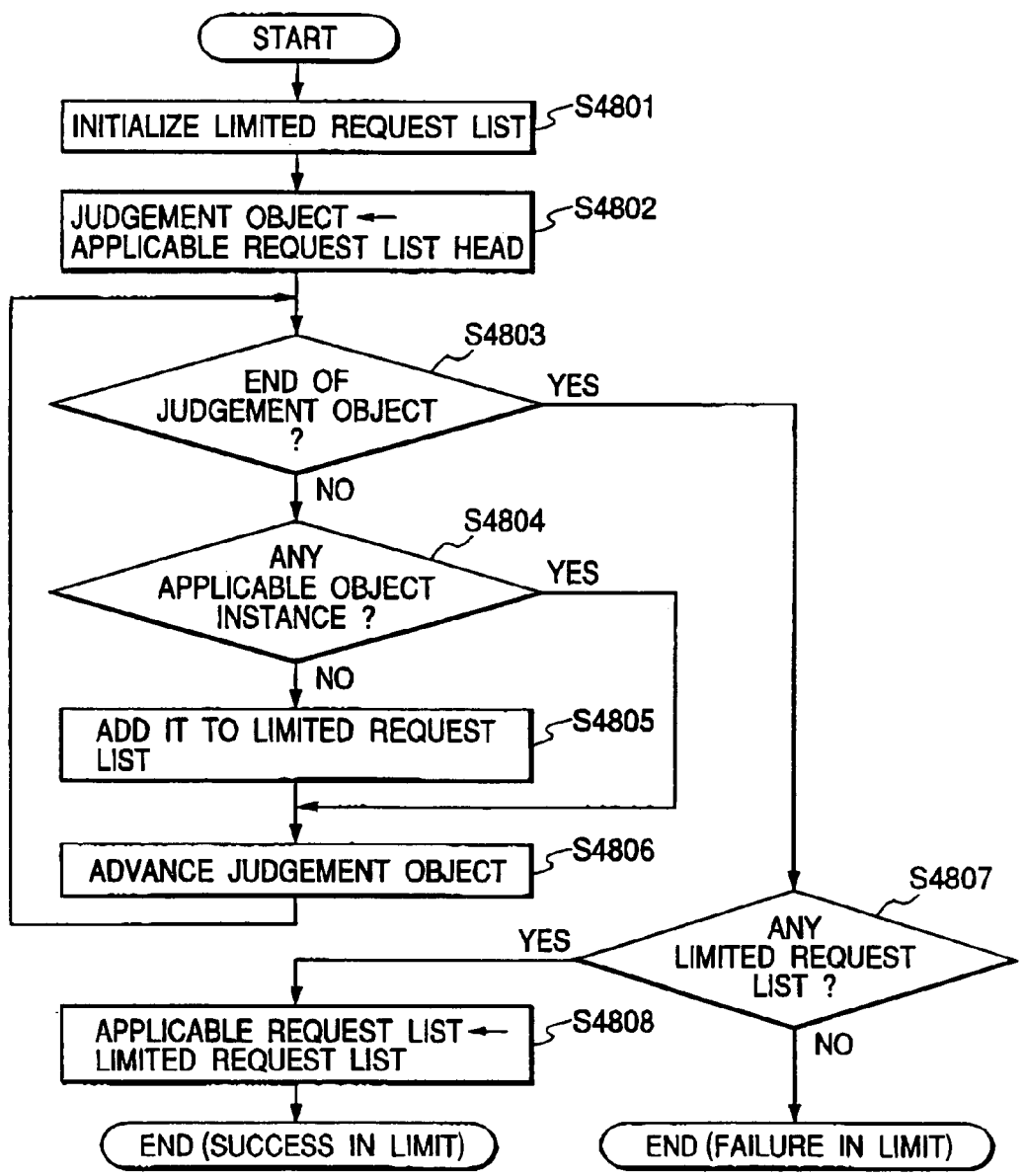
FIG. 48 is a flow chart illustrating an unconditional request information limitation process.

FIG. 48 is a flow chart illustrating the unconditional request information limitation process at Step S4701. The unconditional request information limitation process limits only to the applicable request information having no corresponding concept instance, without contradiction and conflict, by referring to the applicable request list limited at the concept level and surface layer level by the concept level applicable request information acquirement process and surface layer level applicable request information limitation process.

Specifically, as the unconditional request information limitation process is activated, at Step S4801 the limited request list is initialized to an empty list. At next Step S4802, the judgement object is initialized to the head portion of the input applicable request list. If it is judged at next Step S4803 that all judgement objects were processed, the flow advances to Step S4807 whereat it is checked whether the request information is present in the limited request list. If it is judged at Step S4807 that there is request information, the flow advances to Step S4808 whereat the contents of the limited request list are copied to the applicable request list, and it is judged as the limitation success, whereas if there is no request information, it is judged as the limitation failure to terminate the process.

If it is judged at Step S4803 that all judgement objects are not processed, the flow advances to Step S4804 whereat it is judged whether the request information as the judgement object has the applicable instance. If not, the flow advances to Step S4806. At next Step S4805 the request information as the judgement object is added to the limited request list. At next Step S4806, in order to use the next judgement object, the flow returns to Step S4803 to repeat the process.

Figure 49:
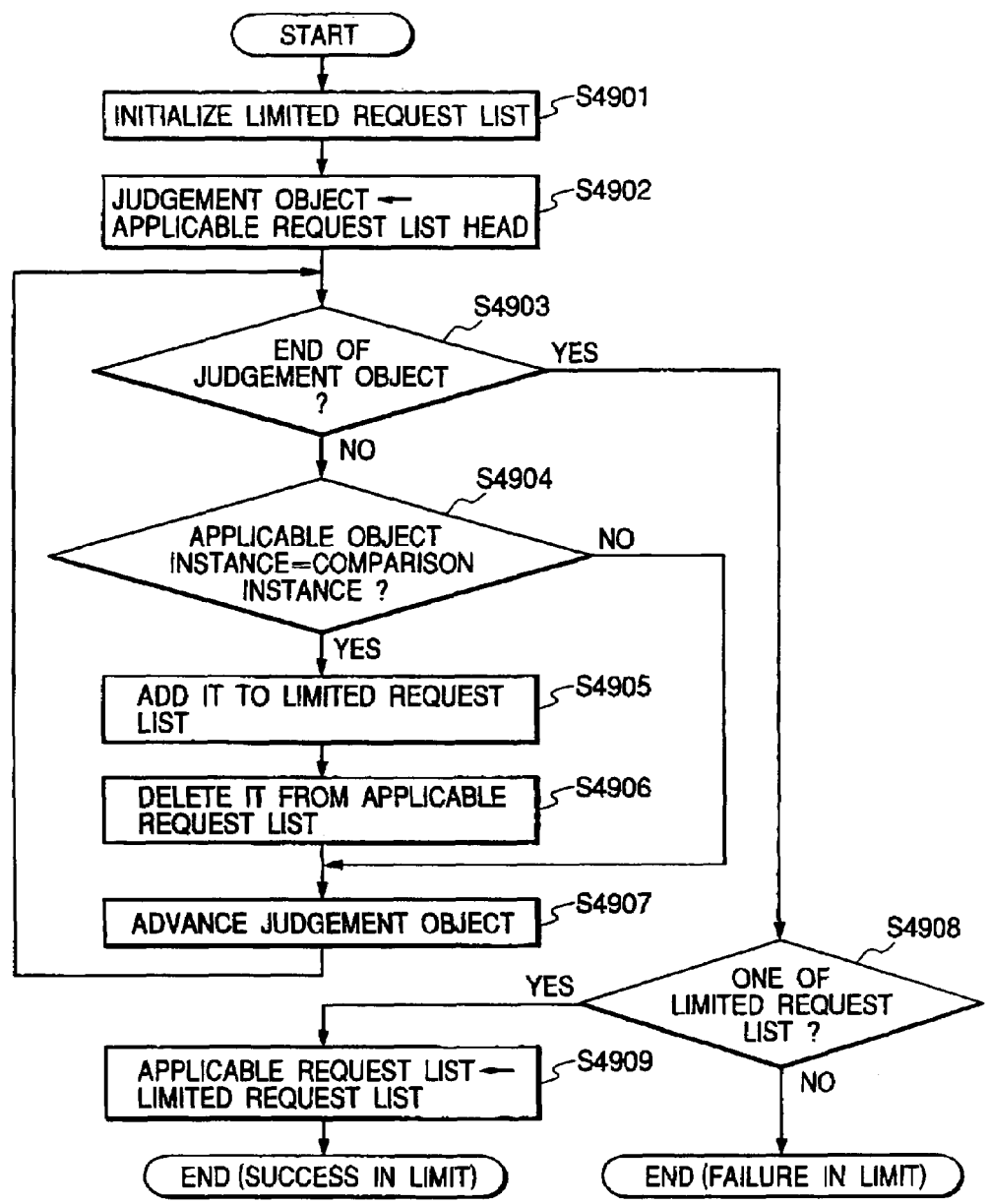
FIG. 49 is a flow chart illustrating a conditional request information limitation process.

FIG. 49 is a flow chart illustrating the conditional request information limitation process at Step S4705. The conditional request information limitation process limits only to a combination of the corresponding concept instance having only one piece of the request information, by referring to the applicable request list limited at the concept level and surface layer level by the concept level applicable request information acquirement process and surface layer level applicable request information limitation process.

Specifically, as the conditional request information limitation process is activated, at Step S4901 the limited request list is initialized to an empty list. At next Step S4902, the judgement object is initialized to the head portion of the input applicable request list.

If it is judged at next Step S4903 that all judgement objects were processed, the flow advances to Step S4908 whereat it is checked whether there is only one piece of the request information stored in the limited request list. If it is judged at Step S4908 that there is only one piece of the request information, the flow advances to Step S4909 whereat the contents of the limited request list are copied to the applicable request list, and it is judged as the limitation success, whereas if there is no request information, it is judged as the limitation failure to terminate the process.

If it is judged at Step S4903 that all judgement objects are not processed, the flow advances to Step S4904 whereat it is judged whether the application object instance of the request information as the judgement object is the same as the input comparison instance. If not, the flow advances to Step S4907. At next Step S4905 the request information as the judgement object is added to the limited request list. At next Step S4906, the request information as the judgement object is deleted from the applicable request list. At Step S4907, in order to use the nest judgement object, the flow returns to Step S4903 to repeat the process.

Figure 50:
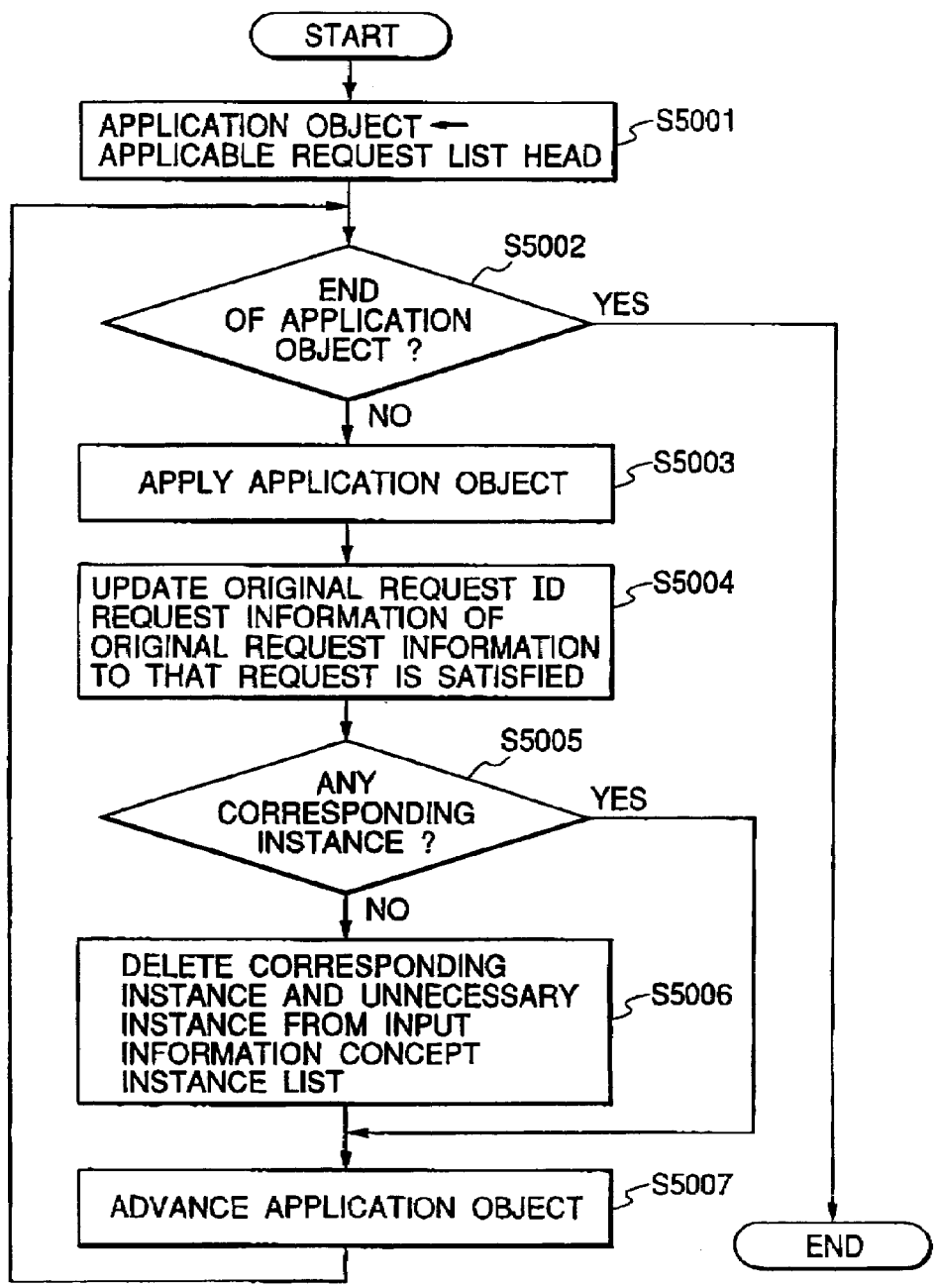
FIG. 50 is a flow chart illustrating a request information application process.

FIG. 50 is a flow chart illustrating the request information application process at Step S3606. The request information application process applies the request information, by referring to the applicable request list not conflicted and limited at the concept and surface layer levels by the concept level applicable request information acquirement process, surface layer level applicable request information limitation process and non-conflict request information limitation process.

For example, an initial value is stored in an input empty concept instance, other concept instances stored in the given input information concept instance list are unified, unnecessary concept instances are deleted from the input information concept instance list, the applicable request information is applied, the request list is updated, and other operations are performed.

Specifically, as the request information application process is activated, at Step S5001, the application object is initialized to the head portion of the input applicable request list. If it is judged at next Step S5002 that all application objects were processed, the process is terminated. At next Step S5003 the request information as the application object is actually applied. For example, as the request information ID=1 in the applicable request list shown in FIG. 38 is applied, the concept instance 3 shown in FIG. 27 has a value "mike" in the slot type FirstName shown in FIG. 28.

At next Step S5004 the request information designated by the original request information ID of the applied application object is updated to "request is satisfied". For example, as the request information is applied, the request information ID=3 of the request 3 shown in FIG. 31 is updated to "request is satisfied" as shown in FIG. 32. It is checked at next Step S5005 whether the applied application object has a corresponding instance. If not, the flow advances to Step S5007.

At next Step S5006, the corresponding instance of the applied application object and the instance combined by the surface layer level applicable request information limitation process are deleted from the input information concept instance list.

For example, as the request information ID=1 of the applicable request list shown in FIG. 40 is applied, the concept instance 1 shown in FIG. 25 has the concept instance 3 in the slot type To shown in FIG. 29, the request information is updated to "request is satisfied" as shown in FIG. 33, and the concept instance 3 and the concept instance 2 combined by the surface layer level applicable request information limitation process shown in FIG. 32 are deleted from the input information concept instance list shown in FIG. 32, to thereby have the results shown in FIG. 33. At next Step S5007, in order to use the next application object, the flow returns to Step S5002 to repeat the process.

Figures 51, 52:
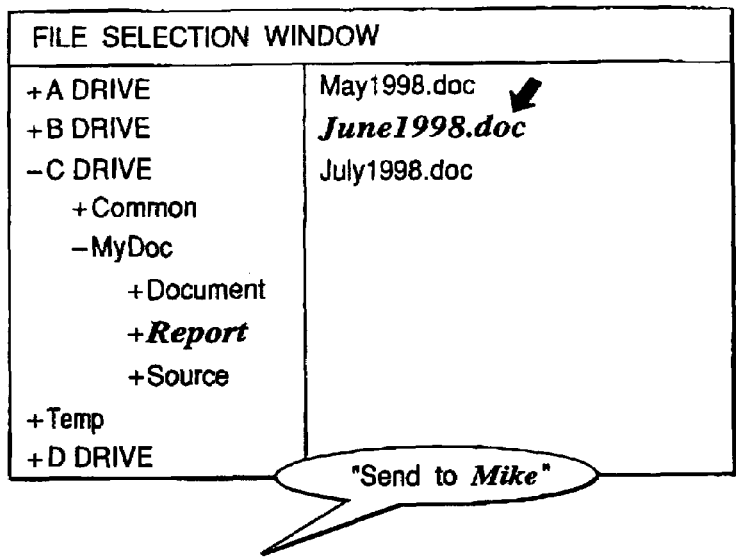
FIG. 51 is a diagram illustrating the state that an operator selects a file displayed on a file selection window and instructs a process through speech.
FIG. 52 is a diagram showing a concept instance list acquired by a concept instance list acquirement process.

FIG. 51 is diagram illustrating the state that an operator selects a file in a file selection window of the information processing apparatus and instructs a process through speech.

In this example, the operator selects a file June1998.doc in the directory Report under the directory MyDoc in the drive C by operating upon the file selection window of the information processing apparatus. The operator then instructs a process through speech "Send to Mike". The details of the sequences thereof will be given.

Figure 53:
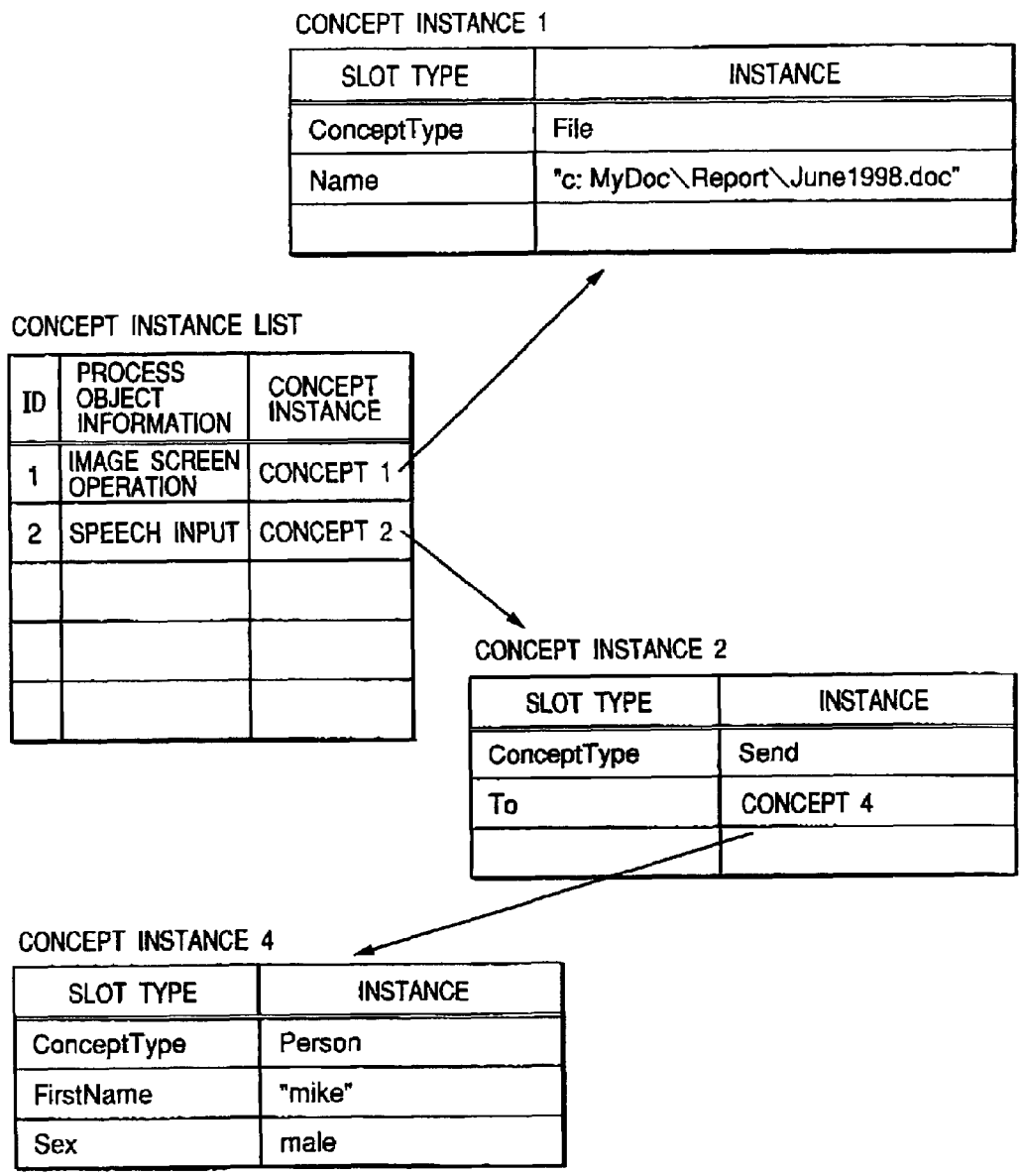
FIG. 53 is a diagram showing a concept instance list added by an input information concept instance generation process.

FIGS. 52 to 54 show examples of the concept instance list to be initialized and updated by the input analysis process shown in FIG. 13. The concept instance list is a list of concept instances generated in response to an input such as a speech input illustrated in FIG. 51 and a hand-written input or in accordance with the state of screen information presently displayed, internal information under operation, external information detected with a camera, a sensor or the like.

The input analysis process refers to such states to acquire concept instances, adds concept instances generated by referring to the input to the acquired concept instances, generates request information corresponding to the generated concept instances, and applies the request instance to thereby unify and develop the concept instances in the concept instance list.

The example shown in FIG. 52 shows a concept instance 1 of ConceptType=File generated by the concept instance list acquirement process from the information of the file selection window shown in FIG. 51, and a concept instance list associated with the concept instance 1.

The example shown in FIG. 53 shows a concept instance 2 of ConceptType=Send generated by the input information concept instance generation process from the speech input information "Sent to Mike" shown in FIG. 51, a concept instance 4 of ConceptType=Person associated with the slot To of the concept instance 2, and a concept instance list associated with the concept instances 1 and 2 shown in FIG. 52.

The example shown in FIG. 54 shows a concept instance list which was unified by the concept instance list unification process by referring to the concept instance list shown in FIG. 53. The concept instance 1 is related to the slot Object of the concept instance 2 and deleted from this concept instance list.

FIG. 55 is a diagram defining a concept File which is used as the standard for the concept instance to be generated and referred to in this embodiment. Similar to each concept shown in FIGS. 7 to 11 and FIG. 18, the concept File has a defined slot type which the concept can have, a defined application rule to be used for checking whether the instance can be applied to the slot; and a defined request rule for requesting a corresponding instance.

The concept File inherits ConceptType of the upper level concept, and the instance application rule and instance request rule are replaced by a fixed value File. The concept File also has a slot of the slot type Name. The concept File has a defined instance application rule and a defined instance request rule which indicates that the Name slot can store only a character string instance.

FIG. 56 shows an example of the request list to be initialized and updated by the concept instance list unification process at Step S1304 to be detailed with reference to FIG. 57. The request list to be initialized and updated by the concept instance list unification process is a list which stores request information representative of the process contents for each of the concept instances stored in the concept instance list before unification.

The concept instance list unification process refers to the concept instance list before unification, and generates request information corresponding to the stored concept instance, applies it to thereby unify and develop the concept instances in the concept instance list.

The example shown in FIG. 56 is the request list generated by referring to and processing the concept instance list before unification shown in FIG. 53.

Specifically, first, by referring to the concept instance 1 stored in the head portion of the concept instance list, the request information is generated basing upon ConceptType. Thereafter, by referring to the definition of the concept File shown in FIG. 55, the request information corresponding to the slot type Name is generated. However, in this case, since the concept instance 1 itself already has a value, the request information is not generated.

Next, by referring to the stored concept instance 2, the request information corresponding to ConceptType=Send is generated. In this case, since the value of the slot type To is already present, request information corresponding to the slot types Actor, Object and From is generated which is shown in FIG. 56.

Figure 57:
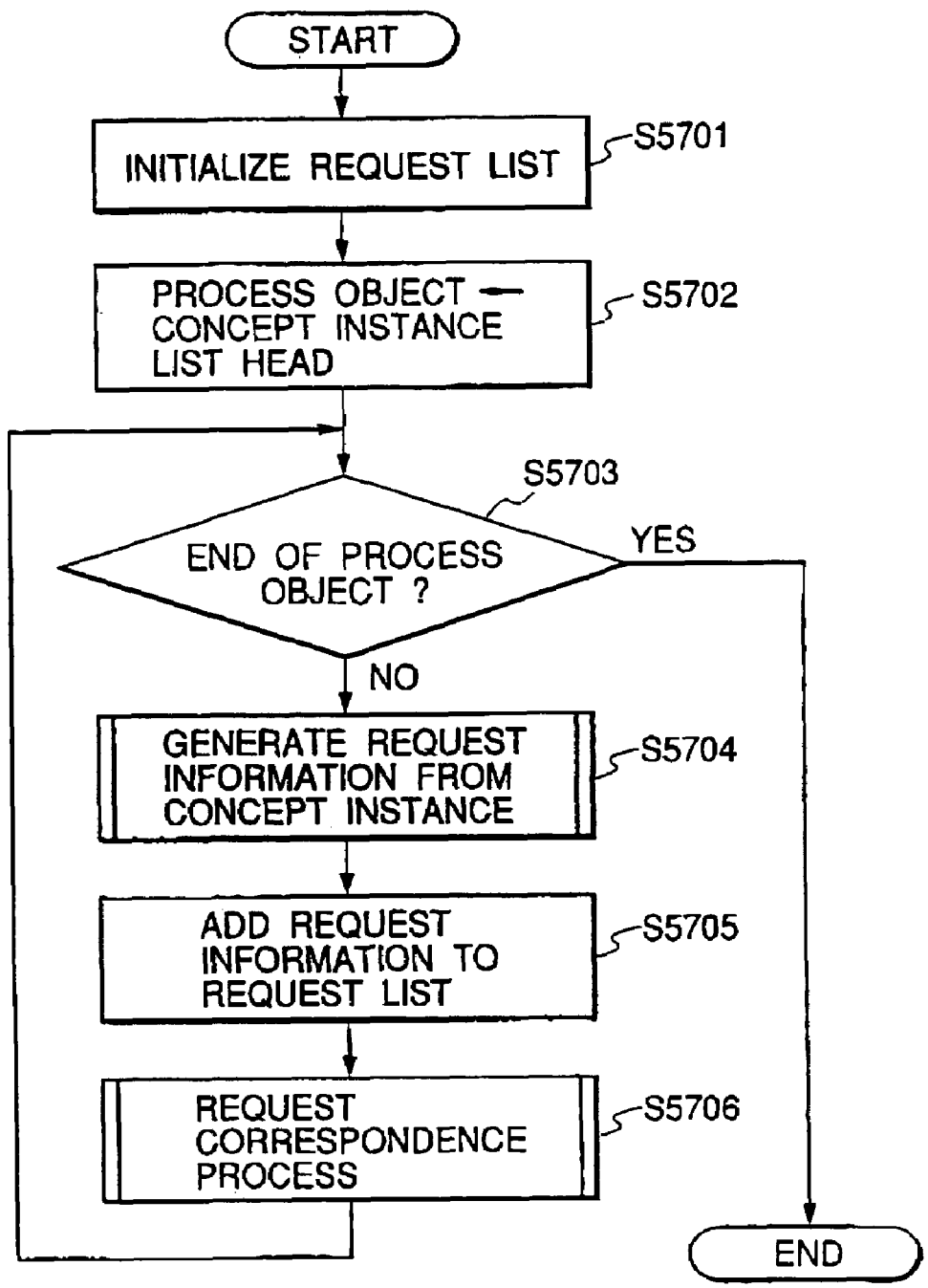
FIG. 57 is a flow chart illustrating the concept instance list unification process.

FIG. 57 is a flow chart illustrating the concept instance list unification process at Step S1304. The concept instance list unification process unifies and develops concept instances in the concept instance list, by generating corresponding request information and applying it and by referring to the concept instance list acquired by the concept instance list acquirement process and generated and added by the input information concept instance generation process.

Specifically, as the concept instance list unification process is activated, at Step S5701 the request list is initialized to an empty list, and at next Step S5702 the process object is initialized to the head portion of the input concept instance list. If it is judged at next Step S5703 that all process objects were processed, the process is terminated. In a process of generating request information from the concept instance at Step S5704 the concept definition designated by the Concept-Type of the concept instance as the process object is referred to generate the request information of all slot types whose concept instances have no value.

At next Step S5705 the generated request information is added to the request list. In a request respondence process at next Step S5706, the request information stored in the request list is referred to unify other concept instances stored in the concept instance list and perform other operations. Thereafter, the flow returns to Step S5703 to repeat the process.

Figure 58:
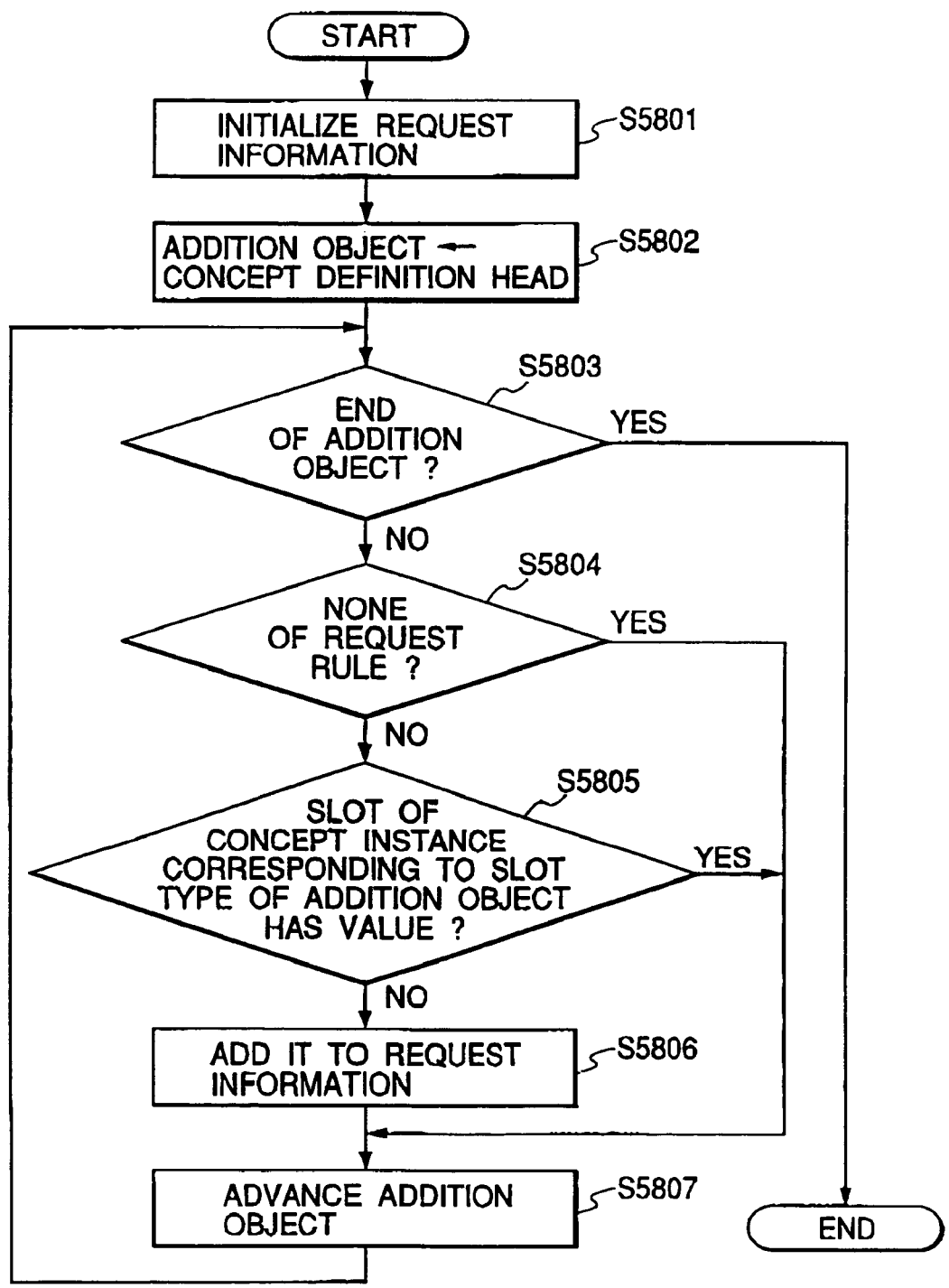
FIG. 58 is a flow chart illustrating a process of generating request information from a concept instance.

FIG. 58 is a flow chart illustrating the process of generating request information from the concept instance at Step S5704. The process of generating request information from the concept instance adds only the request information of the slot type whose input concept instance has no value, by referring to the concept instance request rule of the concept definition designated by ConceptType of the input concept instance. Without replacing the slot already having a value, it is therefore possible that the slot having no value acquires a value so that the request information can be generated.

Specifically, as the process of generating request information from the concept instance is activated, at Step S5801 the request information is initialized, and at next Step S5802 the addition object is initialized to the head portion of the concept instance request rule of the concept definition. For example, if ConceptType of the concept instance is Send, the definition shown in FIG. 11 is referred to initialize the addition object to the slot type Actor. All addition objects correspond to all concept instance request rules other than the slot type ConceptType, and the order thereof has no significant meaning. Therefore, the term head portion has no meaning, and the addition object is initialized merely by the head portion Actor other than the slot type ConceptType shown in FIG. 11.

At next Step S5803 it is checked whether all addition objects were processed. If processed, the process is terminated. If it is judged that all addition objects are not processed, it is checked at next Step S5804 whether there is the concept instance request rule of the addition object. If not, the flow advances to Step S5607.

If there is a concept instance request rule of the addition object, at next Step S5805 it is checked whether the slot of the input concept instance corresponding to the slot type of the addition object has a value. If it has a value, the flow advances to Step S5807. With this judgement Step, it is possible to avoid replacing the slot whose concept instance has already a value. If the corresponding slot has no value, at next Step S5806 the request information is added basing upon the concept instance request rule of the addition object.

At next Step S5807, in order to use the next addition object, the flow returns to Step S5803 to repeat the process.

Specific Example

The sequential operations to be executed when an operator inputs key information "Send c:\MyDoc\Report\June1998.doc to Mike" with the keyboard, will be described in detail.

Figure 59:
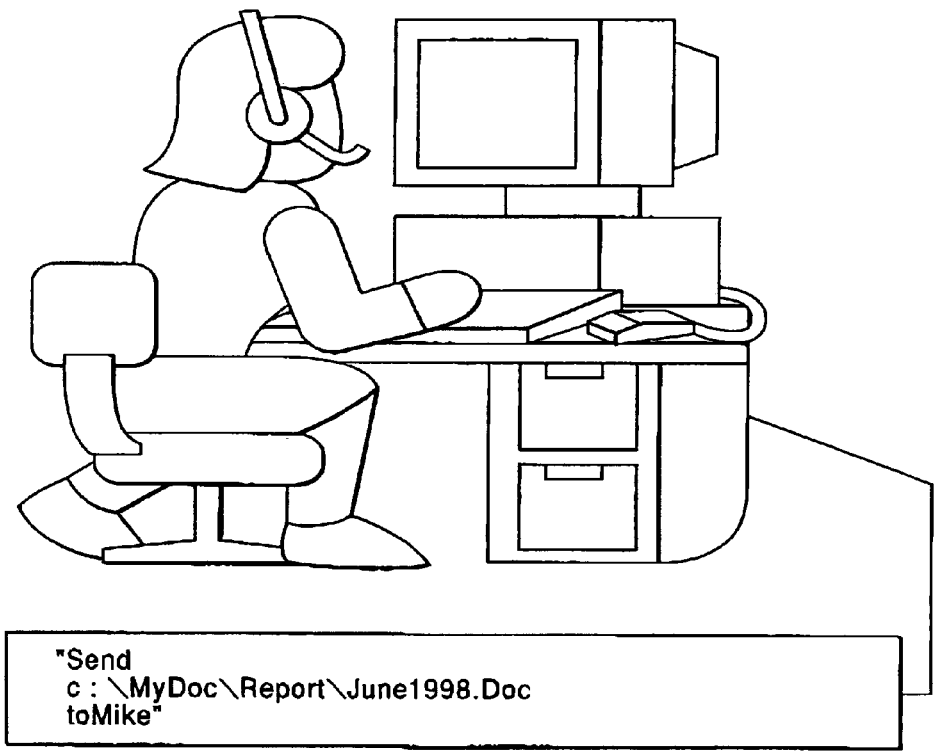
FIG. 59 is a diagram illustrating an input of key information from a keyboard.

FIG. 59 is a diagram illustrating the state that an operator inputs key information "Send c:\MyDoc\Report\June1998.doc to Mike" with the keyboard.

Information input by an operator is detected by input detection process at Step S301 shown in FIG. 3. It is therefore judged at Step S302 that there is an input. At next Step S303 it is judged whether the detected input information is the information to be analyzed by the input analysis process which is the main component of the invention.

In this case, since the input is natural language information, it is judged that the input is the information to be analyzed by the input analysis process, and the key input information is analyzed by the input analysis process at Step S304.

In this case, there is no external and internal states and past state to be taken into consideration. Therefore, the concept instance list acquirement process at Step S1301 of the input analysis process shown in FIG. 13 acquires no information and the concept instance list generated by the input information concept instance generation process at next Step S1302 is used as it is.

Specifically, in the input information concept instance generation process shown in FIG. 15, the input conversion process at Step S1501 converts the input key information into the data format capable of being analyzed. In this case, the input key information is converted from key codes into character information capable of being processed, and when necessary converted into a kana-kanji mixed character string by the kana-kanji conversion process.

At next Step S1502 the process object information is initialized to the input and converted information "Send c:\MyDoc\Report\June1998.doc to Mike". Since the process object information is not present, the process is executed at next Step S1503.

The knowledge database retrieval process at next Step S1504 searches the head portion of the process object information so that information of "send" shown in FIG. 17 is retrieved from the knowledge database shown in FIG. 16. It is judged as the retrieval success at next Step S1505. At next Step S1507 by referring to the retrieved result ConceptType, an empty concept instance is generated by using the designated concept Send, and added at next Step S1508 to the input information concept instance list.

In the request information generation process at next Step S1509, the request information is generated in accordance with the request rule (FIG. 17) of the retrieved result and the instance request rule (FIG. 11) defined by the concept Send designated by ConceptType of the retrieval result. Since the retrieval result contains the request rules of all slots, only the request information corresponding to the request rule of the retrieval result is generated as shown in FIG. 30 without being replaced by the request rule of the concept definition. The generated request information is added to the request information list at next Step S1510.

In the request respondence process at next Step S1511, by referring to the request information stored in the request information list, a process corresponding only to the applicable request information not conflicting with other request information is executed. However, since there is no applicable request information, no process is executed, and the presently processed information "Send" is deleted from the process object information at Step S1512 to thereafter return to Step S1503.

Since the second process object information exists as "c:\MyDoc\Report\June1998.doc to Mike", the process continues.

The knowledge database retrieval process at next Step S1504 searches the head portion of the process object information and recognizes that "c:\MyDoc\Report\June1998.doc to Mike" is a description format of the File name. It is therefore judged as the retrieval success at next Step S1505, At next Step S1507 an empty concept instance is generated by using the concept File designated by the retrieval result, and added to the input information concept instance list at next Step S1508.

In the request information generation process at next Step S1509, the request information is generated in accordance with the request rule of the retrieval result and the instance request rule (FIG. 54) defined by the concept File designated by ConceptType of the retrieval result. Therefore, only the request information [store character string "c:\MyDoc\Report\June1998.doc" in slot Name] is generated and added to the request information list at next Step S1510.

In the request respondence process at next Step S1511, by referring to the request information stored in the request information list, a process corresponding only to the applicable request information not conflicting with other request information is executed. Since the applicable request information was found, in accordance with this request information, the character string is stored in the slot Name of the generated concept instance. At next Step S1512, the presently processed information "c:\MyDoc\Report\June1998.doc" is deleted from the process object information to thereafter return to Step S1503.

Since the third process object information exists as "to Mike", the process continues. The knowledge database retrieval process at next Step S1504 searches the head portion of the process object information and recognizes that there is no information corresponding to the process object information. Therefore, at Step S1506 ConceptType of the process object information "to" is set as the concept Concept of ConceptType. At next Step S1507 an empty concept instance is generated by using the concept Concept and added to the input information concept instance list at next Step S1508.

In the request information generation process at next Step S1509, although the request information is generated in accordance with the instance request rule (FIG. 7) defined by the concept Concept designated by ConceptType, the request information to be generated is not defined so that no information is added to the request list.

In the request respondence process at next Step S1511, by referring to the request list stored in the request information list, a process corresponding only to the applicable request information not conflicting with other request information is executed. However, since there is no applicable request information, no process is executed, and the presently processed information "to" is deleted from the process object information at Step S1512 to thereafter return to Step S1503.

Since the fourth process object information exists as "Mike", the process continues. The knowledge database retrieval process at next Step S1504 searches the head portion of the process object information and retrieves the information of "mike" shown in FIG. 19 from the knowledge database shown in FIG. 16. Therefore, it is judged as the retrieval success at next Step S1505. At next Step S1507 by referring to ConceptType of the retrieval result, an empty concept instance is generated by using the concept Person designated by ConceptType and added to the input information concept instance list at next Step S1508.

In the request information generation process at next Step S1509, the request information is generated in accordance with the request rule of the retrieved result and the instance request rule (FIG. 18) defined by the concept Person designated by ConceptType of the retrieval result. Since the retrieval result contains the request rules of all slots, only the request information corresponding to the request rule of the retrieval result is generated as shown in FIG. 31 without being replaced by the request rule of the concept definition. The generated request information is added to the request information list at next Step S1510.

In the request respondence process at next Step S1511, by referring to the request information stored in the request information list, a process corresponding to only the applicable request information not conflicting with other request information is executed.

Specifically, in the request respondence process shown in FIG. 36, first at Step S3601, the applicable request list is initialized to an empty list. In the concept level request information acquirement process at next Step S3602, by referring only to the request information at the concept level, all applicable request information is added to the applicable request information list. In the surface layer level request information limitation process at next Step S3603, by referring to the request information at the surface layer level at a plurality of stages, the applicable request information list is limited only to applicable request information.

At the first stage, the request information is limited only to the request information having no risk of conflict between a plurality piece of request information and having no concept instance which becomes a request information object. Therefore, the request information is limited only to the request information having no corresponding concept instance such as shown in FIG. 38.

In the non-conflict request information limitation process at next Step S3604, the request information is limited only to the request information not conflicting with other request information. However, as described above, the request information is limited to only the request information not conflicting at the stage of the surface layer level request information limitation process. Therefore, the request information shown in FIG. 38 is used as it is. It is therefore judged at next Step S3605 that there is request information. In the request information application process at next Step S3606, the request information is applied. Therefore, values are stored in the slots FirstName and Sex as shown in FIG. 28 and the applied request information is updated as "request is satisfied" as shown in FIG. 32. Thereafter, the flow returns to Step S3601 to continue the process.

Similarly, in the second loop, at Step S3601 the applicable request list is initialized to an empty list. In the concept level request information acquirement process at next Step S3602, by referring only to the request information at the concept level other than the "request is satisfied" concept level, all applicable request information is added to the applicable request information list. In the surface layer level request information limitation process at next Step S3603, by referring to the request information at the surface layer level at a plurality of stages, the applicable request information list is limited only to applicable request information.

Since the request information is applied at the first stage in the previous loop, there is no request information having no concept instance which becomes a request information object. Therefore, at the second stage, the request information is limited only to the request information satisfying the word order rule among the request information at the surface layer level. The request information is therefore limited only to the applicable request information which satisfies the request information ID=1 ["send" {Object} "to" {To}] of the request 2 shown in FIG. 30.

Specifically, the applicable request information is limited to the request information satisfying [store concept instance of concept File generated in correspondence with process object information "c:\MyDoc\Report\June1998.doc" in slot Object] and [store concept instance of concept Person generated in correspondence with process object information "Mike" in slot To].

In the non-conflict request information limitation process at next Step S3604, the request information is limited only to the request information not conflicting with other request information. However, as described above, the request information stored in the applicable request information list is combined with a different concept instance. It is therefore judged that the request information does not conflict, and so the request information is not changed. It is therefore judged at next Step S3605 that there is request information. In the request information application process at next Step S3606, the request information is applied.

Therefore, corresponding instances are stored in the slots Object and To, and the stored concept instances and concept instances related to the request information are deleted from the input information concept instance list. Namely, deleted from the input information concept instance list are the concept instances stored in the concepts File and Person, and the concept instances corresponding to "to" associated with application of the request information at the word order level. Therefore, only the concept instance of the concept Send is left at this time in the concept instance list. The applied request information is updated to "request is satisfied", to thereafter return to Step S3601 and continue the process.

Similarly, in the third loop, at Step S3601 the applicable request list is initialized to an empty list. In the concept level request information acquirement process at next Step S3602, by referring only to the request information at the concept level other than the "request is satisfied" concept level, all applicable request information is added to the applicable request information list. However, at this time, the input information instance list contains only the concept instance of the concept Send so that the applicable request information list remains empty. It is therefore judged at Step S3605 that there is no request information so that the request respondence application is terminated and the flow returns to Step S1503.

Since the fifth process object information does not exist, the concept instance generation process is terminated. At next Step S1303, the generated concept instance of the concept Send is added to the concept instance list. In the concept instance list unification process at next Step S1304, a plurality of concept instances stored in the concept instance list are unified by considering a relation between the concept instances. However, in this example, there is only one concept instance, the unification process is not executed and the input analysis process is terminated.

In the process determination process at next Step 305, a process to be executed is determined by referring to the concept instance list. In this example, ConceptType of the concept instance stored in the concept instance list is Send so that a Send process is determined. In the execution instruction process at next Step S306, an internal process, an external process in the apparatus, or a process in an external apparatus is instructed. Specifically, depending upon the values in the slots Object and To of the concept instances, a method of instructing a process changes as to which method is used, whether the actual process is executed immediately after the instruction or after a predetermined time lapse, or the like.

If it is judged at next Step S307 that the instruction does not indicate an end, the flow returns to Step S301 to prepare for a new input or the like. If it is judged at Step S307 that the instruction indicates an end, the flow advances to an end process at Step S308 to execute an actual termination process.

Second Embodiment

In this embodiment, a method of collectively understanding and processing information input from a plurality of input units by correlating the plurality piece of information, will be described specifically.

Figure 60:
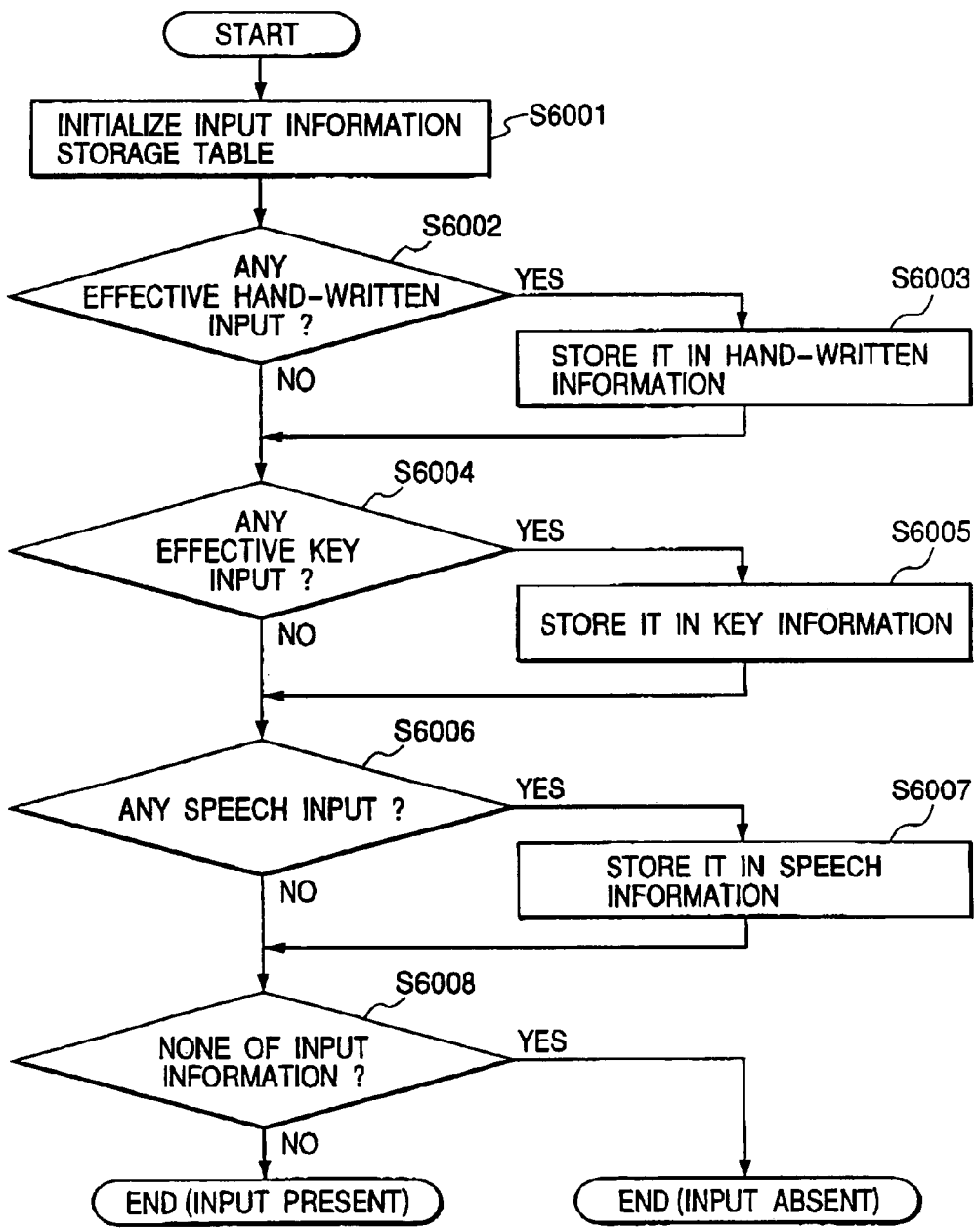
FIG. 60 is a flow chart illustrating an input detection process dealing with a plurality piece of input information.

FIG. 60 is a flow chart illustrating the input detection process at Step S301 shown in FIG. 3. The different point from the flow chart shown in FIG. 12 is that information input from a plurality of input units can be processed.

Figures 63, 64:
FIG. 63 is a diagram showing an example of an input information storage table.
FIG. 64 is a diagram showing a concept instance list added by the input information concept instance generation process.

The input detection process of this embodiment checks inputs from a plurality of input units, and stores the input information in an input information storage table shown in FIG. 63 to detect whether there is any piece of effective information to be processed by the information processing apparatus.

Specifically, as the input detection process is activated, at Step S6001 the input information storage table is initialized to empty values.

At next Step S6002 it is checked whether effective hand-written information is input. If input, the flow advances to Step S6003 whereat the input hand-written information is stored in the input information storage table.

At next Step S6004 it is checked whether effective key information is input. If input, the flow advances to Step S6005 whereat the input key information is stored in the input information storage table.

At next Step S6006 it is checked whether effective speech information is input. If input, the flow advances to Step S6007 whereat the input speech information is stored in the input information storage table.

At next Step S6008 it is checked whether input information is stored at any of Steps S6003, 6005 and 6007 in the input information storage table. If there is an effective input, it is judged as "input present" to thereafter terminate the process, whereas if there is no effective input, it is judged as "input absent" to thereafter terminate the process.

Figure 61:
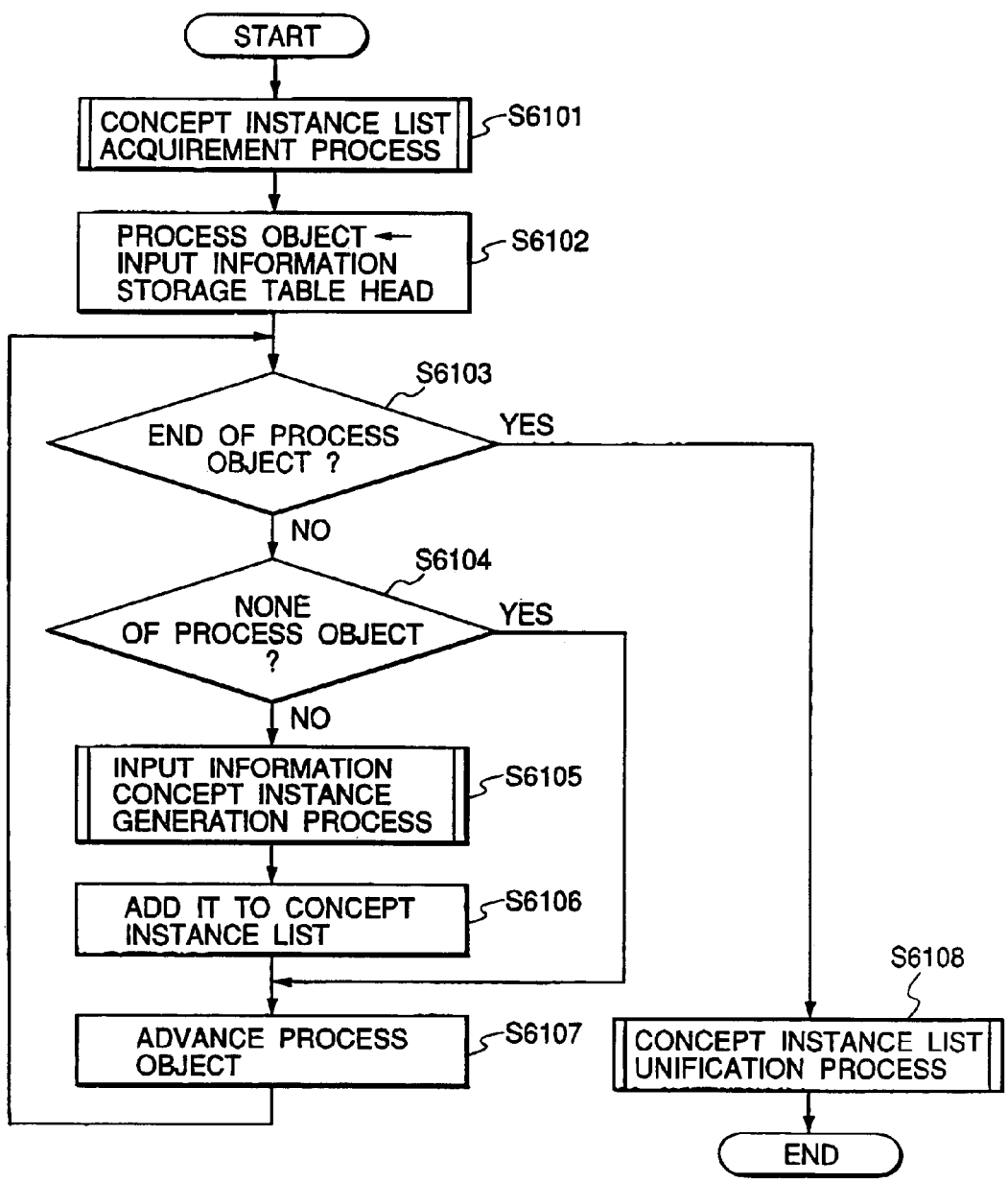
FIG. 61 is a flow chart illustrating an input analysis process dealing with a plurality piece of input information.

FIG. 61 is a flow chart illustrating the input analysis process at Step S304. The different point from the flow chart shown in FIG. 13 is that information input from a plurality of input units can be processed.

The input analysis process of this embodiment generates a concept instance list which stores concept instances generated in accordance with the state at the input time, the past state, and input information to be analyzed.

Specifically, as the input analysis process is activated, in the concept instant list acquirement process at Step S6101, a concept instance list is generated which stores concept instances generated in accordance with the state at the input time and the past state.

At next Step S6102 the process object is initialized to the start of the input information storage table shown in FIG. 63. At next Step S6103 it is checked whether all process objects were processed. If processed, in the concept instance list unification process at Step S6108, by referring to the concept instances generated by the above process and stored in the concept instance list, associated concept instances are unified to some concept instance to thereafter terminate the process.

If it is not judged at Step S6103 that all process objects were processed, it is judged at next Step S6104 whether there is input information corresponding to the input unit to be processed. If not, the flow advances to Step S1607. If it is judged at Step S6104 that there is input information, in the input information concept instance generation process at next Step S6105, an input information concept instance list is generated which stores a concept instance generated from the input information to be analyzed, and at next Step S6106 added to the concept instance list. At next Step S6107, in order to use the next process object, the flow returns to Step S6103 to repeat the process.

Figure 62:
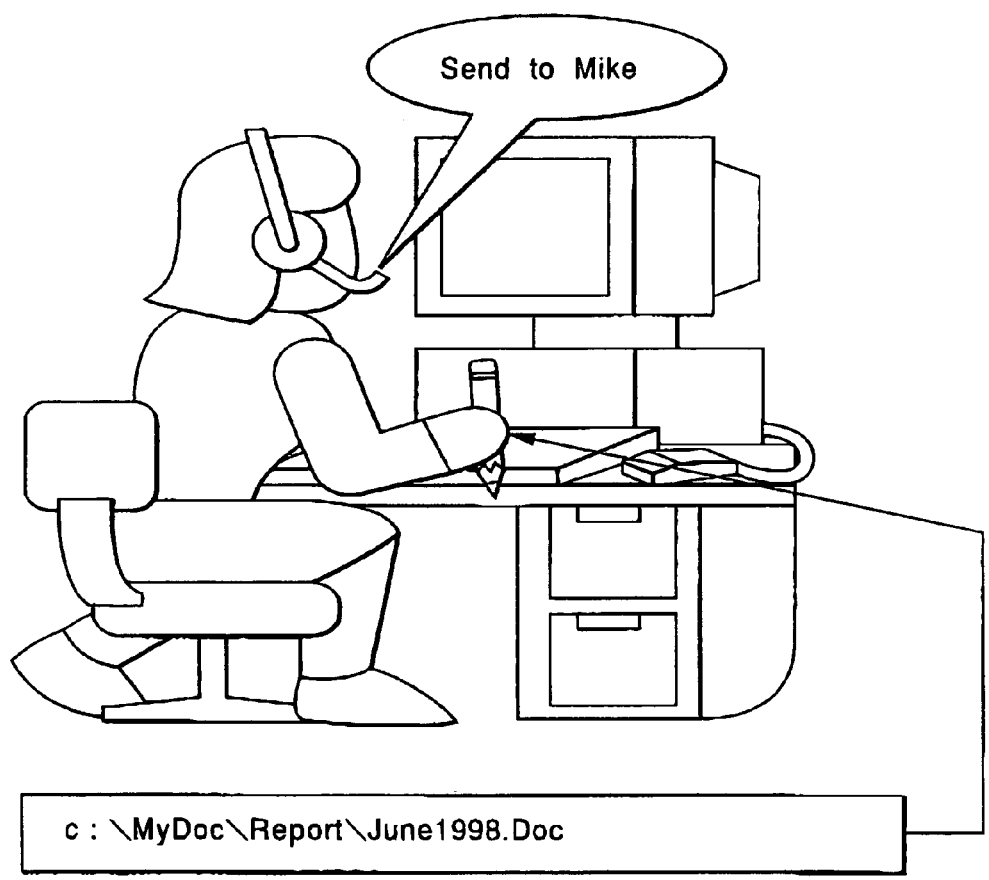
FIG. 62 is a diagram showing the state that hand-written information is input with a handwriting input unit and speech information is input with a speech input unit.
Figure 65:
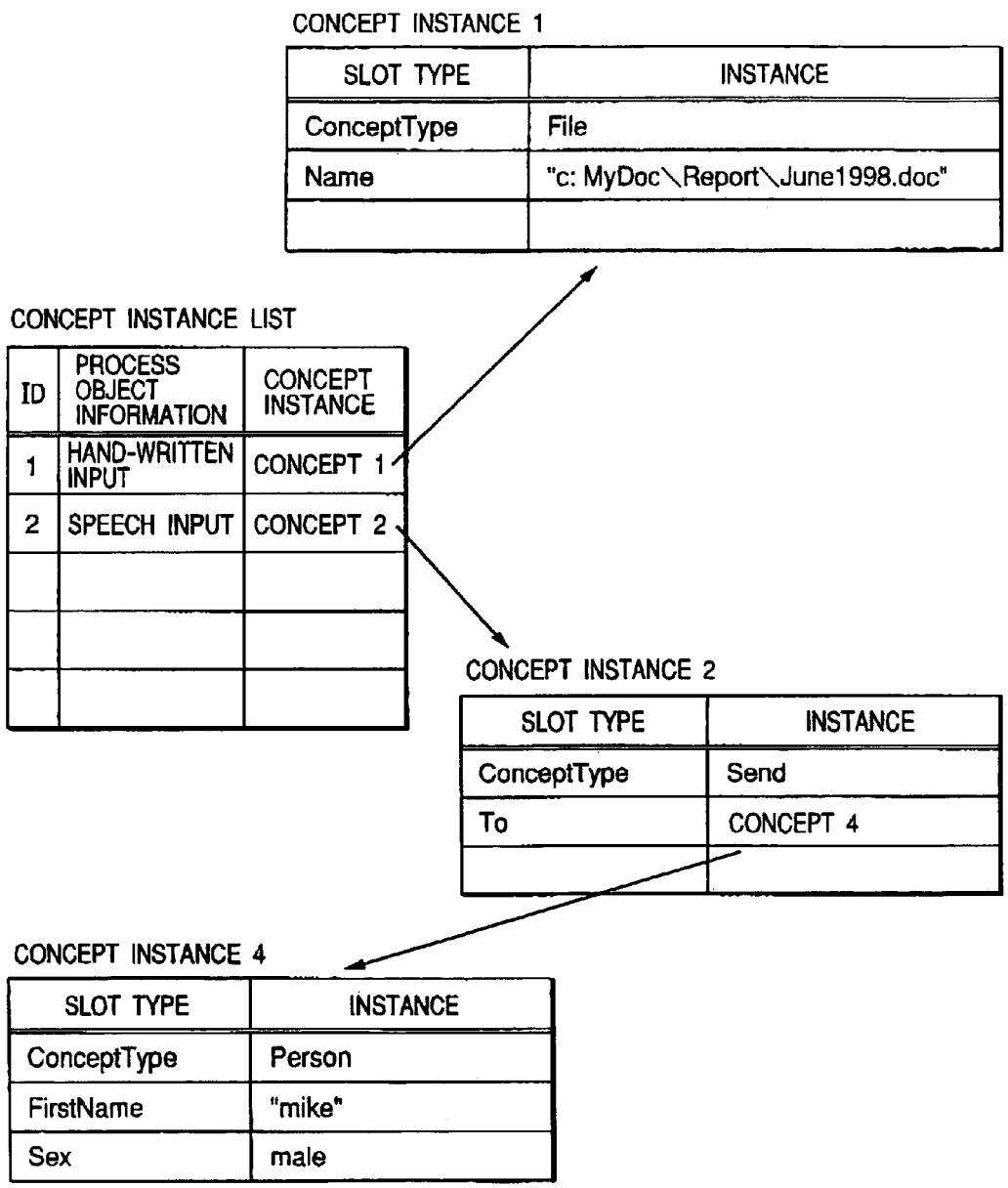
FIG. 65 is a diagram showing a concept instance list added by the input information concept instance generation process.

FIG. 62 is a diagram illustrating that an operator inputs hand-written information "c:\MyDoc\Report\June1998.doc" with the handwriting input unit and inputs speech information "Send to Mike" with the speech input unit. FIG. 63 is a diagram showing an example of the input information storage table in which input information is stored by the input detection process shown in FIG. 60 after the information input shown in FIG. 62. FIGS. 64 to 66 are diagrams showing examples of the concept instance list initialized and updated by the input analysis process shown in FIG. 61.

The concept instance list of this embodiment is generated in accordance with the states of inputs such as the speech input and hand-written input shown in FIG. 62, screen information displayed at the input time, internal information in operation, and external information connected by a network or the like or detectable with a camera, a sensor or the like.

The input analysis process acquires the concept instance list by referring to such states, and adds the concept instance generated by referring to the inputs to the acquired concept instance list, generates the request information corresponding to the generated concept instance, and applies the generated request information. In this manner, the input analysis process unifies and develops the concept instances in the concept instance list.

FIG. 64 is a diagram showing a concept instance 1 of ConceptType=File generated from the input hand-written information shown in FIG. 62 by the input information concept instance generation process and a concept instance list associated with the concept instance 1.

FIG. 65 is a diagram showing a concept instance 2 of ConceptType=Send generated from the input speech information "Send to Mike" shown in FIG. 62 by the input information concept instance generation process, a concept instance 4 of ConceptType=Person associated with the slot To of the concept instance 2, and a concept instance list associated with the concept instance 1 shown in FIG. 64 and the concept instance 2.

FIG. 66 is a diagram showing the concept instance list unified by the concept instance list unification process by referring to the concept instance list shown in FIG. 65. The concept instance 1 is associated with the slot Object of the concept instance 2 and deleted from the concept instance list.

The process that an operator inputs hand-written information "c:\MyDoc\Report\June1998.doc" with the handwriting input unit and inputs speech information "Send to Mike" with the speech input unit, will be described in detail with reference to relevant drawings.

Information input by an operator is detected by the input detection process at Step S301 in FIG. 3 showing the overall process. Specifically, as the input detection process shown in FIG. 60 is activated, the input information storage table is initialized to empty values at Step S6001.

At next Step S6602 it is judged that the effective hand-written information "c:\MyDoc\Report\June1998.doc" is input. At Step S6003 the input hand-written information is stored in the input information storage table. At next Step S6004 it is judged that effective key information is not input, and the flow skips to Step S6006.

At Step S6006 it is judged that the effective speech information "Send to Mike" is input. At Step S6007 the input speech information is stored in the input information storage table. At next Step S6008 it is judged that the hand-written information and speech information are stored by the above processes, and it is judged as "input present" to terminate the input detection process.

Therefore, at Step S302 it is judged that there is an input. At next Step S303 it is judged whether the detected input information is information to be subject to the input analysis process which is a main component of the invention. In this example, since the input information is natural language information, it is judged that the input information is to be subjected to the input analysis process. The input information is analyzed by the input analysis process at next Step S304.

Specifically, as the input analysis process shown in FIG. 61 is activated, the concept instance list acquirement process at Step S6101 generates the concept instance list which stores concept instances generated in accordance with the state at the input time and the past state. However, in this example, the concept instance list is not generated.

At next Step S6102 the process object is initialized to the input ID=1 at the top of the input information storage table shown in FIG. 63. At next Step S6103 it is judged that all process objects are not processed. It is checked at next Step S6104 whether there is input information corresponding to the input unit to be processed. Since there is the hand-written information "c:\MyDoc\Report\June1998.doc" corresponding to the input ID=1, the flow advances to next Step S6105.

The input information concept instance generation process at Step S6105 generates the input information concept instance list which stores the concept instance generated from the hand-written information to be analyzed, and at next Step S6106 adds it to the concept instance list (FIG. 64). At next Step S6107, in order to use the next process object, the flow returns to Step S6103 to repeat the process.

For the second process object, it is also judged at Step S6103 that all process objects are not processed. At next Step S6104 it is judged whether there is input information corresponding to the input unit to be processed. Since there is no key information corresponding to the input ID=2, at Step S6107, in order to use the next process object, the flow returns to Step S6103 to repeat the process.

For the third process object, it is also judged at Step S6103 that all process objects are not processed. At next Step S6104 it is judged whether there is input information corresponding to the input unit to be processed. Since there is the speech information "Send to Mike" corresponding to the input ID=3, the flow advances to Step S6105.

The input information concept instance generation process at Step S6105 generates the input information concept instance list which stores the concept instance generated from the input speech information to be analyzed, and at next Step S6106 adds it to the concept instance list (FIG. 65). At next Step S6107, in order to use the next process object, the flow returns to Step S6103 to repeat the process.

Since the fourth process object does not exist, it is judged at Step S6103 that all process objects are processed. The concept instance list unification process at Step S6108 refers to the concept instances generated by the above processed and stored in the concept instance list, and unifies the associated concept instances to some concept instance, to thereafter terminate the input analysis process.

Specifically, as the concept instance list unification process shown in FIG. 57 is activated, the request information is generated basing upon ConceptType by referring to the concept instance 1 stored in the concept instance list at the top thereof. In this case, although the request information corresponding to the slot type Name is to be generated by referring to the definition of the concept File shown in FIG. 54, the request information is not generated because the concept instance 1 itself has already a value.

Next, by referring to the concept instance 2 stored at the next location, the request information corresponding to ConceptType=Send is generated. Since the value of the slot type To is already had, only the request information of the slot types Actor, Object and From is generated which result is shown in FIG. 55. Thereafter, the request information is applied and the unified result is obtained which is the concept instance list shown in FIG. 66.

In the process determination process at next Step S305, a process to be executed is determined by referring to the concept instance list. In this example, a Send process is determined because the ConceptType of the concept instance stored in the concept instance list is Send.

In the execution instruction process at next Step S306, an internal process, an external process in the apparatus, or a process in an external apparatus is instructed. Specifically, depending upon the values in the slots Object and To of the concept instances, a method of instructing a process changes as to which method is used, whether the actual process is executed immediately after the instruction or after a predetermined time lapse, or the like.

If it is judged at next Step S307 that the instruction does not indicate an end, the flow returns to Step S301 to prepare for a new input or the like.

If it is judged at Step S307 that the instruction indicates an end, the flow advances to an end process at Step S308 to execute an actual termination process.

In this embodiment, a combination of the hand-written input and speech input has been described. As will be easily understood, a combination of an key input and a speech input can also be processed in a similar manner. Further, although the combination of the hand-written input and speech input has been described in this embodiment, a combination of an image input and a speech input by using a scanner, a camera or the like can also be processed in a similar manner as will be easily understood.

Third Embodiment

In this embodiment, a method of processing information of different types input from a plurality of input units by converting the information of different types into information of the same type, will be described specifically.

Figure 67:
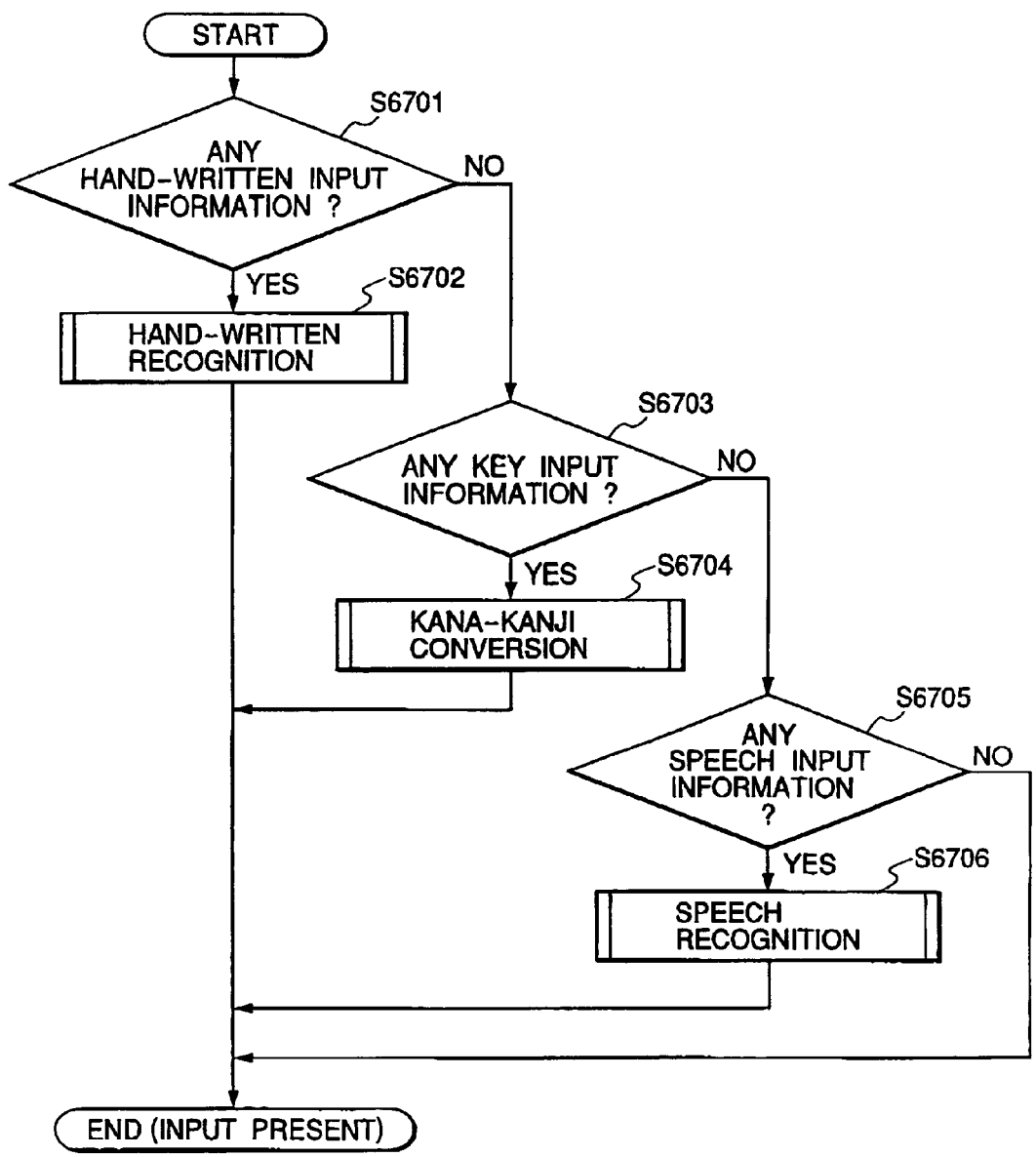
FIG. 67 is a flow chart illustrating an input conversion process dealing with a plurality piece of input information.

FIG. 67 is a flow chart illustrating the input conversion process at Step S1501 described with reference to the input information concept instance generation process shown in FIG. 15. In the input conversion process, input information to be analyzed is converted into process object information capable of being processed. For example, if information stored in the knowledge database to be referred to by a knowledge database retrieval process to be later described is constituted of information necessary for generating an input character string and a concept instance, information input in a different format is converted into the character string format capable of being retrieved.

Namely, as shown in FIG. 2, when hand-written information is input, it is converted into a character string by the hand-written recognition process, when key information is input, it is converted into a character string by the kana-kanji conversion process, and when speech information is input, it is converted into a character string by the speech recognition process.

Specifically, as the input conversion process is activated, it is checked at Step S6701 whether the input information is hand-written information. If it is hand-written information, in the hand-written recognition process at Step S6702 the hand-written input information is converted into a character string as the process object information to thereafter terminate the process. If it is not hand-written information, it is checked at Step S6703 whether the input information is key information. If it is key information, in the kana-kanji conversion process at Step S6704 the key information is converted into a character string as the process object information to thereafter terminate the process.

If it is not key information, it is checked at Step S6705 whether the input information is speech information. If it is speech information, in the speech recognition process at Step S6706 the speech information is converted into a character string as the process object information to thereafter terminate the process. If it is not speech information, the input information itself is used as the process object information to thereafter terminate the process.

With the above-described input conversion process, input information of different types input from a plurality of input units is converted into the format of the character string as the process object information capable of being processed by the input information concept instance shown in FIG. 15. Therefore, the input information can be processed.

Fourth Embodiment

In this embodiment, a method of collectively understanding and processing information input from a plurality of input units by correlating the plurality piece of information and by considering the input order thereof, will be described specifically.

Figure 68:
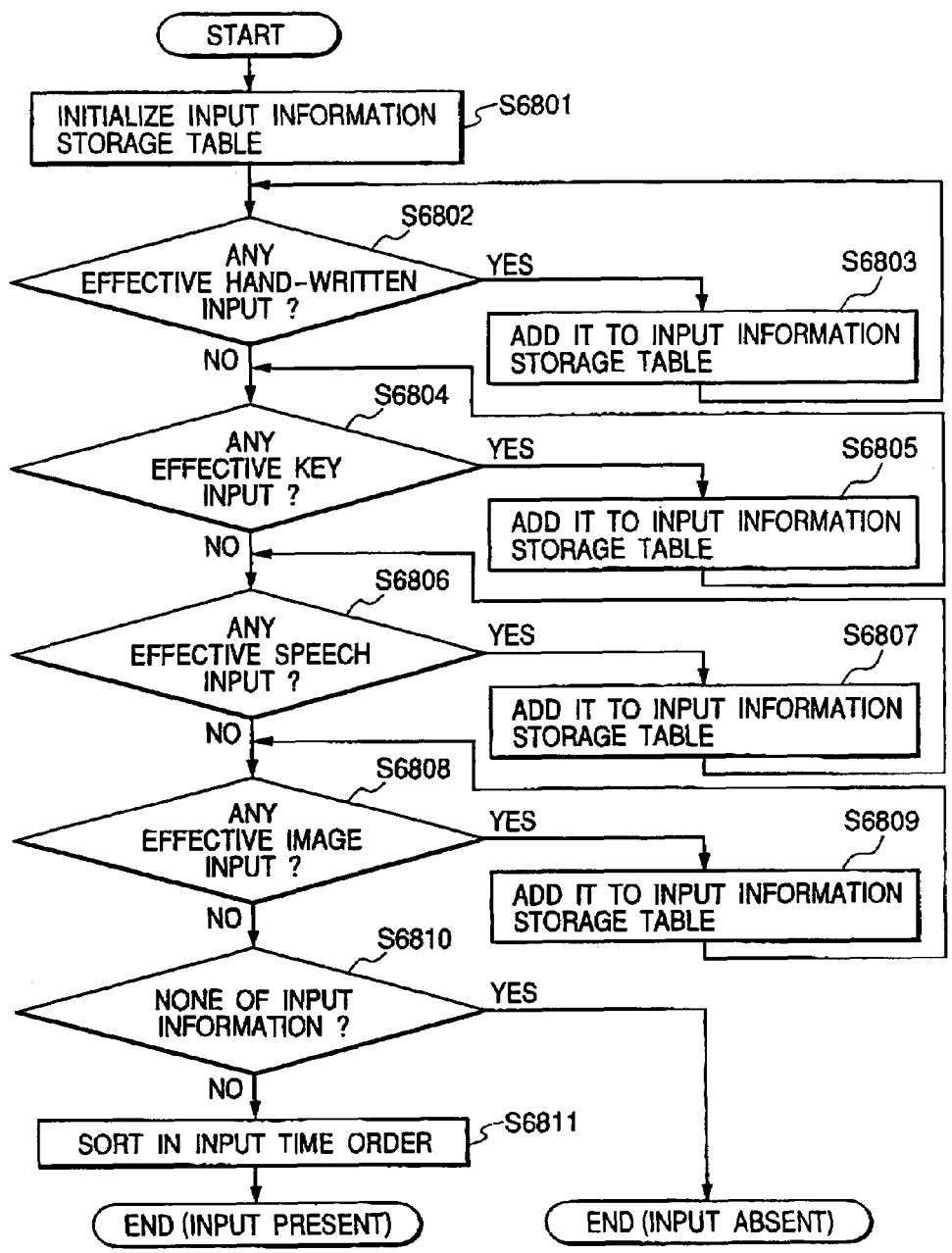
FIG. 68 is a flow chart illustrating an input detection process considering an input order of a plurality piece of input information.

FIG. 68 is a flow chart illustrating the input detection process at Step S301 shown in FIG. 3 illustrating the whole process of the information processing apparatus. The different point from the flow chart shown in FIG. 12 is that information input from a plurality of input units can be processed by considering the input order thereof.

The input detection process of this embodiment checks inputs from a plurality of input units, stores the input information as a combination of an input time and a type of the input information in the input information storage table shown in FIG. 72, and detects whether there is any piece of effective information to be processed by the information processing apparatus. If there is even one piece of effective information, the input information is sorted in the order of input time.

Specifically, as the input detection process is activated, at Step S6801 the input information storage table is initialized to empty values.

At next Step S6802 it is checked whether the input information is effective hand-written information. If it is effective hand-written information, the flow advances to Step S6803 whereat the input hand-written information is stored in the input information storage table to thereafter return to Step S6802. At next Step S6804 it is checked whether the input information is effective key information. If it is effective key information, the flow advances to Step S6805 whereat the input key information is stored in the input is information storage table to thereafter return to Step S6804.

At next Step S6806 it is checked whether the input information is effective speech information. If it is effective speech information, the flow advances to Step S6807 whereat the input speech information is stored in the input information storage table to thereafter return to Step S6806. At next Step S6808 it is checked whether the input information is effective image information. If it is effective image information, the flow advances to Step S6809 whereat the input image information is stored in the input information storage table to thereafter return to Step S6808.

At next Step S6810 it is judged whether input information was stored in the effective input information storage table by the above processes. If not, it is judged as "input absent" to thereafter terminate the process. If it is judged that effective input information was stored, at Step S56811 it is judged as "input present" to thereafter terminate the process.

Figure 69:
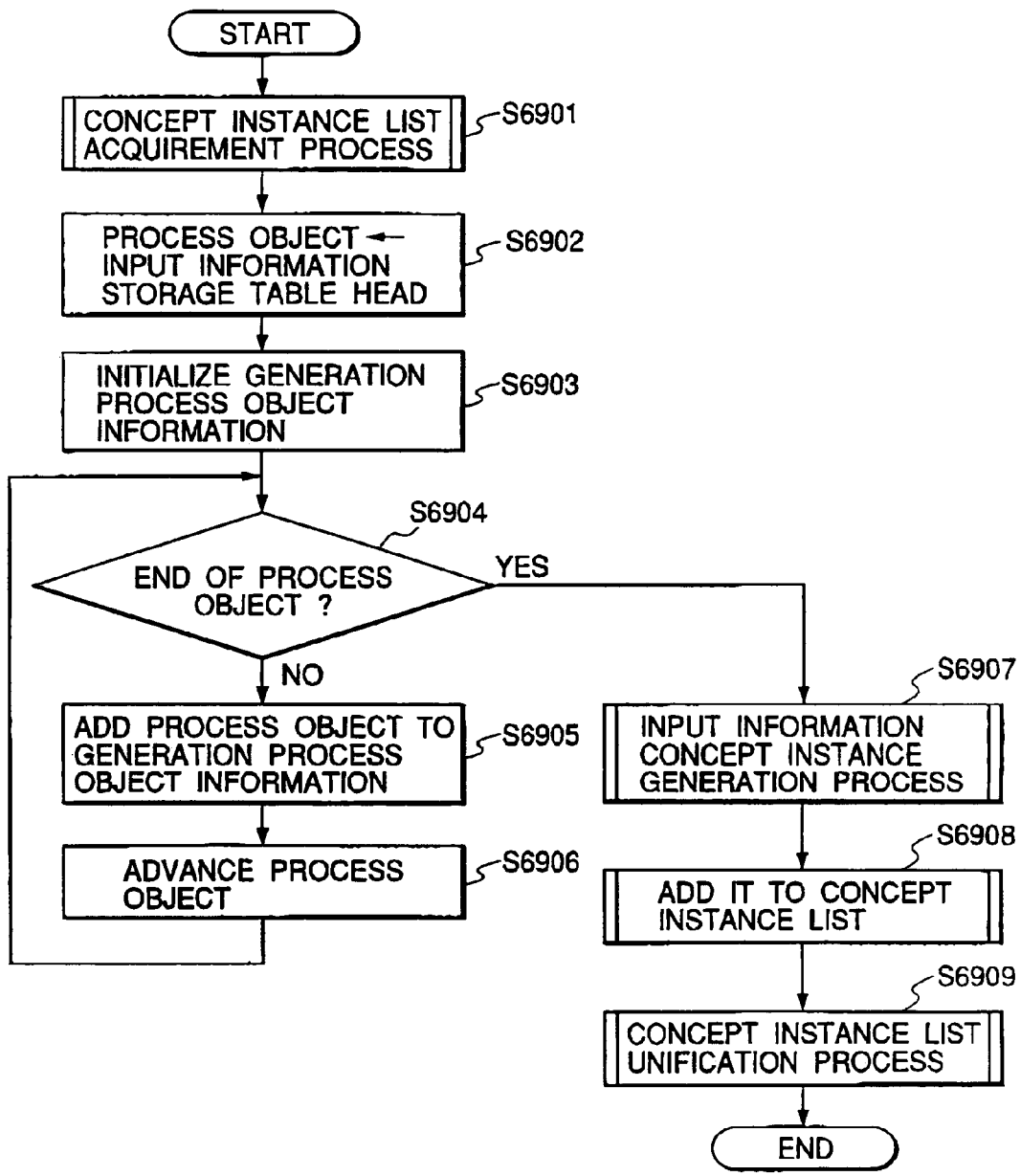
FIG. 69 is a flow chart illustrating an input analysis process considering an input order of a plurality piece of input information.

FIG. 69 is a flow chart illustrating the input analysis process at Step S304 shown in FIG. 3. The different point from the flow chart shown in FIG. 13 is that information input from a plurality of input units can be processed by considering the input order thereof.

In the input analysis process in this embodiment, the concept instance list is generated which stores concept instances generated in accordance with the state at the input time, the past state and input information to be analyzed.

Specifically, as the input analysis process is activated, in a concept instance list acquirement process at Step S6901, a concept instance list is generated which stores concept instances generated in accordance with the state at the input time and the past state. At next Step S6902 the process object is initialized to the top of an input information storage table shown in FIG. 72. At next Step S6903 generation process object information is initialized which is used as the process object of an input information concept instance generation process at Step S6907 to be described later.

At next Step s6904 it is judged whether all process objects were processed. If not, the flow advances to Step S6905 whereat input information of the process object is added to the generation process object information. At next Step S6906, in order to use the next process object, the flow returns to Step S6904 to repeat the process.

If it is judged at Step S6904 that all object processes were processed, in the input information concept instance generation process at Step S6907 an input information instance list is generated which stores concept instances generated from input information to be analyzed, and added to the concept instance list at next Step S6908.

In a concept instance list unification process at next Step S6909, associated concept instances are unified to some concept instance by referring to the concept instances stored in the concept instance list generated by the above processes, to thereafter terminate the process.

Figure 70:
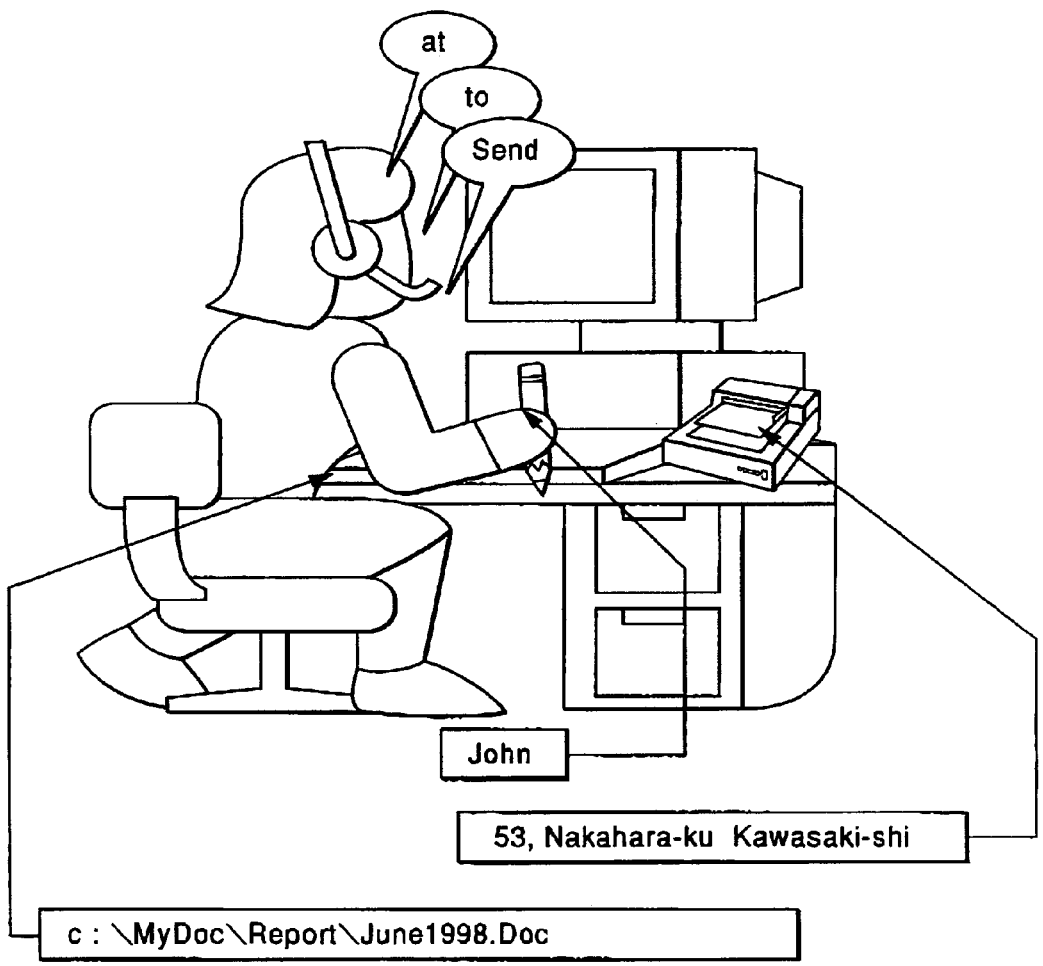
FIG. 70 is a diagram illustrating the state that speech information, key information, hand-written information and image information are input.

FIG. 70 is a diagram illustrating the state that an operator inputs speech information "Send" by using the speech input unit, inputs key information "c:\MyDoc\Report\June1998.doc" by using the key input unit, input speech information "to" by using the speech input unit, inputs hand-written information "John" by using the handwriting unit, inputs speech-information "at" by using the speech input unit, and inputs image information "53, Nakahara-ku Kawasaki-shi" by using the image input unit.

Figure 71:
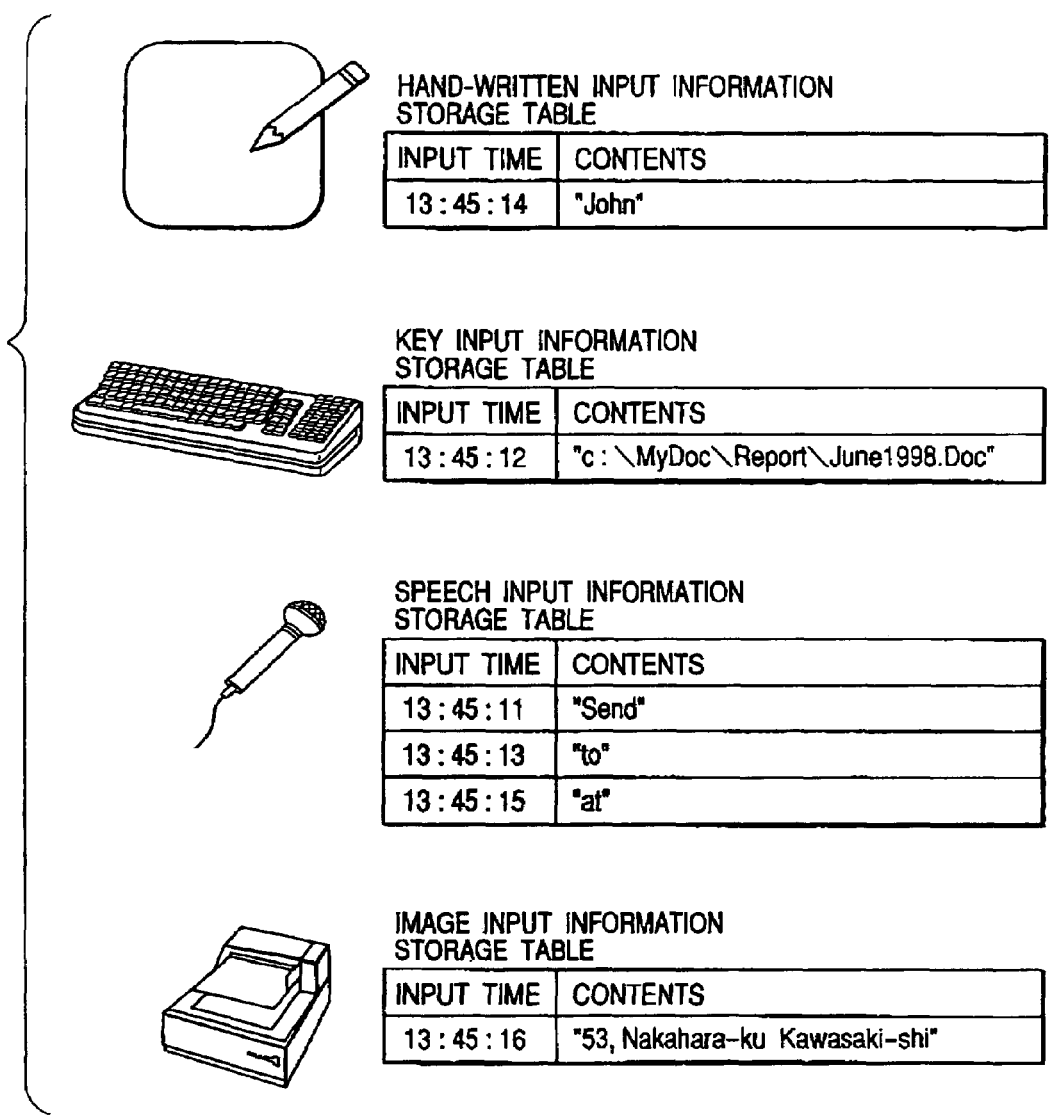
FIG. 71 is a diagram showing an example of information stored in input units.

FIG. 71 shows an example of information stored in the input unit 1 show in FIG. 1 after the inputs illustrated in FIG. 70 are entered.

The hand-written information "John" input from the handwriting input unit as well as the input time is stored in a hand-written input information storage table. The key information "c:\MyDoc\Report\June1998.doc" input from the key input unit as well as the input time is stored in a key input information storage table.

The speech information "Send", "to" and "at" input from the speech input unit as well as the input times is stored in a speech input information storage table. The image information "53, Nakahara-ku Kawasaki-shi" input from the image input unit as well as the input time is stored in an image input information storage table.

Each input information storage table may be formed independently in the input unit 1 or in the data memory 5. In the latter case the input unit 1 operates to store the input information in the manner illustrated in FIG. 68, whereas in the former case CPU 2 operates to store the input information in the data memory 5 and refer the stored input information in the manner illustrated in FIG. 68.

FIG. 72 is a diagram showing an example of the input information storage table whose contents are stored in the input detection process shown in FIG. 68 after the inputs shown in FIG. 70 are entered. In the input information storage table, each piece of the information input from each input unit shown in FIG. 71 is time sequentially sorted and stored.

FIG. 73 is a diagram showing an example of generation object information generated from the input information storage table shown in FIG. 72 to be processed by the input information concept instance generation process.

With reference to relevant diagrams, the sequential process will be described for realizing the state that an operator inputs speech information "Send" by using the speech input unit, inputs key information "c:\MyDoc\Report\June1999.doc" by using the key input unit, input speech information "to" by using the speech input unit, Inputs hand-written information "John" by using the handwriting unit, inputs speech information "at" by using the speech input unit, and inputs image information "53, Nakahara-ku Kawasaki-shi" by using the image input unit.

The information input from the operator is detected by the input detection process at Step S301 shown in FIG. 3.

Specifically, as the input detection process shown in FIG. 68 is activated, at Step S6801 the input information storage table is initialized to empty values.

At next Step S6802 it is judged that effective hand-written information "John" is input. At Step S6803 the input hand-written information is added to the input information storage table to thereafter return to Step S6802.

At Step S6802 it is judged there is no more input information, and the flow advances to Step S6804 whereat it is judged that effective key information "c:\MyDoc\Report\June1998.doc" is input. At Step S6805 the input key information is added to the input information storage table to thereafter return to Step S6804.

At Step S6804 it is judged there is no more input information, and the flow advances to Step S6806 whereat it is judged that effective speech information "Send" is input. At Step S6807 the input speech information is added to the input information storage table to thereafter return to Step S6806. At Step S6806 it is judged that effective speech information "to" is input, and the input speech information is added to the input information storage table to thereafter return to Step S6806. At Step S6806 it is judged that effective speech information "at" is input, and at Step S6807 the input speech information is added to the input information storage table to thereafter return to Step S6806.

At Step S6806 it is judged there is no more input information, and the flow advances to Step S6808 whereat it is judged that effective image information "53, Nakahara-ku Kawasaki-shi" is input. At Step S6809 the input image information is added to the input information storage table to thereafter return to Step S6808.

At Step S6808 it is judged there is no more input information, and the flow advances to next Step S6810 whereat it is judged that input information is stored in the input information storage table by the above processes. The flow advances to an input time sort process at Step S6811. The input information stored in the input information storage table is sorted in the order of input time as shown in FIG. 72, and it is judged as "input present" to thereafter terminate the process.

It is therefore judged at Step S302 that there is input information. At next Step S303 it is judged whether the detected input information is processed by the input analysts process which is a main component of the invention. In this example, since the detected input information is natural language information, the input information is judged as the information to be analyzed by the input analysis process. At next Step S304 the input information is analyzed by the input analysis process.

Specifically, as the input analysis shown in FIG. 69 is activated, the concept instance list acquirement process at Step S6901 generates the concept instance list which stores concept instances generated in accordance with the state at the input time and the past state. However, in this example, the concept instance list is not generated.

At next Step S6902 the process object is initialized to the input ID=1 at the top of the input information storage table shown in FIG. 72. At next Step S6903 the generation process object information is initialized which is processed by the input information concept instance generation process. At next Step S6904 it is judged that all process objects were not processed. At next Step S6905 the speech information "Send" corresponding to the input ID=1 is added to the generation process object information. At next step S6906, in order to use the next process object, the flow returns to Step S6904 to repeat the process.

For the inputs IDs 2 to 6, processes similar to the above are repeated so that the generation process object information is updated as shown in FIG. 73. Thereafter, at Step S6904 it is judged that all process objects were processed. In the input information concept instance generation process at Step S6907, an input information concept instance list which stores concept instances generated from the input information to be analyzed, is generated and at Step S6908 added to the concept instance list.

In the concept instance list unification process at next Step S6909, associated concept instances are unified to some concept instance by referring to the concept instances generated by the above processes and stored in the concept instance list, to thereafter terminate the input analysis process.

In the process determination process at next Step S305, a process to be executed is determined by referring to the concept instance list. In this example, since ConceptType of the concept instance stored in the concept instance list is Send, a Send process is determined. In the execution instruction process at next Step S306, an internal process, an external process in the apparatus, or a process in an external apparatus is instructed. Specifically, depending upon the values in the slots Object and To of the concept instances, a method of instructing a process changes as to which method is used, whether the actual process is executed immediately after the instruction or after a predetermined time lapse, or the like.

If it is judged at next Step S307 that the instruction does not indicate an end, the flow returns to Step S301 to prepare for a new input or the like. If it is judged at Step S307 that the instruction indicates an end, the flow advances to an end process at Step S308 to execute an actual termination process.

According to the embodiments described above, a combination of a plurality type of input information can be processed. It is possible to realize natural interaction using natural languages in a manner like people can do. An operator can recognize only the contents which result from using an application.

The invention can be applied to a system constituted of a plurality of apparatus (such as a computer, an interface unit and a display) or to a single apparatus, so long as the functions of the embodiments can be realized.

The scope of the invention includes the case wherein the functions of the embodiments are achieved by supplying a computer (or CPU or MPU) in a system or apparatus connected to various devices with program codes of software and by making the computer operate the devices in accordance with the supplied program codes. In such a case, the program codes themselves read from a storage medium realize the functions of each embodiment. Therefore, means for supplying the computer with the program codes, e.g., a storage medium storing such program codes, constitutes the present invention.

The storage medium for supplying such program codes may be a floppy disk, a hard disk, an optical disk, a magnetooptical disk, a CD-ROM, a CD-R, a magnetic tape, a non-volatile memory card, a ROM or the like.

It is obvious that the scope of the invention also includes program codes not only in the case wherein the functions of each embodiment can be realized by executing the program codes read by a computer, but also in the case wherein the functions of each embodiment can be realized by an OS (operating system), running on the computer or in cooperation with application software, in accordance with the program codes.

It is obvious that the scope of the invention also includes the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU or the like of the function expansion board or function expansion unit.

If the invention is to be applied to the storage medium, this medium stores programs codes corresponding to the above-described flow charts.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus comprising:
   a plurality of input means for inputting different types of information;
   conversion means for converting information input from any of said plurality of input means into a character string representing the information;
   storage means for storing a plurality of character strings converted by said conversion means with an input time thereof;
   sorting means for sorting the plurality of character strings stored in said storage means in an order of the input time;
   a knowledge base for storing knowledge of each concept which includes a character string representing the concept, a concept type of the concept, a concept instance rule for defining a property of a concept instance to be filled in each slot provided for the concept in correspondence with a slot type of the slot, and a surface rule for defining an order of a character string representing the concept instance to be filled in each slot and a grammar of the character string representing the concept;
   input concept instance generating means for generating a plurality of input concept instances corresponding to the plurality of character strings sorted in the input time order by said sorting means, by referring to the knowledge stored in said knowledge base;
   request information list generating means for generating a request information list which includes, for each of the plurality of input concept instances, I) an instance request for filling respective slots with specified concept instances in accordance with the concept instance rule of the input concept instance, II) a surface request for obeying a specified order of character strings and a specific grammar in accordance with the surface rule of the input concept instance, and, III) a concept definition request which does not overlap with any existing requests in accordance with a different concept instance rule defined in a concept definition for the concept type of the input concept instance;
   applicable request list generating means for generating an applicable request list by generating combinations each of which includes an applicable concept request in the request information list and a corresponding concept instance in the plurality of input concept instances, and excluding a combination which does not satisfy the surface request in the request information list and a combination which includes an applicable concept request competing with other requests from the generated combinations, included in the request list; and
   concept instance unifying means for unifying the plurality of input concept instances by filling a slot of one of the input concept instances with another one of the input concept instances having a concept type which matches with the property of the concept instance for the slot by applying an applicable request in the applicable request list.

2. An information processing apparatus according to claim 1, further comprising status acquisition means for acquiring an operation status of a program executed in said apparatus at an input time.

3. An information processing apparatus according to claim 1, further comprising status storage means for storing a past status, wherein said status concept instance generating means generates the status concept instance in accordance with the past status read from said status storage means.

4. An information processing apparatus according to claim 1, wherein said input means can input key information.

5. An information processing apparatus according to claim 4, wherein said input means can input character information by converting the key information.

6. An information processing apparatus according to claim 1, wherein said input means can input speech information.

7. An information processing apparatus according to claim 6, wherein said input means can input character information by recognizing the speech information and converting the speech information into character information.

8. An information processing apparatus according to claim 1, wherein said input means can optically input image information.

9. An information processing apparatus according to claim 8, wherein said input means can input character information of the image information by optically recognizing the image information.

10. An information processing apparatus according to claim 1, wherein said input means can input hand-written information.

11. An information processing apparatus according to claim 10, wherein said input means can input the hand-written character information by recognizing the hand-written character information on line.

12. An information processing method performed in an apparatus, said method comprising:
    an input step, of inputting different types of information by a plurality of input units;
    a conversion step, of converting information input from any of said plurality of input units into a character string representing the information;
    a storing step, of storing a plurality of character strings converted in said conversion step with an input time thereof in a storage unit;
    a sorting step, of sorting the plurality of character strings stored in the storage unit in an order of the input time;
    an input concept instance generating step, of generating a plurality of input concept instances corresponding to the plurality of words sorted in the input time order in said sorting step, by referring to knowledge stored in a knowledge base, which stores knowledge of each concept which includes a character string representing the concept, a concept type of the concept, a concept instance rule for defining a property of a concept instance to be filled in each slot provided for the concept in correspondence with a slot type of the slot, and a surface rule for defining an order of a character string representing the concept instance to be filled in each slot and a grammar of the character string representing the concept;

a request information list generating step, of generating a request information list which includes, for each of the plurality of input concept instances, I) an instance request for filling respective slots with specified concept instances in accordance with the concept instance rule of the input concept instance, II) a surface request for obeying a specified order of character strings and a specific grammar in accordance with the surface rule of the input concept instance, and, III) a concept definition request which does not overlap with any existing requests in accordance with a different concept instance rule defined in a concept definition for the concept type of the input concept instance;

an applicable request list generating step, of generating an applicable request list by generating combinations each of which includes an applicable concept request in the request information list and a corresponding concept instance in the plurality of input concept instances, and excluding a combination which does not satisfy the surface request in the request information list and a combination which includes an applicable concept request competing with other requests from the generated combinations, included in the request list; and a concept instance unifying step, of unifying the plurality of input concept instances by filling a slot of one of the input concept instances with another one of the input concept instances having a concept type which matches with the property of the concept instance for the slot by applying an applicable request in the applicable request list.

13. An information processing method according to claim 12, further comprising a status acquisition step, for acquiring an operation status of a program executed in said apparatus at an input time.

14. An information processing method according to claim 12, further comprising a status storing step, of storing a past status, wherein said status concept instance generating step generates the status concept instance in accordance with the past status read in said status storing step.

15. An information processing method according to claim 12, wherein said input step can input key information.

16. An information processing method according to claim 15, wherein said input step can input character information by converting the key information.

17. An information processing method according to claim 12, wherein said input step can input speech information.

18. An information processing method according to claim 17, wherein said input step can input character information by recognizing the speech information and converting the speech information into character information.

19. An information processing method according to claim 12, wherein said input step can optically input image information.

20. An information processing method according to claim 19, wherein said input step can input character information of the image information by optically recognizing the image information.

21. An information processing method according to claim 12, wherein said input step can input hand written information.

22. An information processing method according to claim 21, wherein said input step can input the hand-written character information by recognizing the hand-written character information on line.

23. A computer-readable storage medium storing a computer-executable information processing program for controlling a computer to perform information processing in an apparatus, said program comprising:

code for an input step, of inputting different types of information;

code for a conversion step, of converting information input from any of said plurality of input units into a character string representing the information;

code for a storing step, of storing a plurality of character strings converted by said conversion code with an input time thereof in a storage unit;

code for a sorting step, of sorting the plurality of character strings stored in the storage unit in an order of the input time;

code for an input concept instance generating step, of generating a plurality of input concept instances corresponding to the plurality of character strings sorted in the input time order by said sorting code, by referring to knowledge stored in a knowledge base, which stores knowledge of each concept which includes a character string representing the concept, a concept type of the concept, a concept instance rule for defining a property of a concept instance to be filled in each slot provided for the concept in correspondence with a slot type of the slot, and a surface rule for defining an order of a character string representing the concept instance to be filled in each slot and a grammar of the character string representing the concept;

code for a request information list generating step, of generating a request information list which includes, for each of the plurality of input concept instances, I) an instance request for filling respective slots with specified concept instances in accordance with the concept instance rule of the input concept instance, II) a surface request for obeying a specified order of character strings and a specific grammar in accordance with the surface rule of the input concept instance, and, III) a concept definition request which does not overlap with any existing requests in accordance with a different concept instance rule defined in a concept definition for the concept type of each of the input concept instance;

code for an applicable request list generating step, of generating an applicable request list by generating combinations each of which includes an applicable concept request in the request information list and a corresponding concept instance in the plurality of input concept instances, and excluding a combination which does not satisfy the surface request in the request information list and a combination which includes an applicable concept request competing with other requests from the generated combinations, included in the request list; and code for a concept instance unifying step, of unifying the plurality of input concept instances by filling a slot of one of the input concept instances with another one of the input concept instances having a concept type which matches with the property of the concept instance for the slot by applying an applicable request in the applicable request list.

* * * * *